(12) United States Patent
Clough

(10) Patent No.: US 6,310,291 B1
(45) Date of Patent: Oct. 30, 2001

(54) UTILITY LOCK-OUT APPARATUS

(76) Inventor: Emett Clough, Everett, WA (US) 98206

( * ) Notice: Subject to any disclaimer, the term of this patent is extended or adjusted under 35 U.S.C. 154(b) by 0 days.

(21) Appl. No.: 09/501,305

(22) Filed: Feb. 10, 2000

(51) Int. Cl.$^7$ .................................................. H02G 3/14
(52) U.S. Cl. ............................ 174/67; 174/66; 220/241; 220/242
(58) Field of Search ................... 174/67, 66, 53; 220/241, 242, 3.8; 439/135; D13/177; D8/353, 351

(56) References Cited

U.S. PATENT DOCUMENTS

| | | | |
|---|---|---|---|
| D. 189,350 | 11/1960 | Bellek | D8/353 |
| 2,119,428 | 5/1938 | Englar | 174/67 |
| 3,096,409 | 7/1963 | Hubbell et al. | 200/43.22 |
| 3,159,446 | * 12/1964 | Protzmann | 174/67 X |
| 3,200,989 | 8/1965 | Hubbell | 220/242 |
| 3,473,859 | * 10/1969 | Kircher | 174/66 X |
| 4,733,029 | 3/1988 | Kobayashi et al. | 528/149 |
| 4,882,456 | 11/1989 | Hovanic et al. | 200/43.15 |
| 4,978,816 | 12/1990 | Castonguay et al. | 200/43.14 |
| 5,243,135 | 9/1993 | Shotey | 174/67 |
| 5,260,528 | 11/1993 | Benda | 200/43.14 |
| 5,310,969 | 5/1994 | Turek et al. | 200/43.14 |
| 5,324,897 | 6/1994 | Melgoza et al. | 200/43.11 |
| 5,535,096 | 7/1996 | Cliff, Jr. | 361/726 |
| 5,866,846 | * 2/1999 | Huag | 174/67 |

FOREIGN PATENT DOCUMENTS

| | | | |
|---|---|---|---|
| 404976 | 9/1968 | (AU) . | |
| 1944612 | 3/1971 | (DE) . | |
| 1580037 | * 11/1980 | (GB) | 174/67 |
| 2208454 | 3/1989 | (GB) . | |
| 3-58498 | 3/1991 | (JP) . | |

* cited by examiner

Primary Examiner—Dean A. Reichard
Assistant Examiner—Dhiru R Patel
(74) Attorney, Agent, or Firm—Richard C. Litman

(57) ABSTRACT

A utility lock-out apparatus for power outlet assemblies, electrical switch assemblies, communication outlet assemblies, cable outlet assemblies, or the like. The utility lock-cut apparatus may be configured in the form of a power outlet face plate, an electrical switch face plate, a communication outlet face plate, a cable outlet face plate. The utility lock-out apparatus may also be configured in the form of an attachment to a conventional power outlet face plate, a conventional electrical switch face plate, a conventional communication outlet face plate, or a conventional cable outlet face plate, wherein the particular utility lock-out face plate or attachment includes a base element and at least one longitudinal element that extends from the surface of the base element at a particular location for a desired distance above the surface of the base element. Each longitudinal element includes a hole defined therein having a size configured for enabling a lock bar to pass therethrough. The particular utility lock-out face plate or attachment provides the ability of a user to lock-out access to one or more power outlets, electrical switches, communication outlets, or cable outlets.

60 Claims, 33 Drawing Sheets

UTILITY LOCK-OUT APPARATUS

BACKGROUND OF THE INVENTION

1. Field of the Invention

The present invention relates to a lock-out apparatus for power outlet assemblies, electrical switch assemblies, communication outlet assemblies, cable outlet assemblies or the like.

2. Description of the Related Art

Conventional power outlet assemblies, electrical switch assemblies, communication outlet assemblies, cable outlet assemblies, or the like, are f freely accessible to individuals, such as children, who may utilize such assemblies contrary to instructions they may have previously received. A need exists for a convenient and inexpensive device which will enable individuals to selectively preclude access by others to power outlet assemblies, electrical switch assemblies, communication outlet assemblies, cable outlet assemblies, or the like. The related art is represented by the following patents of interest.

U.S. Design Pat. No. 189,350, issued on Nov. 29, 1960 to Frank G. Bellek, shows an ornamental design for an outdoor receptacle cover. Bellek does not suggest a utility lock-out apparatus according to the claimed invention.

U.S. Pat. No. 2,119,428, issued on May 31, 1938 to Lillian G. Englar, describes an electrical receptacle plate with protective means for automatically closing or covering of the electrical contact apertures in the standard types of electrical outlet fixtures. Englar does not suggest a utility lock-out apparatus according to the claimed invention.

U.S. Pat. No. 3,096,409, issued on Jul. 2, 1963 to Harvey Hubbell et al., describes a switch plate locking cover attachment. Hubbell et al. do not suggest a utility lock-out apparatus according to the claimed invention.

U.S. Pat. No. 3,200,989, issued on Aug. 17, 1965 to Harvey Hubbell, describes a locking weatherproof cover attachment for an electrical outlet box. Hubbell does not suggest a utility lock-out apparatus according to the claimed invention.

U.S. Pat. No. 4,733,029, issued on Mar. 22, 1988 to Yoshiaki Kobayashi et al., describes an operating handle locking device for an electrical switchgear. Kobayashi et al. do not suggest a utility lock-out apparatus according to the claimed invention.

U.S. Pat. No. 4,882,456, issued on Nov. 21, 1989 to Steven F. Hovanic et al., describes a locking device for attachment to a switch or circuit breaker for locking a switch handle in a predetermined position. Hovanic et al. do not suggest a utility lock-out apparatus according to the claimed invention.

U.S. Pat. No. 4,978,816, issued on Dec. 18, 1990 to Roger N. Castonguay et al., describes a circuit breaker handle interlock arrangement whereby the circuit breaker handle can only be locked in its OFF position when the circuit breaker contacts are actually separated. Castonguay et al. do not suggest a utility lock-out apparatus according to the claimed invention.

U.S. Pat. No. 5,243,135, issued on Sep. 7, 1993 to Michael J. Shotey, describes an electrical outlet cover lock. Shotey does not suggest a utility lock-out apparatus according to the claimed invention.

U.S. Pat. No. 5,260,528, issued on Nov. 9, 1993 to Steven J. Benda, describes a device for locking wall switching means against actuation by unauthorized persons. Benda does not suggest a utility lock-out apparatus according to the claimed invention.

U.S. Pat. No. 5,310,969, issued on May 10, 1994 to Mark E. Turek et al., describes a lockout adapted for attachment to the handle of a switch to maintain it at one extremity of travel, and thus to maintain the switch in one electrical state. Turek et al. do not suggest a utility lock-out apparatus according to the claimed invention.

U.S. Pat. No. 5,324,897, issued on Jun. 28, 1994 to Aaron D. Melgoza et al., describes a switch locking device for an electrical toggle switch. Melgoza et al. do not suggest a utility lock-out apparatus according to the claimed invention.

U.S. Pat. No. 5,535,096, issued on Jul. 9, 1996 to Paul L. Cliff, Jr., describes an electrical safety lock-out device which prevents the insertion of an electrical power cord into an electrical power cord receptacle of an electrical appliance. Cliff, Jr. does not suggest a utility lock-out apparatus according to the claimed invention.

Australian Patent document 404,976, published on Sep. 19, 1968, describes a locking device for use with a switch of the handle operated type. Australian '976 does not suggest a utility lock-out apparatus according to the claimed invention.

Germany Patent document 1,944,612, published on Mar. 25, 1971, describes a plug socket safety cover. Germany '612 does not suggest a utility lock-out apparatus according to the claimed invention.

Great Britain Patent document 2 204 454 A, published on Mar. 30, 1989, describes an electrical switch locking device. Great Britain '454 does not suggest a utility lock-out apparatus according to the claimed invention.

Japan Patent document 3-58498, published on Mar. 13, 1991, describes a protection cover of an actuating component that has an attaching structure. Japan '498 does not suggest a utility lock-out apparatus according to the claimed invention.

None of the above inventions and patents, taken either singularly or in combination, is seen to describe the instant invention as claimed.

SUMMARY OF THE INVENTION

The present invention is a utility lock-out apparatus for power outlet assemblies, electrical switch assemblies, communication outlet assemblies, cable outlet assemblies, or the like. The utility lock-out apparatus may be configured in the form of a power outlet face plate, an electrical switch face plate, a communication outlet face plate, a cable outlet face plate, or the like, wherein the particular utility lock-out face plate includes at least one longitudinal element that extends from the surface of the face plate at a particular location for a desired distance above the surface of the face plate. Each longitudinal element also includes a hole having a size configured for enabling a lock bar of a conventional locking means to pass therethrough. The particular utility lock-out face plate provides the ability of a user to lock-out access to one or more power outlets, electrical switches, communication outlets, cable outlets, or the like. The particular utility lock-out face plate may be made from any desirable material, such as metal, plastic, wood, etc.

The utility lock-out apparatus may also be configured in the form of an attachment to a conventional power outlet face plate, a conventional electrical switch face plate, a conventional communication outlet face plate, a conventional cable outlet face plate, or the like, wherein the particular utility lock-out attachment includes a base element and at least one longitudinal element that extends from the surface of the base element at a particular location for a desired distance above the surface of the utility lock-out attachment. Each longitudinal element includes a hole having a size configured for enabling a lock bar of a conventional locking means to pass therethrough. The particular utility lock-out attachment provides the ability of a user to lock-out access to one or more power outlets, electrical switches, communication outlets, cable outlets, or the like. The particular utility lock-out attachment may be made from any desirable material, such as metal, plastic, wood, etc.

Accordingly, it is a principal object of the invention to provide a utility lock-out apparatus for power outlet assemblies, electrical switch assemblies, communication outlet assemblies, cable outlet assemblies, or the like.

It is another object of the invention to provide a utility lock-out apparatus configured in the form of a power outlet face plate, electrical switch face plate, a communication outlet face plate, a cable outlet face plate, or the like.

It is a further object of the invention to provide a utility lock-out apparatus configured in the form of an attachment to a conventional power outlet face plate, a conventional electrical switch face plate, a conventional communication outlet face plate, a conventional cable outlet face plate, or the like.

It is an object of the invention to provide improved elements and arrangements thereof in a utility lock-out apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is a utility lock-out apparatus for power outlet assemblies, electrical switch assemblies, communication outlet assemblies, cable outlet assemblies, or the like. Conventional power outlet assemblies include one or more electrical outlets mounted within a housing. Such housings may be mounted in the wall of a building, or may be integrated within conventional power strip arrangements which provide a plurality of power outlets for a user and may include well-known voltage and surge protection capabilities. These housings may each covered with an attachable face plate or covering that provides an aesthetic appearance for the power outlets.

Conventional electrical switch assemblies include one or more electrical switches mounted within a housing. Such switches are used to activate electrical devices such as lights, fans, garbage disposals, etc. Such housings may be mounted in the wall of a building, or may be integrated within a portable electrical switch housing. These housings are each covered with an attachable face plate or covering that provides an aesthetic appearance for the electrical switches.

Conventional communication outlet assemblies include one or more communication outlets mounted within a housing. Such communication outlets are capable of receiving communication data from devices such as telephones, computers, facsimile machines, and the like. Such housings may be mounted in the wall of a building, or may be integrated within conventional communication strip arrangements which provide a plurality of communication outlets for a user. These housings are each covered with an attachable face plate or covering that provides an aesthetic appearance for the communication outlets.

Conventional cable outlet assemblies include one or more cable jacks mounted within a housing. Such jacks are interconnected with underground cable wiring which carry audio/video signals from cable companies. Such housings may be mounted in the wall of a building. These housings are each covered with an attachable face plate or covering that provides an aesthetic appearance for the cable jacks.

Figure 1:
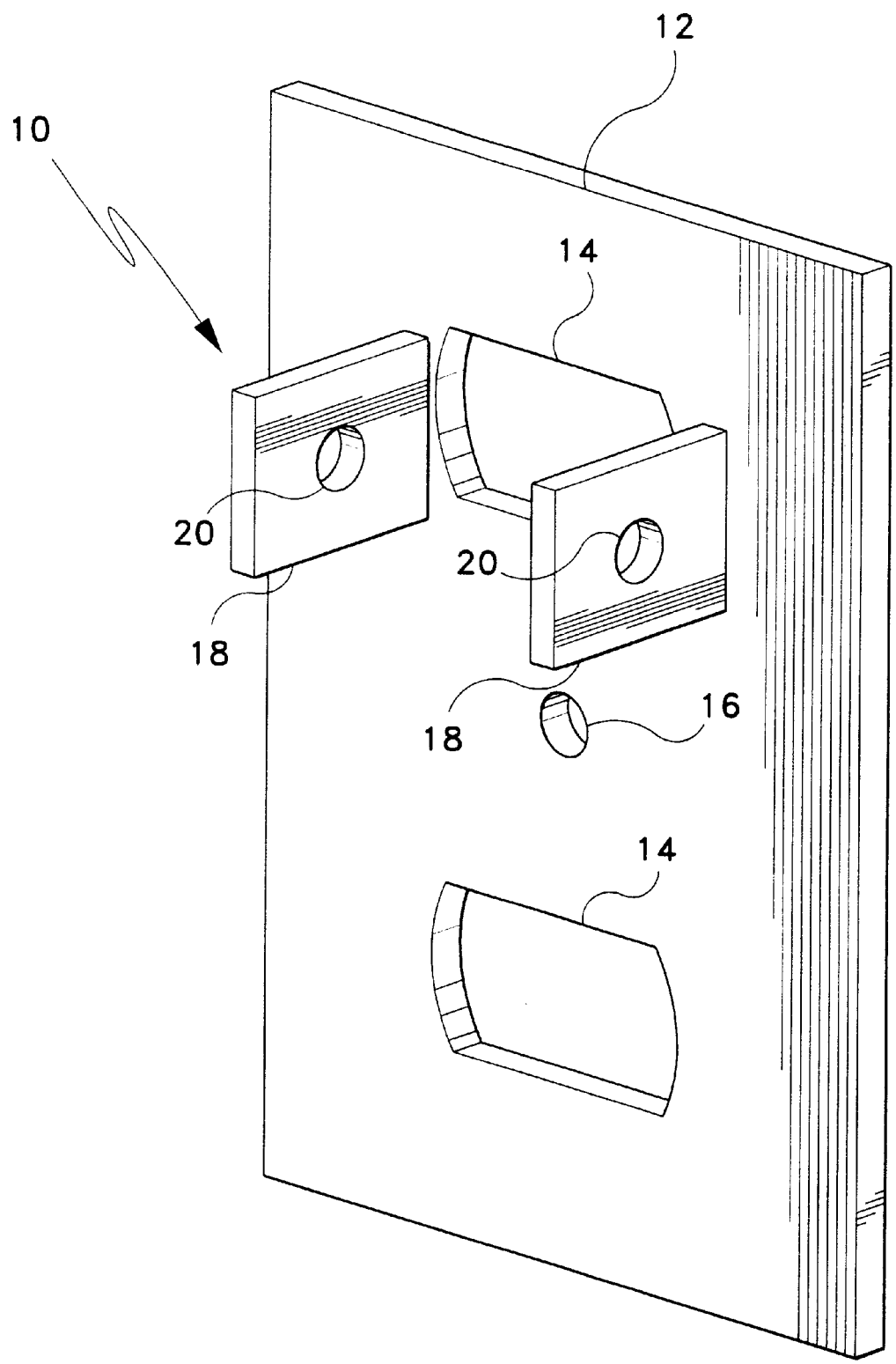
FIG. 1 is a front perspective view of a utility lock-out apparatus according to the present invention.

A utility lock-out apparatus 10 according to the invention for a power outlet assembly is shown in FIG. 1. As shown, the utility lock-out apparatus 10 comprises a power outlet face plate 12 which includes two power outlet holes 14 defined therein, wherein each is configured and positioned for receiving a power outlet (not shown) therethrough. The power outlet face plate 12 also includes a centrally located hole 16 defined therein for receiving a fastening element (not shown), such as a screw, therethrough to provide a means for fastening the power outlet face plate 12 to a power outlet housing (not shown).

Of critical importance to the power outlet face plate 12 is the integration therein of two longitudinal elements 18 that extend from the surface of the power outlet face plate 12 at opposing sides of either one of the power outlet holes 14. In this instance, the longitudinal elements 18 extend from the surface of the power outlet face plate 12 at right and left opposing sides of the upper power outlet hole 14. Each longitudinal element 18 may be reinforced as desired by additional material at the surface of the power outlet face plate 12 to inhibit breakage of the longitudinal element 18 from the power outlet face plate 12. Each longitudinal element 18 extends for a desired distance above the surface of the power outlet face plate 12. Each longitudinal element 18 also includes a hole 20 defined therein having a size configured for enabling a lock bar means 804 of a conventional locking means 800, such as that shown in FIG. 32, to pass therethrough. Preferably, the hole 20 of each longitudinal element 18 according to this configuration is located at a relatively small distance above the surface of the outlet face plate 12 that would preclude one from contacting a power outlet with the metal prongs of an electrical plug (not shown) when a lock bar means 804 of a conventional locking means 800 passes therethrough.

Obviously, the longitudinal elements 18 could alternatively be positioned on the upper and lower sides of either of the power outlet holes 14. In such a configuration, the hole 20 of each longitudinal element 18 would be preferably located at a distance above the surface of the outlet face plate 12 that would preclude one from contacting a power outlet with the metal prongs of an electrical plug (not shown) when a lock bar means 804 of a conventional locking means 800 passes therethrough and the metal prongs of the electrical plug straddle the lock bar means 804.

This particular utility lock-out apparatus 10 provides the ability of a user to selectively lock-out access to one power outlet. Obviously, such a utility lock-out apparatus 10 could include a number of power outlet holes 14 other than two, and could include longitudinal elements 18 at opposing sides of more than one power outlet hole 14. The power outlet face plate 12 and longitudinal elements 18 may be made from any desirable material, such as metal, plastic, wood, etc., and may be dimensioned according to the desires of the manufacturer.

Figure 2:
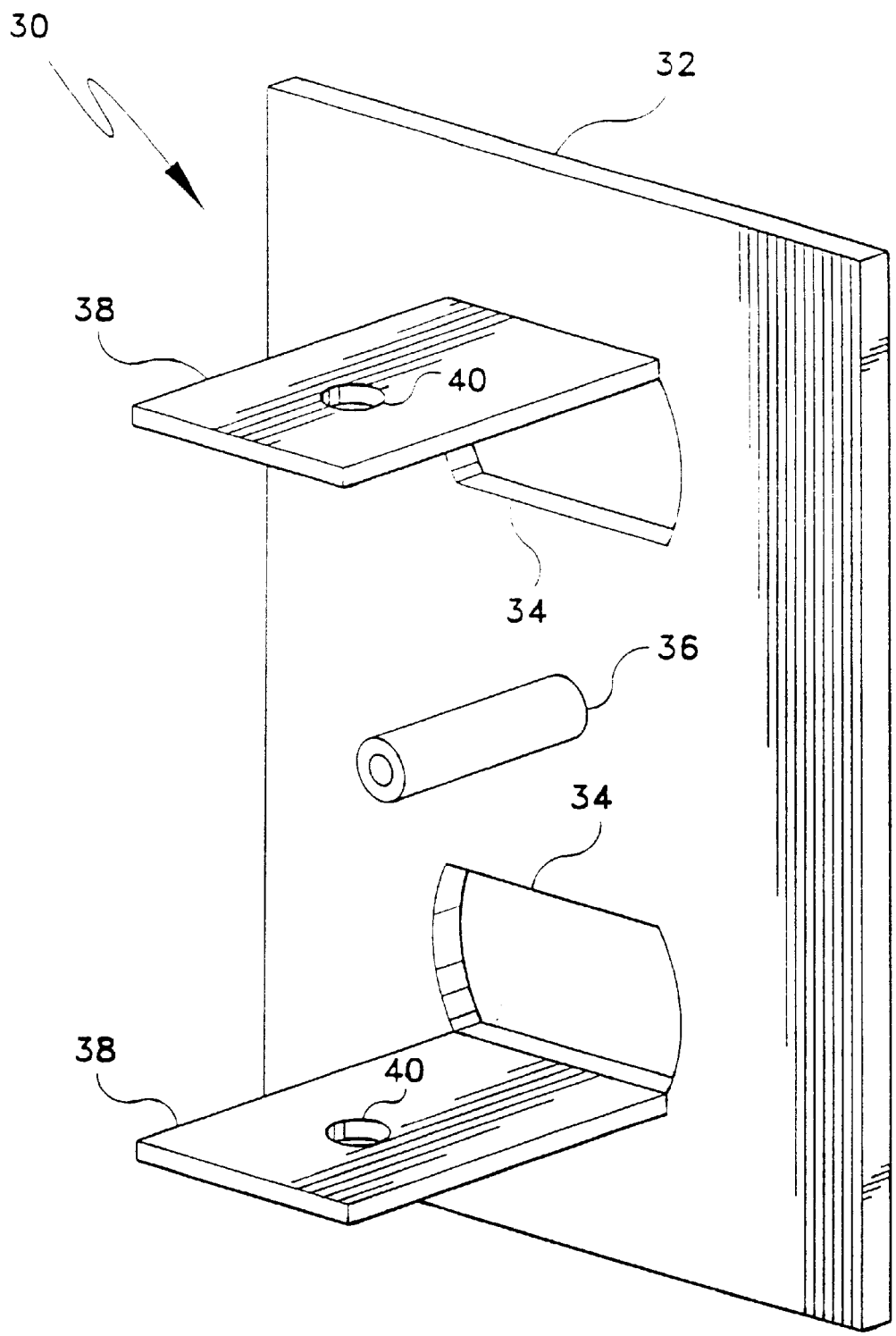
FIG. 2 is a front perspective view of a utility lock-out apparatus according to the present invention.

Another utility lock-out apparatus 30 according to the invention for a power outlet assembly is shown in FIG. 2. As shown, the utility lock-out apparatus 30 comprises a power outlet face plate 32 which includes two power outlet holes 34 defined therein, wherein each is configured and positioned for receiving a power outlet (not shown) therethrough. The power outlet face plate 32 also includes a centrally located hole defined therein for receiving a fastening element (not shown), such as a screw, therethrough to provide a means for fastening the power outlet face plate 32 to a power outlet housing.

Of critical importance to the power outlet face plate 32 is the integration therein of two longitudinal elements 38 that extend from the surface of the power outlet face plate 32 at opposing upper and lower sides of the upper and lower power outlet holes 34. Each longitudinal element 38 may be reinforced as desired by additional material at the surface of the power outlet face plate 32 to inhibit breakage of the longitudinal element 38 from the power outlet face plate 32. Each longitudinal element 38 extends for a desired distance above the surface of the power outlet face plate 32. Each longitudinal element 38 also includes a hole 40 defined therein having a size configured for enabling a lock bar means 804 of a conventional locking means 800, such as that shown in FIG. 32, to pass therethrough. Preferably, the hole 40 of each longitudinal element 38 is located at a distance above the surface of the outlet face plate 32 that would preclude one from contacting a power outlet with the metal prongs of an electrical plug (not shown) when a lock bar means 804 of a conventional locking means 800 passes therethrough and the metal prongs of the electrical plug straddle the lock bar means 804.

The power outlet face plate 32 may also include integrated therein a tubular element 36 that extends from the centrally located hole on the power outlet face plate 32 for a distance that is less than the position of each of the holes 40 present on each of the longitudinal elements 38. Such a tubular element 36 would be configured for receiving a fastening element (not shown), such as a screw, therethrough to provide a means for fastening the power outlet face plate 32 to a power outlet housing. This particular utility lock-out apparatus 30 provides the ability of a user to lock-out access to both power outlets. The use of a tubular element 36 would preclude the ability of someone from removing the face plate 32 merely by removing the fastening element when a locking means is utilized. Obviously, such a utility lock-out apparatus 30 could include a number of power outlet holes 34 other than two, and could include longitudinal elements 38 providing the ability of a user to lock-out access to more than two power outlets. The power outlet face plate 32 and longitudinal elements 38 may be made from any desirable material, such as metal, plastic, wood, etc., and may be dimensioned according to the desires of the manufacturer.

Figure 3:
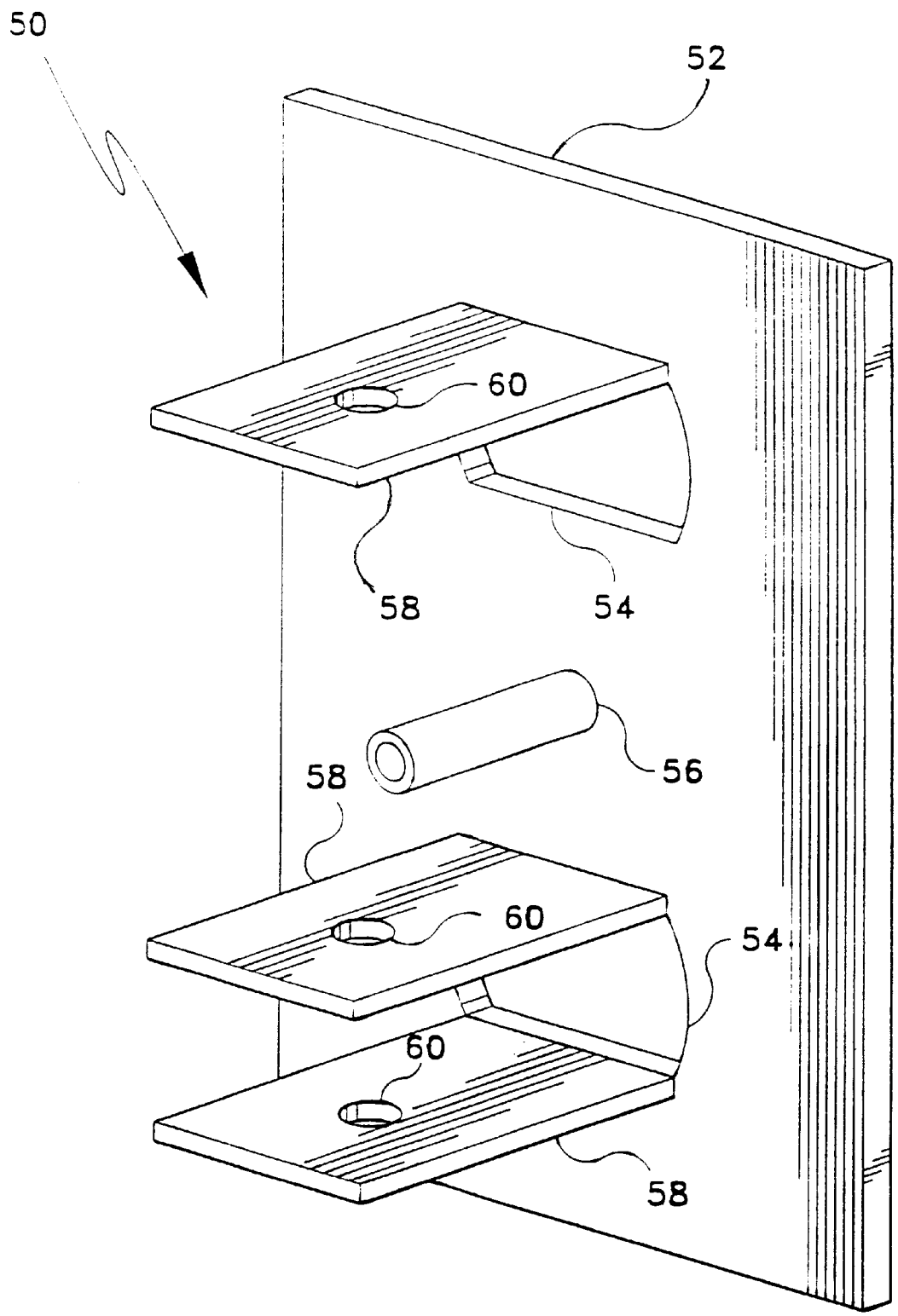
FIG. 3 is a front perspective view of a utility lock-out apparatus according to the present invention.

Another utility lock-out apparatus 50 according to the invention for a power outlet assembly is shown in FIG. 3. As shown, the utility lock-out apparatus 50 comprises a power outlet face plate 52 which includes two power outlet holes 54 defined therein, wherein each is configured and positioned for receiving a power outlet (not shown) therethrough. The power outlet face plate 52 also includes a centrally located hole defined therein for receiving a fastening element (not shown), such as a screw, therethrough to provide a means for fastening the power outlet face plate 52 to a power outlet housing.

Of critical importance to the power outlet face plate 52 is the integration therein of three longitudinal elements 58 that extend from the surface of the power outlet face plate 52, wherein one extends from the top of the upper power outlet hole 54, and the remaining two extend from the top and bottom of the lower power outlet hole 54. Each longitudinal element 58 may be reinforced as desired by additional material at the surface of the power outlet face plate 52 to inhibit breakage of the longitudinal element 58 from the power outlet face plate 52. Each longitudinal element 58 extends for a desired distance above the surface of the power outlet face plate 52. Each longitudinal element 58 also includes a hole 60 defined therein having a size configured for enabling a lock bar means 804 of a conventional locking means 800, such as that shown in FIG. 32, to pass therethrough. Preferably, the hole 60 of each longitudinal element 58 is located at a distance above the surface of the outlet face plate 52 that would preclude one from contacting a power outlet with the metal prongs of an electrical plug (not shown) when a lock bar means 804 of a conventional locking means 800 passes therethrough and the metal prongs of the electrical plug straddle the lock bar means 804.

The power outlet face plate 52 may also include integrated therein a tubular element 56 that extends from the centrally located hole on the power outlet face plate 52 for a distance that is less than the position of each of the holes 60 present on each of the longitudinal elements 58. Such a tubular element 56 would be configured for receiving a fastening element (not shown), such as a screw, therethrough to provide a means for fastening the power outlet face plate 52 to a power outlet housing. This particular utility lock-out apparatus 50 provides the ability of a user to lock-but access to one power outlet (the lower power outlet) or both power outlets. Obviously, such a utility lock-out apparatus 50 could include a number of power outlet holes 54 other than two, and could include longitudinal elements 58 providing the ability of a user to lock-out access to more than two power outlets, such as on a conventional power outlet strip. The power outlet face plate 52 and longitudinal elements 58 may be made from any desirable material, such as metal, plastic, wood, etc., and may be dimensioned according to the desires of the manufacturer.

Figure 4:
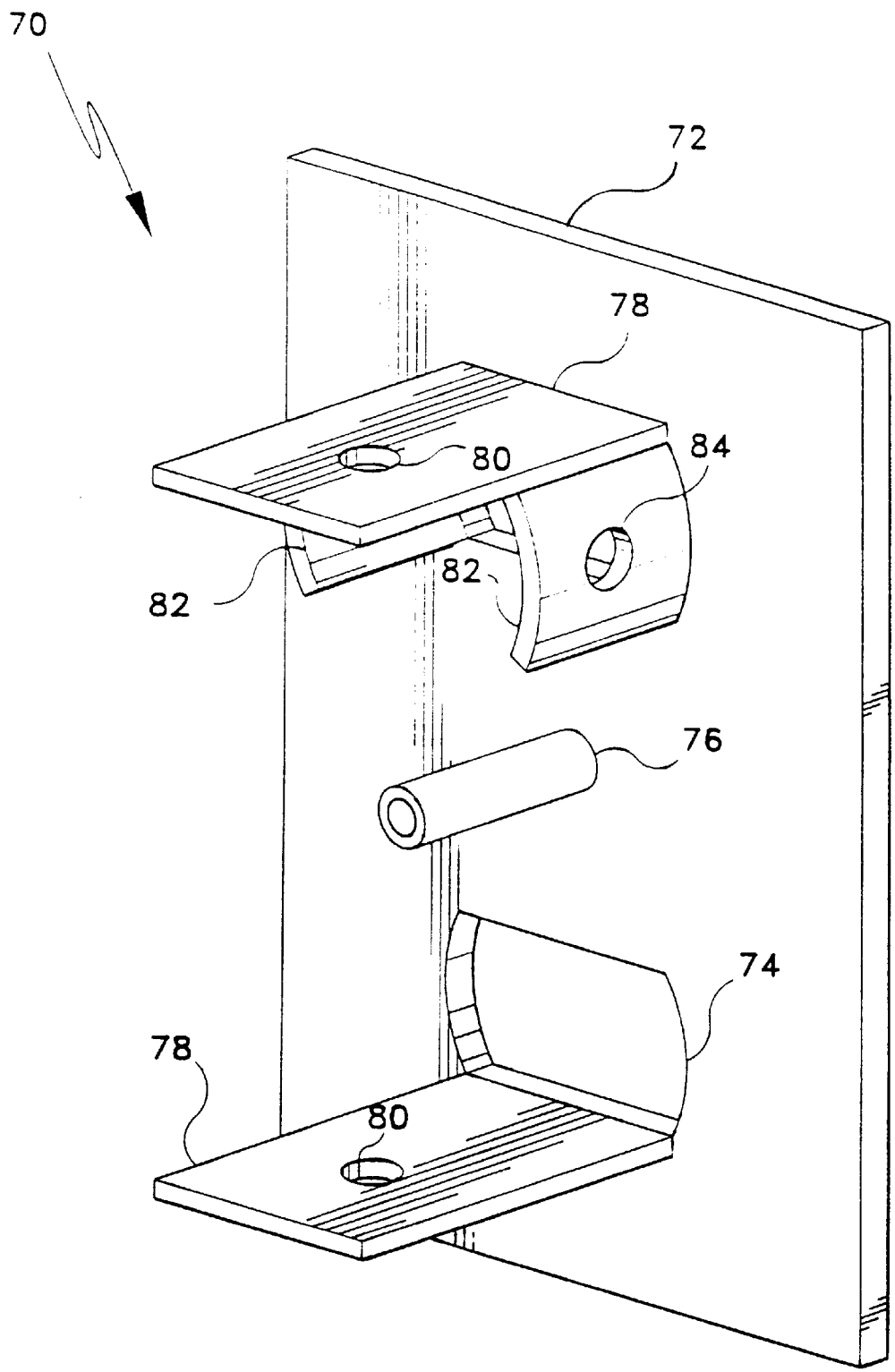
FIG. 4 is a front perspective view of a utility lock-out apparatus according to the present invention.

A utility lock-out apparatus 70 according to the invention for a power outlet assembly that integrates elements shown in FIGS. 1–3 is shown in FIG. 4. As shown, the utility lock-out apparatus 70 comprises a power outlet face plate 72 which includes two holes 74 defined therein, wherein each is configured and positioned for receiving a power outlet (not shown) therethrough. The power outlet face plate 72 also includes a centrally located hole 76 defined therein for receiving a fastening element (not shown), such as a screw, therethrough to provide a means for fastening the power outlet face plate 72 to a power outlet housing.

Of critical importance to the power outlet face plate 72 is the integration therein of four horizontally and vertically configured longitudinal elements 78,84 that extend from the surface of the power outlet face plate 72. Each longitudinal element 78,84 may be reinforced as desired by additional material at the surface of the power outlet face plate 72 to inhibit breakage of the longitudinal element 78,84 from the power outlet face plate 72. Each longitudinal element 78,84 extends for a desired distance above the surface of the power outlet face plate 72, wherein one horizontally oriented longitudinal element 78 extends from the top of the upper power outlet hole 74, one horizontally oriented longitudinal element 78 extends from the bottom of the lower power outlet hole 74, and the remaining two vertically oriented elements 82 oppose the right and left sides of the upper power outlet hole 74. The two vertically oriented longitudinal elements 82 could alternatively oppose the right and left sides of the lower power outlet hole 74. Each longitudinal element 78,84 also includes a hole 80,84 defined therein having a size configured for enabling a lock bar 804 of a conventional locking means 800, such as that shown in FIG. 32, to pass therethrough.

The power outlet face plate 72 may also include integrated therein a tubular element 76 that extends from the centrally located hole on the power outlet face plate 72 for a distance that is less than the position of each of the holes 80 present on each of the longitudinal elements 78. Such a tubular element 76 would be configured for receiving a fastening element (not shown), such as a screw, therethrough to provide a means for fastening the power outlet face plate 72 to a power outlet housing. Preferably, the hole 80 of each horizontally oriented longitudinal element 78 is located at a distance above the surface of the outlet face plate 72 that would preclude one from contacting a power outlet with the metal prongs of an electrical plug (not shown) when a lock bar means 804 of a conventional locking means 800 passes therethrough and the metal prongs of the electrical plug straddle the lock bar means 804. Preferably, the hole 84 of each vertically oriented longitudinal element 82 is located at a relatively small distance above the surface of the outlet face plate 72 that would preclude one from contacting a power outlet with the metal prongs of an electrical plug (not shown) when a lock bar means 804 of a conventional locking means 800 passes therethrough.

This particular utility lock out apparatus 70 provides the ability of a user to lock-out access to one or both power outlets. Obviously, such a utility lock-out apparatus 70 could include a number of power outlet holes 74 other than two, and could include longitudinal elements 78 at opposing sides of more than one power outlet hole. The power outlet face plate 72 may be made from any desirable material, such as metal, plastic, wood, etc., and maybe dimensioned according to the desires of the manufacturer.

Figure 5:
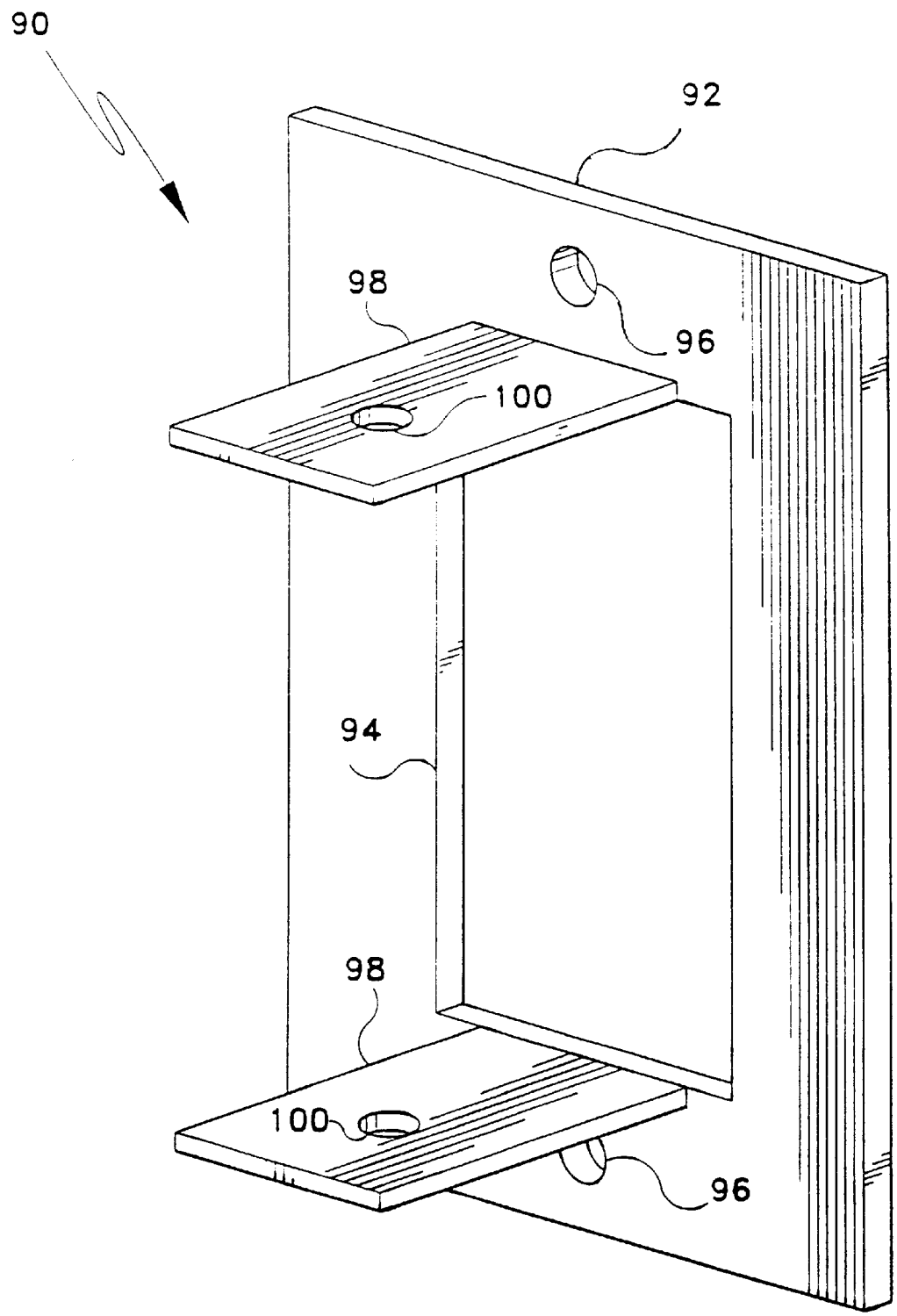
FIG. 5 is a front perspective view of a utility lock-out apparatus according to the present invention.

Another utility lock-out apparatus 90 according to the invention for a power outlet assembly is shown in FIG. 5. As shown, the utility lock-out apparatus 90 comprises a power outlet face plate 92 which includes one elongated rectangular hole 94 defined therein that is configured and positioned for receiving plural power outlets (not shown) therethrough. Obviously, the hole 94 may be configured in the form of any particular shape, such as a circle, a square, etc., according to the desires of the manufacturer. The power outlet face plate 92 also includes two holes 96 defined therein, wherein each is configured and positioned for receiving a fastening element (not shown), such as a screw, therethrough to provide a means for fastening the power outlet face plate 92 to a power outlet housing.

Of critical importance to the power outlet face plate 92 is the integration therein of two longitudinal elements 98 that extend from the surface of the power outlet face plate 92 at opposing sides of the power outlet hole 94. In this instance, the longitudinal elements 98 extend from the surface of the power outlet face plate 92 at upper and lower opposing sides of the power outlet hole 94. Each longitudinal element 98 may be reinforced as desired by additional material at the surface of the power outlet face plate 92 to inhibit breakage of the longitudinal element 98 from the power outlet face plate 92. Each longitudinal element 938 extends for a desired distance above the surface of the power outlet face plate 92. Each longitudinal element 98 also includes a hole 100 defined therein having a size configured for enabling a lock bar means 804 of a conventional locking means 800, such as that shown in FIG. 32, to-pass therethrough and the metal prongs of an electrical plug straddle the lock bar means 804.

Preferably, the holes 100 are each located at a distance above the surface of the outlet face plate 92 that would preclude one from contacting a power outlet with the metal prongs of an electrical plug (not shown) when a lock bar means 804 of a conventional locking means 800 passes therethrough and the metal prongs of the electrical plug straddle the lock bar means 804.

Obviously, the longitudinal elements 98 could be positioned on opposing left and right sides of the hole 94, appropriately positioned anywhere along the length of the hole 94 to enable a user to preclude access to one power outlet. In such a configuration, the hole 100 of each longitudinal element 98 would be preferably located at a relatively small distance above the surface of the outlet face plate 92 that would preclude one from contacting a power outlet with the metal prongs of an electrical plug (not shown) when a lock bar means 804 of a conventional locking means 800 passes therethrough.

This particular utility lock-out apparatus 90 provides the ability of a user to lock-out access to all power outlets for which the utility lock-out apparatus 90 is configured. The power outlet face plate 92 and longitudinal elements 98 may be made from any desirable material, such as metal, plastic, wood, etc., and may be dimensioned according to the desires of the manufacturer.

Figure 6:
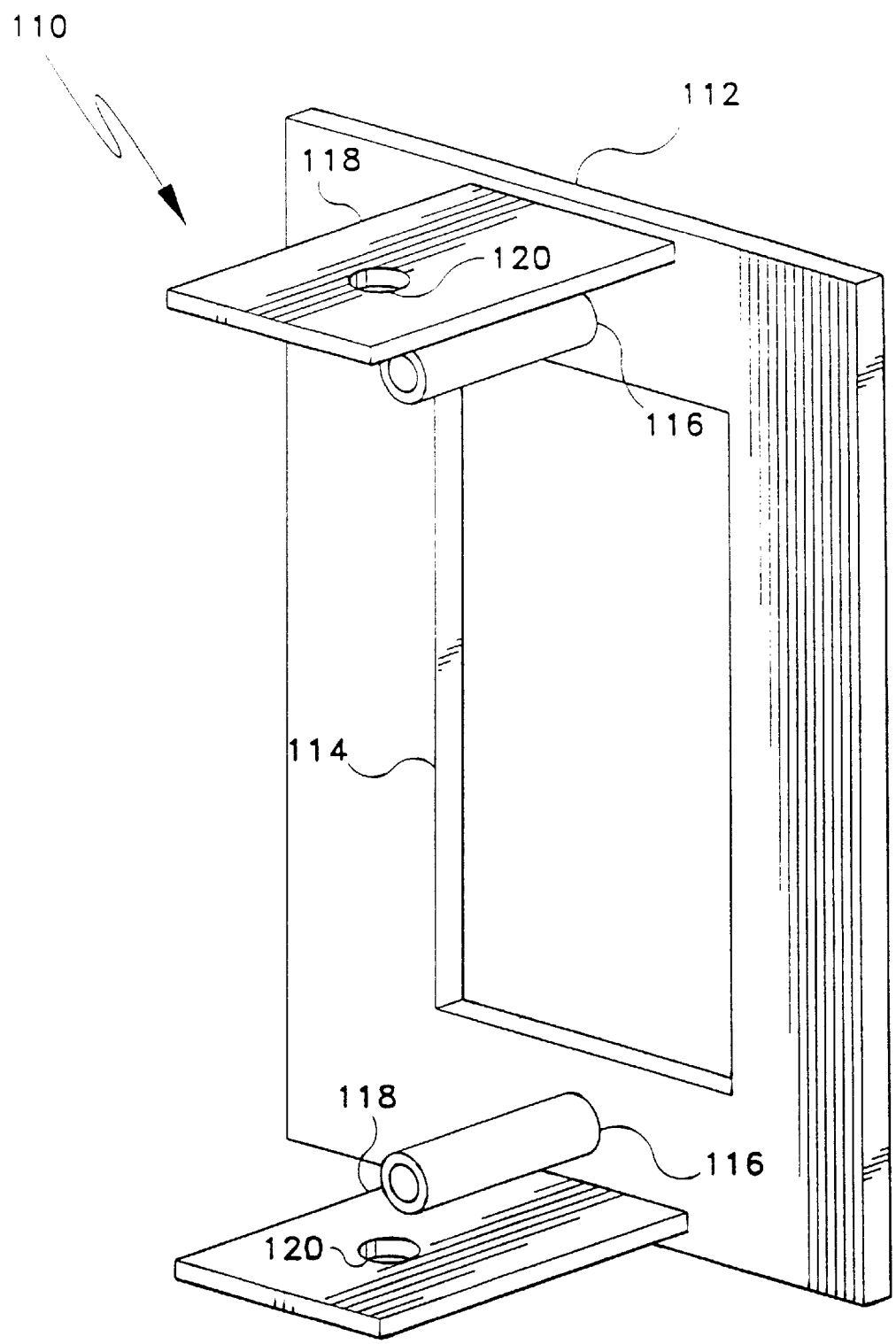
FIG. 6 is a front perspective view of a utility lock-out apparatus according to the present invention.

Another utility lock-out apparatus 110 according to the invention for a power outlet assembly is shown in FIG. 6. As shown, the utility lock-out apparatus 110 comprises a power outlet face plate 112 which includes one elongated rectangular hole 114 defined therein configured and positioned for receiving plural power outlets (not shown) therethrough. Obviously, the hole 114 may be configured in the form of any particular shape, such as a circle, a square, etc., according to the desires of the manufacturer. The power outlet face plate 112 also includes two holes (not shown) defined therein, wherein each is configured and positioned for receiving a fastening element (not shown), such as a screw, therethrough to provide a means for fastening the power outlet face plate 112 to a power outlet housing.

Of critical importance to the power outlet face plate 112 is the integration therein of two longitudinal elements 118 that extend from the surface of the power outlet face plate 112 at opposing sides of the power outlet hole 114. In this instance, the longitudinal elements 118 extend from the surface of the power outlet face plate 112 at upper and lower opposing sides of the power outlet hole 114, wherein the upper longitudinal element 118 is positioned above the upper fastening hole, and the lower longitudinal element 118 is positioned below the lower fastening hole. Each longitudinal element 118 may be reinforced as desired by additional material at the surface of the power outlet face plate 112 to inhibit breakage of the longitudinal element 118 from the power outlet face plate 112. Each longitudinal element 118 extends for a desired distance above the surface of the power outlet face plate 112. Each longitudinal element 118 also includes a hole 120 defined therein having a size configured for enabling a lock bar means 804 of a conventional locking means 800, such as that shown in FIG. 32, to pass therethrough. Preferably, the hole 120 is located at a distance above the surface of the outlet face plate 112 that would preclude one from contacting a power outlet with the metal prongs of an electrical plug (not shown) when a lock bar means 804 of a conventional locking means 800 passes therethrough and the metal prongs of the electrical plug straddle the lock bar means 804.

Obviously, the longitudinal elements 118 could be positioned on opposing left and right sides of the hole 114, appropriately positioned anywhere along the length of the hole 114 to enable a user to preclude access to one power outlet. In such a configuration, the hole 100 of each longitudinal element 118 would be preferably located at a relatively small distance above the surface of the outlet face plate 112 that would preclude one from contacting a power outlet with the metal prongs of an electrical plug (not shown) when a lock bar means 804 of a conventional locking means 800 passes therethrough.

The power outlet face plate 112 may also include integrated therein two tubular elements 116 that each extend from the associated hole on the power outlet face plate 112 for a distance that is less than the position of each of the holes 120 present on each of the longitudinal elements 118. Each tubular element 116 is configured for receiving a fastening element (not shown), such as a screw, therethrough to provide a means for fastening the power outlet face plate 116 to a power outlet housing.

This particular utility lock-out apparatus 110 provides the ability of a user to lock-out access to all power outlets for which the utility lock-out apparatus 110 is configured. The tubular elements 116 preclude the ability of someone from removing the face plate 112 merely by removing the fastening elements when a locking means is utilized. The power outlet face plate 112 and longitudinal elements 118 may be made from any desirable material, such as metal, plastic, wood, etc., and may be dimensioned according to the desires of the manufacturer.

Figure 7:
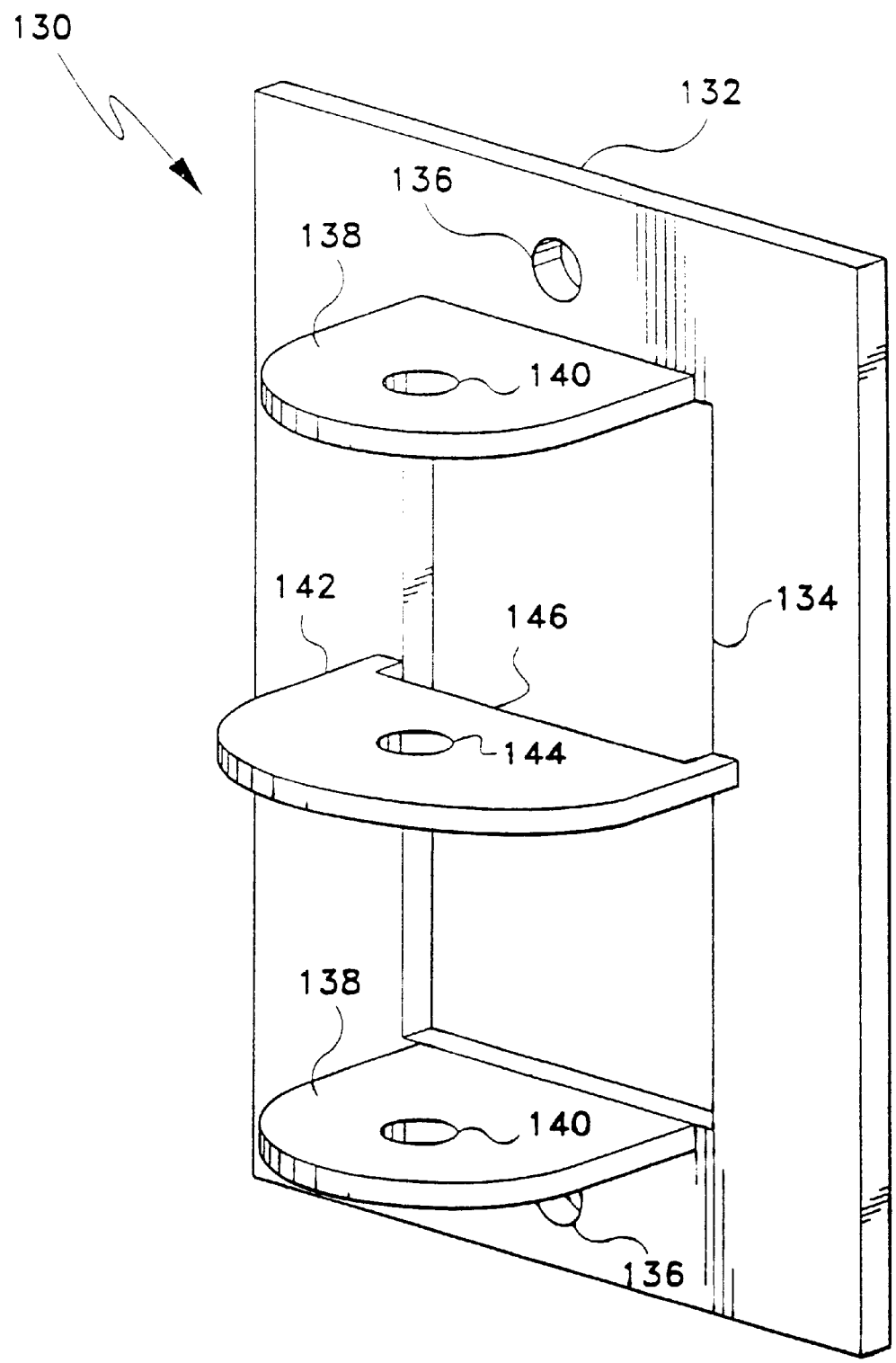
FIG. 7 is a front perspective view of a utility lock-out apparatus according to the present invention.

Another utility lock-out apparatus 130 according to the invention for a power outlet assembly is shown in FIG. 7. As shown, the utility lock-out apparatus 130 comprises a power outlet face plate 132 which includes one elongated rectangular hole 134 defined therein configured and positioned for receiving plural power outlets (not shown) therethrough. Obviously, the hole 134 may be configured in the form of any particular shape, such as a circle, a square, etc., according to the desires of the manufacturer. The power outlet face plate 132 also includes two holes 136 defined therein, wherein each is configured and positioned for receiving a fastening element (not shown), such as a screw, therethrough to provide a means for fastening the power outlet face plate 132 to a power outlet housing (not shown).

Of critical importance to the power outlet face plate 132 is the integration therein of at least two longitudinally elements 138,142. In FIG. 7, three longitudinal elements 138,142 are shown that extend from the surface of the power outlet face plate 132, wherein two longitudinal elements 138 extend from upper and lower sides of the power outlet hole 134, and one longitudinal element 142 extends from left and right sides portions of the power outlet hole 134. The longitudinal element 142 may be positioned anywhere along the length of the power outlet hole 134 according the desires of the manufacturer. The longitudinal element 142 may include a notch 146 dimensioned accordingly to permit passage of the surface of a power outlet housing which may protrude beyond the surface of the power outlet face plate 132 when the two are attached. Each longitudinal element 138,142 may be reinforced as desired by additional material at the surface of the power outlet face plate 132 to inhibit breakage of the longitudinal element 138,142 from the power outlet face plate 132. Obviously, such a configuration could alternatively employ one longitudinal element 138 at either the upper or lower side of the utility device hole, and one longitudinal element 142 which may be positioned anywhere along the length of the power outlet hole 134 according the desires of the manufacturer.

The longitudinal elements 138 are integrally connected to the power outlet face plate 132 at opposing upper and lower sides of the power face plate 132, as shown, and each extend for a desired distance above the surface of the power outlet face plate 132. Alternatively, the longitudinal elements 138 may extend from the surface of the power outlet face plate 132 at opposing upper and lower sides of the power outlet hole 134, wherein the upper longitudinal element 138 would be positioned above the upper fastening hole 136, and the lower longitudinal element 138 would be positioned below the lower fastening hole 136, as shown in FIG. 6, to accommodate the use of tubular elements (not shown) for the purposes described above. Such tubular elements would each extend from the associated hole on the power outlet face plate 132 for a distance that is less than the position of each of the holes 140,144 present on each of the longitudinal elements 138,142. Each tubular element would be configured for receiving a fastening element (not shown), such as a screw, therethrough to provide a means for fastening the power outlet face plate 136 to a power outlet housing.

The longitudinal element 142 is integrally connected to the power outlet face plate 132 at left and right side portions of the power outlet hole 134 of the power face plate 132, as shown, and extends for a desired distance above the surface of the power outlet face plate 132 that corresponds with the size of the longitudinal elements 138. Preferably, the longitudinal element 142 is positioned in the central area of the power outlet hole. However, the longitudinal element 142 may be positioned anywhere along the length of the power outlet hole 134 according the desires of the manufacturer. The longitudinal elements 138,142 may be configured as desired in a manner that enables a user to position the power outlet face plate 132 over a power outlet assembly that includes power outlets which protrude beyond the surface of the power outlet face plate 132. Each longitudinal element 138,142 includes a hole 140,144 defined therein having a size configured for enabling a lock bar means 804 of a conventional locking means 800, such as that shown in FIG. 32, to pass therethrough. Preferably, the hole 140,144 of each longitudinal element 138,142 is located at a distance above the surface of the power outlet face plate 132 that would preclude one from contacting a power outlet with the metal prongs of an electrical plug (not shown) when a lock bar means 804 of a conventional locking means 800 passes therethrough and the metal prongs of the electrical plug straddle the lock bar means 804.

This particular utility lock-out apparatus 130 provides the ability of a user to lock-out access to one or more power outlets for which the power outlet face plate 132 is configured. The use of tubular elements would preclude the ability of someone from removing the face plate 132 merely by removing the fastening elements when a locking means is utilized. The power outlet face plate 132 and longitudinal elements 138,142 may be made from any desirable material, such as metal, plastic, wood, etc., and may be dimensioned according to the desires of the manufacturer.

Figure 8:
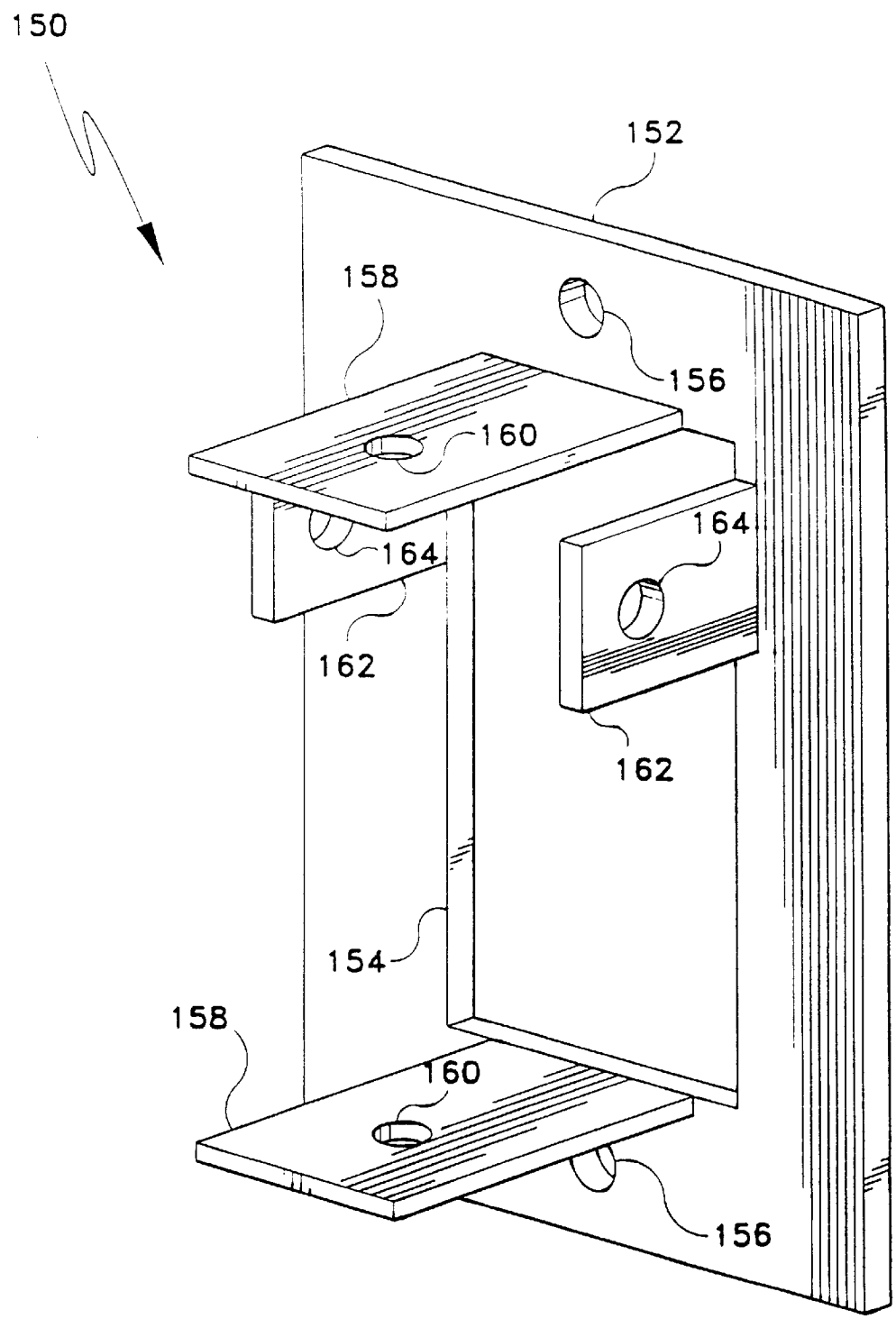
FIG. 8 is a front perspective view of a utility lock-out apparatus according to the present invention.

Another utility lock-out apparatus 150 according to the invention for a power outlet assembly is shown in FIG. 8. As shown, the utility lock-out apparatus 150 comprises a power outlet face plate 152 which includes one elongated rectangular hole 154 defined therein configured and positioned for receiving plural power outlets (not shown) therethrough. Obviously, the hole 154 may be configured in the form of any particular shape, such as a circle, a square, etc., according to the desires of the manufacturer. The power outlet face plate 152 may also include two holes 156 defined therein, wherein each is configured and positioned for receiving a fastening element (not shown), such as a screw, therethrough to provide a means for fastening the power outlet face plate 152 to a power outlet housing.

Of critical importance to the power outlet face plate 152 is the integration therein of four horizontally and vertically oriented longitudinal elements 158,162 that extend from the surface of the power outlet face plate 152, wherein two horizontally oriented longitudinal elements 158 extend from upper and lower sides of the power outlet hole 154, and two vertically oriented longitudinal elements 162 extend from opposing left and right side portions of the power outlet hole 154. In this case, the two vertically oriented longitudinal elements 162 extend from opposing upper left and right side portions of the power outlet hole 154. However, these vertically oriented longitudinal elements 162 could alternatively extend from opposing right and left side portions anywhere along the length of the power outlet hole 154. Each longitudinal element 158,162 may be reinforced by additional material at the surface of the power outlet face plate 152 to inhibit breakage of the longitudinal element 158,162 from the power outlet face plate 152. Each longitudinal element 158,162 extends for a desired distance above the surface of the power outlet face plate 152. Each longitudinal element 158,162 also includes 120 a hole having a size configured for enabling a lock bar means 804 of a conventional locking means 800, such as that shown in FIG. 32, to pass therethrough.

Preferably, the hole 160 of each horizontally oriented longitudinal element 158 is located at a distance above the surface of the outlet face plate 152 that would preclude one from contacting a power outlet with the metal prongs of an electrical plug (not shown) when a lock bar means 804 of a conventional locking means 800 passes therethrough and the metal prongs of the electrical plug straddle the lock bar means 804. Preferably, the hole 164 of each vertically oriented longitudinal element 162 is located at a distance above the surface of the outlet face plate 152 substantially close to the power outlet socket holes that would preclude one from contacting a power outlet with the metal prongs of an electrical plug (not shown) when a lock bar means 804 of a conventional locking means 800 passes therethrough.

This particular utility lock-out apparatus 150 provides the ability of a user to lock-out access to one or all power outlets for which the power outlet face plate 152 is configured. The power outlet face plate 152 and longitudinal elements 158, 162 may be made from any desirable material, such as metal, plastic, wood, etc., and may be dimensioned according to the desires of the manufacturer.

Figure 9:
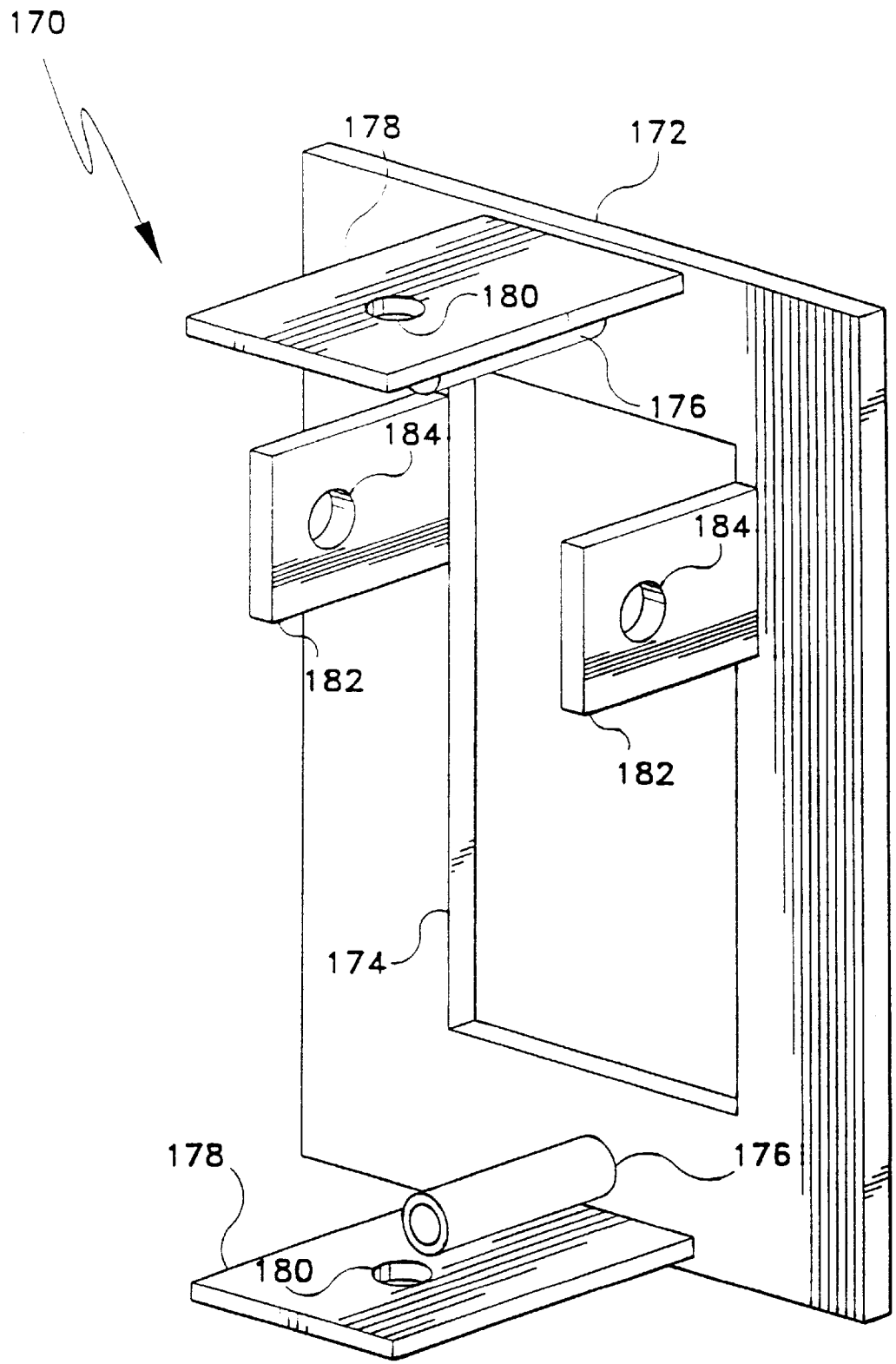
FIG. 9 is a front perspective view of a utility lock-out apparatus according to the present invention.

Another utility lock-out apparatus 170 according to the invention for a power outlet assembly is shown in FIG. 9. As shown, the utility lock-out apparatus 170 comprises a power outlet face plate 172 which includes one elongated rectangular hole 174 defined therein configured and positioned for receiving plural power outlets (not shown) therethrough. Obviously, the hole 174 may be configured in the form of any particular shape, such as a circle, a square, etc., according to the desires of the manufacturer. The power outlet face plate 172 may also include two holes (not shown) defined therein, wherein each is configured and positioned for receiving a fastening element (not shown), such as a screw, therethrough to provide a means for fastening the power outlet face plate 172 to a power outlet housing.

Of critical importance to the power outlet face plate 172 is the integration therein of four horizontally and vertically oriented longitudinal elements 178,182 that extend from the surface of the power outlet face plate 172, wherein two horizontally oriented longitudinal elements 178 extend from upper and lower sides of the power outlet hole 174, and two vertically oriented longitudinal elements 182 extend from opposing left and right side portions of the power outlet hole 184. In this case, the two vertically oriented longitudinal elements 182 extend from opposing upper left and right side portions of the power outlet hole 174. However, these vertically oriented longitudinal elements 182 could alternatively extend from opposing right and left side portions anywhere along the length of the power outlet hole 174. Each longitudinal element 178,182 may be reinforced by additional material at the surface of the power outlet face plate 172 to inhibit breakage of the longitudinal element 178,182 from the power outlet face plate 182. Each longitudinal element 178,182 extends for a desired distance above the surface of the power outlet face plate 182. Each longitudinal element 178,182 also includes a hole 180,184 defined therein having a size configured for enabling a lock bar means 804 of a conventional locking means 800, such as that shown in FIG. 32, to pass therethrough.

Preferably, the hole 180 of each longitudinal element 178 is located at a distance above the surface of the outlet face plate 172 that would preclude one from contacting a power outlet with the metal prongs of an electrical plug (not shown) when a lock bar means 804 of a conventional locking means 800 passes therethrough and the metal prongs of the electrical plug straddle the lock bar means 804. Preferably, the hole 184 of each longitudinal element 182 is located at a distance above the surface of the outlet face plate 172 substantially close to the power outlet socket holes that would preclude one from contacting a power outlet with the metal prongs of an electrical plug (not shown) when a lock bar means 804 of a conventional locking means 800 passes therethrough and the metal prongs of the electrical plug come into contact with the lock bar means 804. The power outlet face plate 172 may also include integrated therein two tubular elements 176 that each extend from the associated hole on the power outlet face plate 172 for a distance that is less than the position of each of the holes 180 present on each of the longitudinal elements 178. Each tubular element 176 is configured for receiving a fastening element (not shown), such as a screw, therethrough to provide a means for fastening the power outlet face plate 176 to a power outlet housing.

This particular utility lock-out apparatus 170 provides the ability of a user to lock-out access to one or all power outlets for which the power outlet face plate 172 is configured. The tubular elements 176 preclude the ability of someone from removing the face plate 172 merely by removing the fastening elements when a locking means is utilized. The power outlet face plate 172 and longitudinal elements 178,182 may be made from any desirable material, such as metal, plastic, wood, etc., and may be dimensioned according to the desires of the manufacturer.

Figure 10:
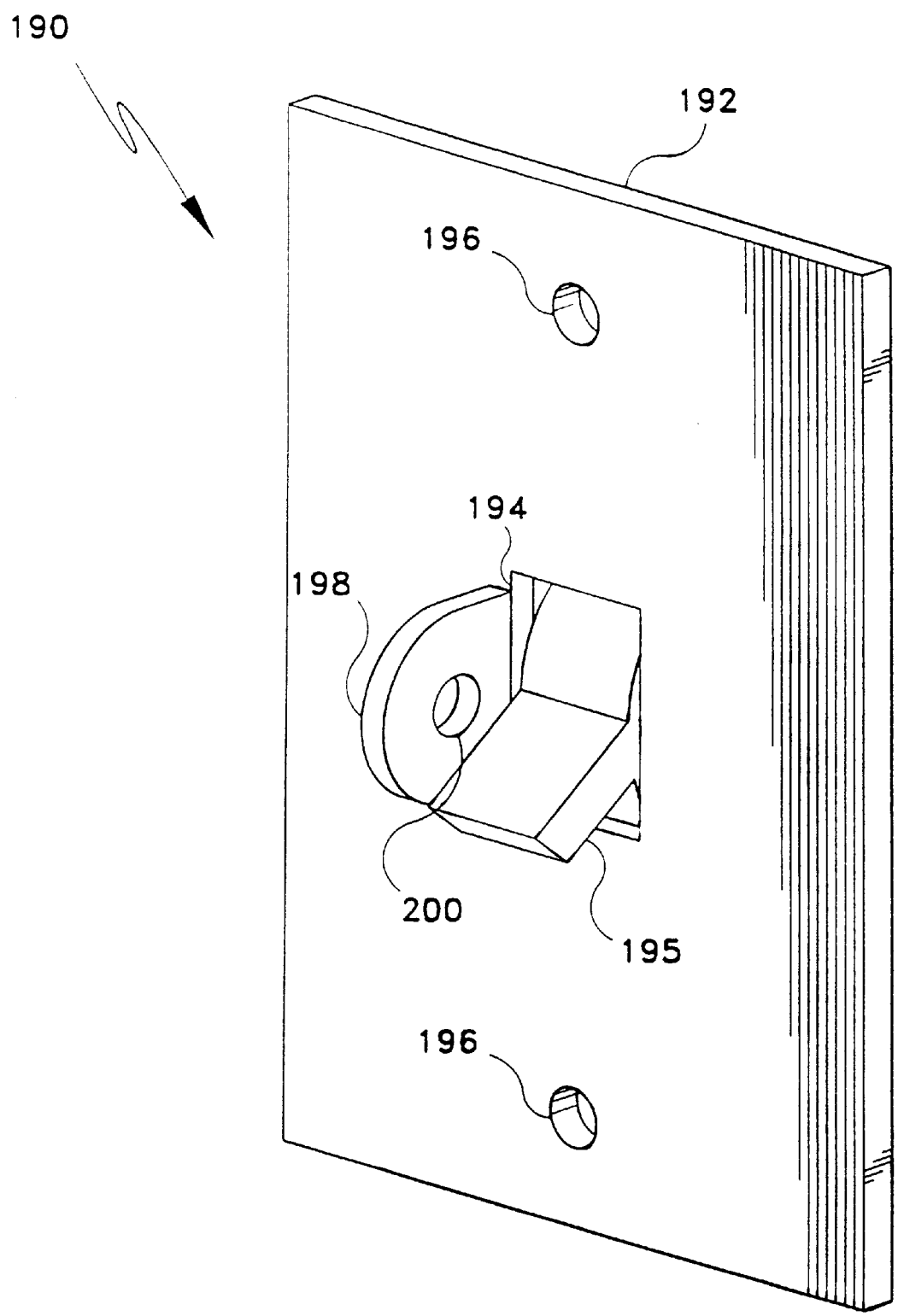
FIG. 10 is a front perspective view of a utility lock-out apparatus according to the present invention.

Another utility lock-out apparatus 190 according to the invention for an electrical switch assembly is shown in FIG. 10. As shown, the utility lock-out apparatus 190 comprises an electrical switch face plate 192 which includes one rectangular hole 194 defined therein configured and positioned for receiving an electrical switch 195 therethrough.

The electrical switch face plate 192 may also include two holes 196 defined therein, wherein each is configured for receiving a fastening element (not shown), such as a screw, therethrough to provide a means for fastening the electrical switch face plate 192 to an electrical switch housing. Of critical importance to the electrical switch face plate 192 is the integration therein of a longitudinal element 198 that extends from the surface of the electrical switch face plate 192 at one side of the electrical switch hole 194.

In this case the longitudinal element 198 is positioned on the left of the electrical switch hole 194. Alternatively, the longitudinal element 198 may be positioned on the right of the electrical switch hole 194. Preferably, the longitudinal element 198 is positioned flush with the hole 194, however, this is considered to be a matter of design according to the manufacturer. The longitudinal element 198 may be reinforced as desired by additional material at the surface of the electrical switch face plate 192 to inhibit breakage of the longitudinal element 198 from the electrical switch face plate 192. The longitudinal element 198 extends for a desired distance above the surface of the electrical switch face plate 192. The longitudinal element 198 also includes a hole 200 defined therein having a size configured for enabling a lock bar means 804 of a conventional locking means 800, such as that shown in FIG. 32, to pass therethrough. Preferably, the hole 200 of the longitudinal element 198 is located at a distance above the surface of the electrical switch face plate 192 substantially close to the electrical switch hole 194 that enables passage of a lock bar means 804 of a conventional locking means 800 therethrough to secure the electrical switch 195 in either the ON position or the OFF position.

Figure 13:
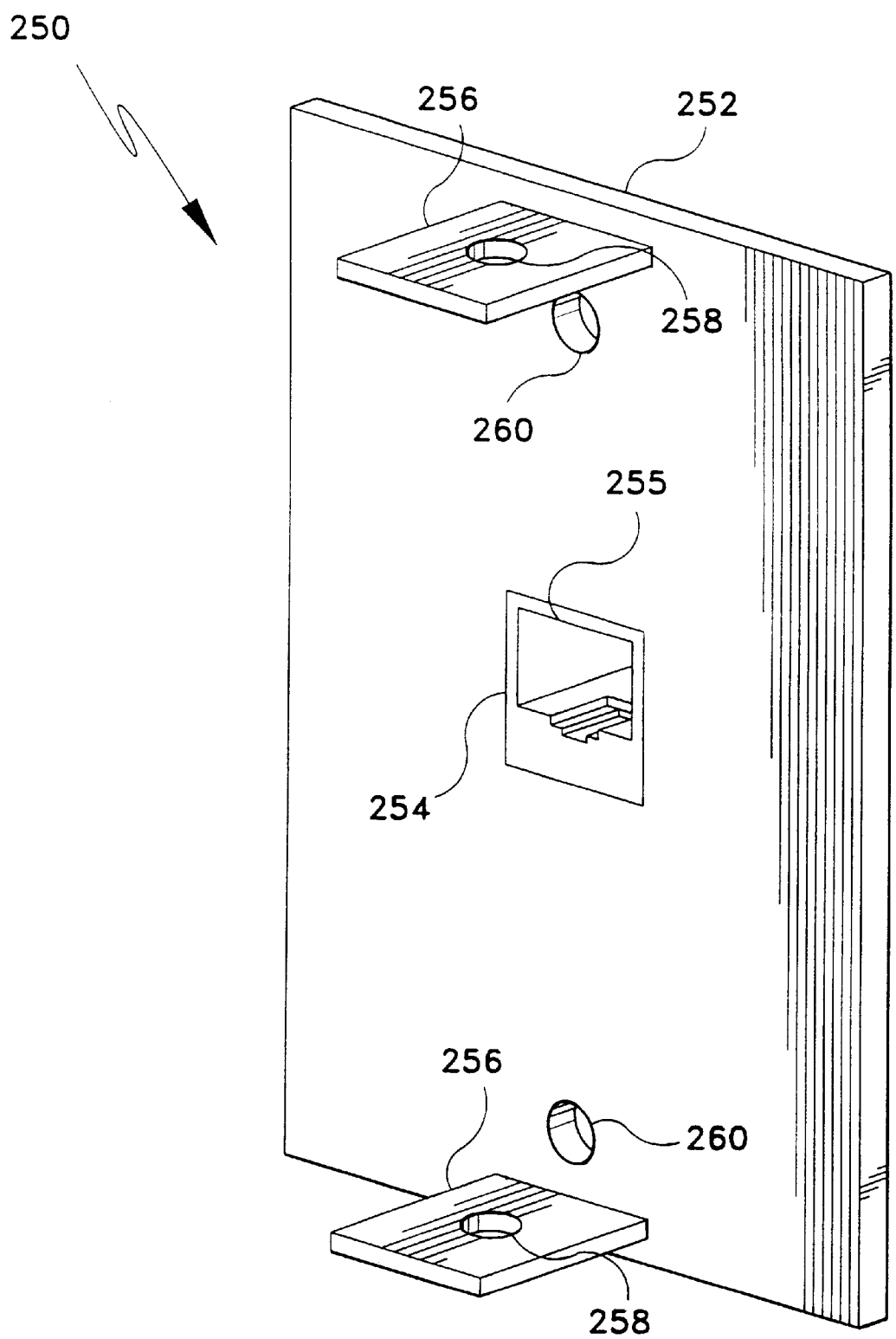
FIG. 13 is a front perspective view of a utility lock-out apparatus according to the present invention.
Figure 14:
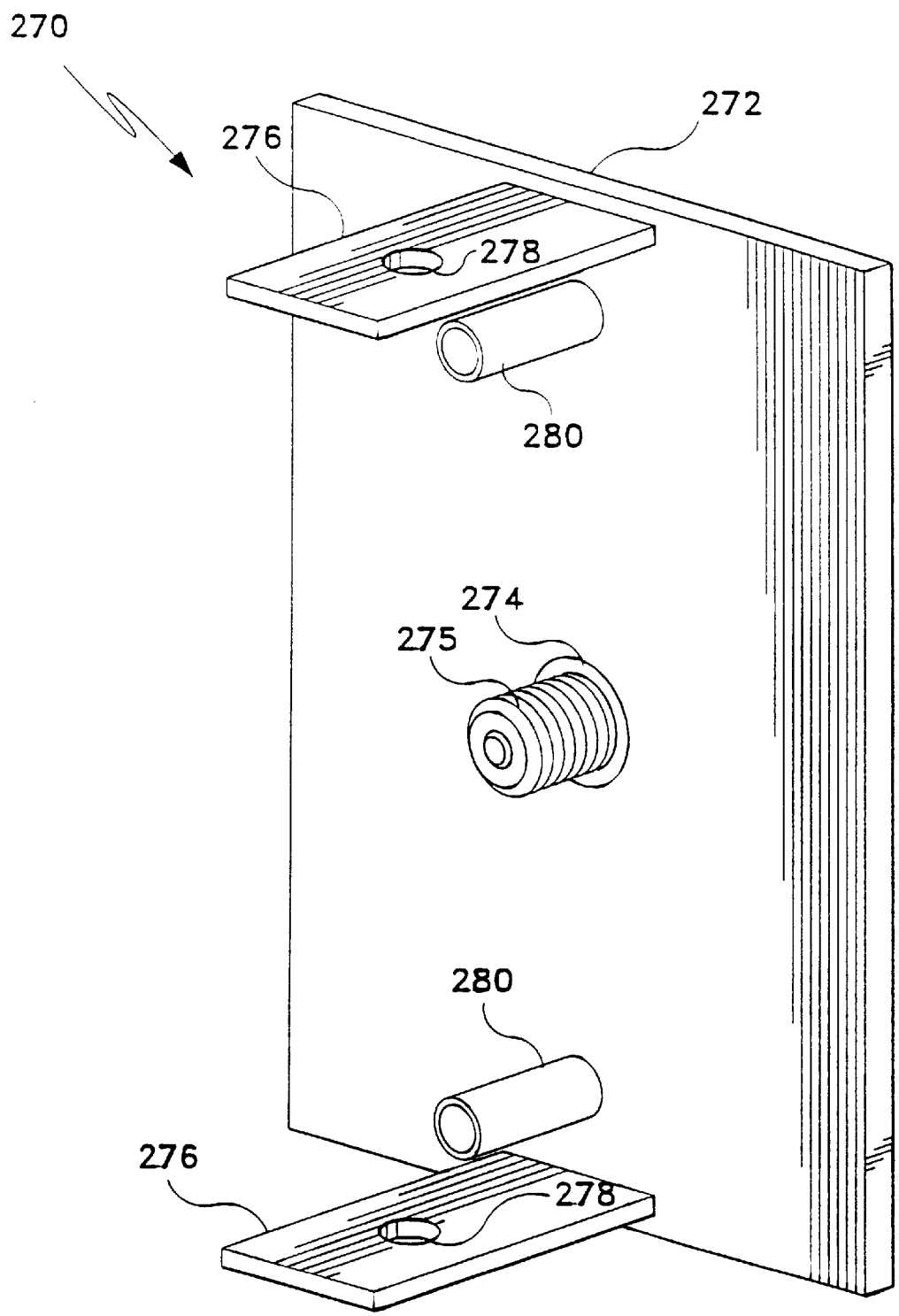
FIG. 14 is a front perspective view of a utility lock-out apparatus according to the present invention.

This particular electrical switch face plate 192 provides the ability of a user to lock the electrical switch 195 in either the ON position or the OFF position. Obviously, such a utility lock out apparatus 190 could include a number of electrical switch holes 194 and a corresponding number of longitudinal elements 198 other than one. In addition, this particular electrical switch face plate 192 could also be configured as a face plate for either a communication outlet or a cable outlet, as shown in FIGS. 13 and 14. In such configurations, the longitudinal element could be positioned on either the left side, right side, upper side, or lower side of the communication outlet hole or cable outlet hole. The electrical switch face plate 192 and the longitudinal element 198 may be made from any desirable material, such as metal, plastic, wood, etc., and may be dimensioned according to the desires of the manufacturer.

Figure 11:
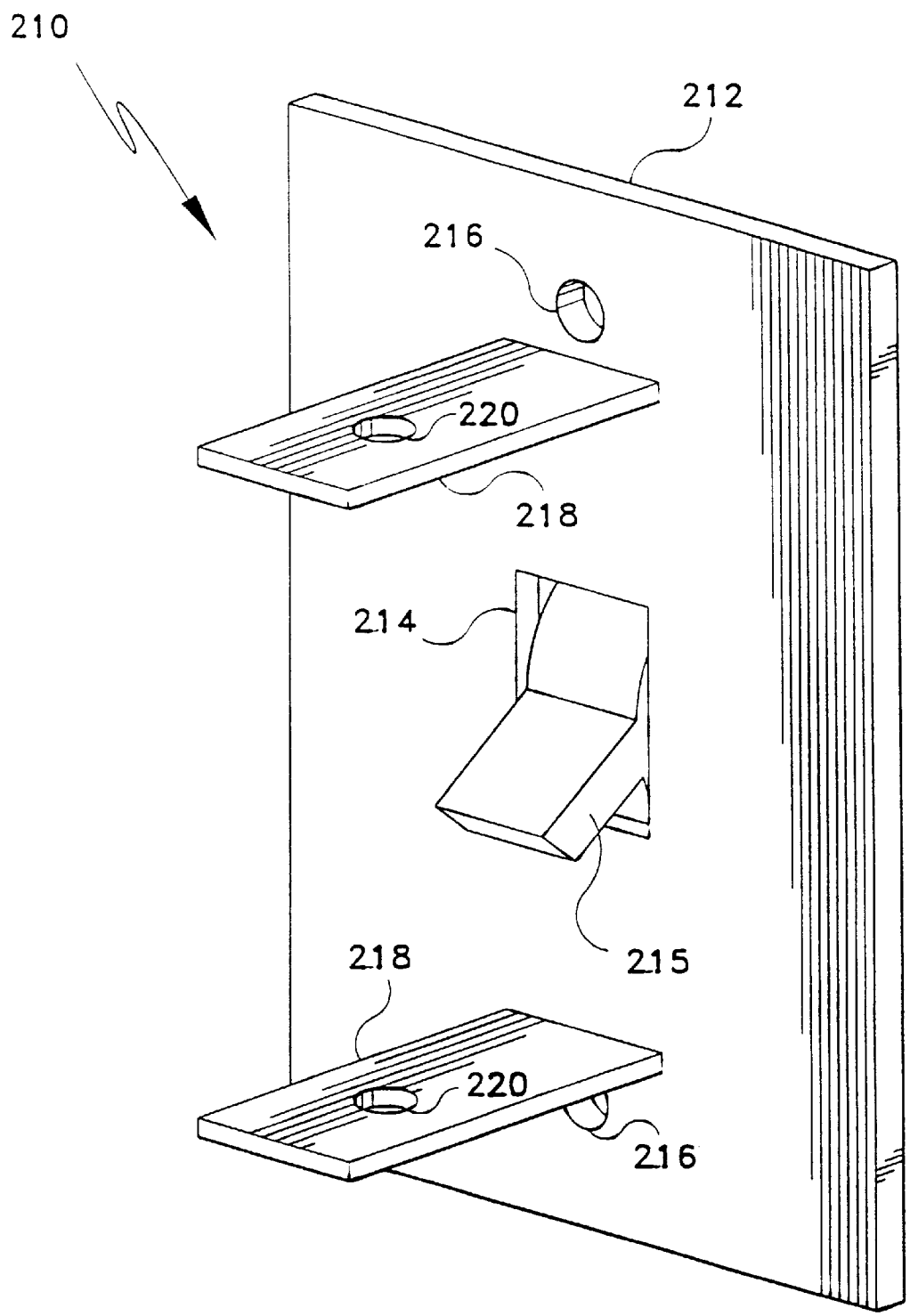
FIG. 11 is a front perspective view of a utility lock-out apparatus according to the present invention.

Another utility lock-out apparatus 210 according to the invention for an electrical switch assembly is shown in FIG. 11. As shown, the utility lock-out apparatus 210 comprises an electrical switch face plate 212 which includes one rectangular hole 214 configured and positioned for receiving an electrical switch 215 therethrough. The electrical switch face plate 212 may also include two holes 216 defined therein, wherein each hole 216 is configured for receiving a fastening element (not shown), such as a screw, therethrough to provide a means for fastening the electrical switch face plate 212 to an electrical switch housing.

Of critical importance to the electrical switch face plate 212 is the integration therein of two longitudinal elements 218 that extend from the surface of the electrical switch face plate 212 at upper and lower opposing sides of the electrical switch hole 214. In this case the upper longitudinal element 218 is positioned below the upper fastening hole 216, and the lower longitudinal element 218 is positioned above the lower fastening hole 216. Each longitudinal element 218 may be reinforced as desired by additional material at the surface of the electrical switch face plate 212 to inhibit breakage of the longitudinal elements 218 from the electrical switch face plate 212. Each longitudinal element 218 extends for a desired distance above the surface of the electrical switch face plate 212. Each longitudinal element 218 also includes a hole 220 defined therein having a size configured for enabling a lock bar means 804 of a conventional locking means 800, such as that shown in FIG. 32, to pass therethrough. Preferably, the hole 220 of each longitudinal element 218 is located at a distance above the surface of the electrical switch face plate 212 that enables passage of a lock bar means 804 of a conventional locking means 800 therethrough to secure the electrical switch 215 in either the ON position or the OFF position.

This particular electrical switch face plate 212 provides the ability of a user to lock the electrical switch 215 in either the ON position or the OFF position. Obviously, such a utility lock out apparatus 210 could include a number of electrical switch holes 214 other than one. In addition, this particular electrical switch face plate 212 could also be configured as a face plate for either a communication outlet or a cable outlet, as shown in FIGS. 13 and 14. The electrical switch face plate 212 and the longitudinal element 218 may be made from any desirable material, such as metal, plastic, wood, etc., and may be dimensioned according to the desires of the manufacturer.

Figure 12:
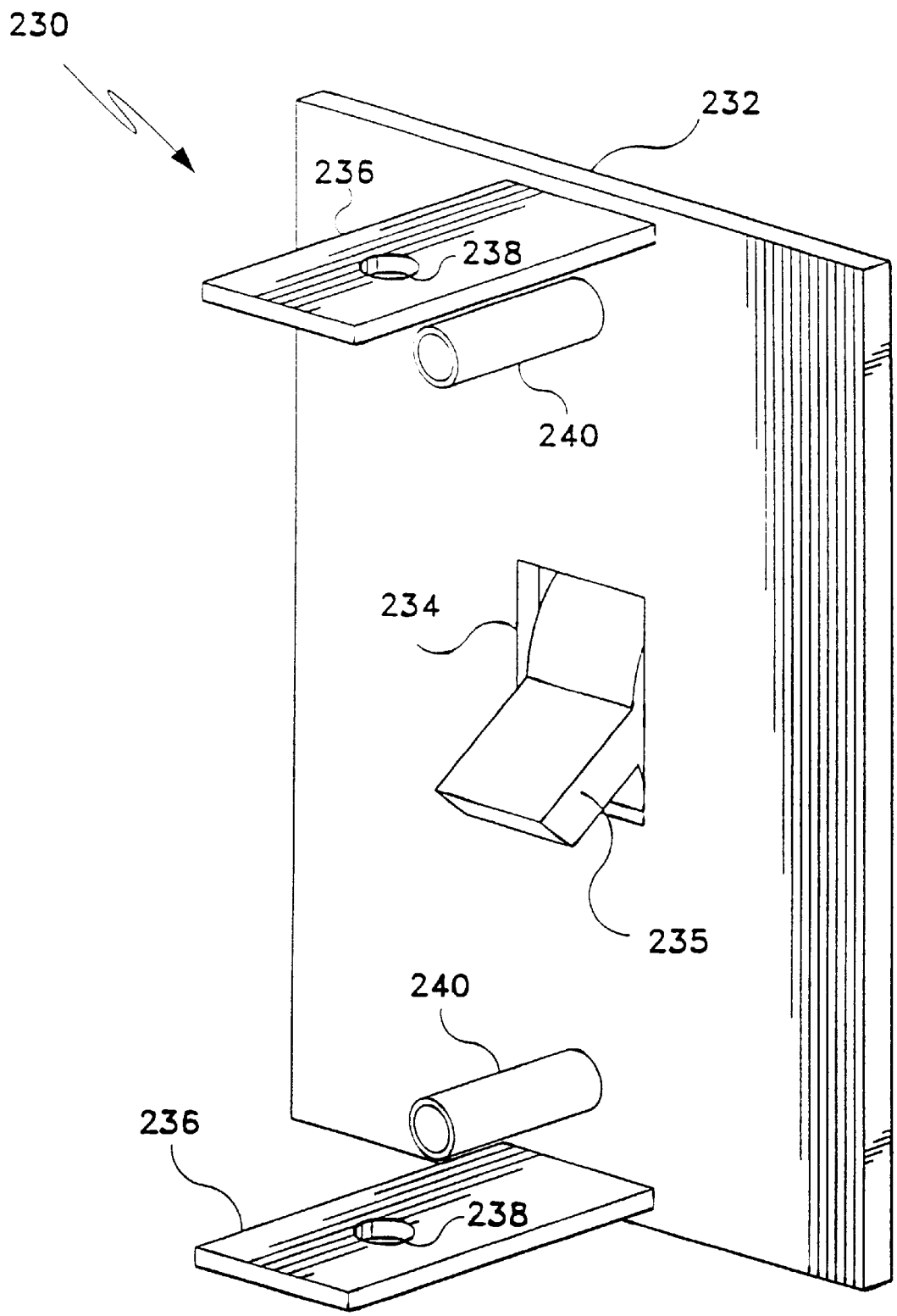
FIG. 12 is a front perspective view of a utility lock-out apparatus according to the present invention.

Another utility lock-out apparatus 230 according to the invention for an electrical switch assembly is shown in FIG. 12. As shown, the utility lock-out apparatus 230 comprises an electrical switch face plate 232 which includes one rectangular hole 234 configured and positioned for receiving an electrical switch therethrough. The electrical switch face plate 232 may also include two holes (not shown) defined therein, wherein each would be configured for receiving a fastening element (not shown), such as a screw, therethrough to provide a means for fastening the electrical switch face plate 232 to an electrical switch housing.

Of critical importance to the electrical switch face plate 232 is the integration therein of two longitudinal elements 236 that extend from the surface of the electrical switch face plate 232 at upper and lower opposing sides of the electrical switch hole 234. In this case the upper longitudinal element 236 is positioned above the upper fastening hole, and the lower longitudinal element 236 is positioned below the lower fastening hole. Each longitudinal element 236 may be reinforced as desired by additional material at the surface of the electrical switch face plate 232 to inhibit breakage of the longitudinal element 236 from the electrical switch face plate 232. Each longitudinal element 236 extends for a desired distance above the surface of the electrical switch face plate 232. Each longitudinal element 236 also includes a hole 234 defined therein having a size configured for enabling a lock bar means 804 of a conventional locking means 800, such as that shown in FIG. 32, to pass therethrough. The electrical switch face plate 232 also includes two integrally incorporated longitudinal tubular elements 240 that extend from the surface of the electrical switch face plate 232 at each fastening hole for a distance that is slightly smaller than the longitudinal distance to the holes 238 on each of the longitudinal elements 236 described above.

This particular utility lock-out apparatus 230 provides the ability of a user to lock the electrical switch in either the ON position or the OFF position. This particular utility lock-out apparatus 230 also prohibits one from removing the face plate 232 from the electrical switch housing by merely removing the fastening elements through the inclusion of the longitudinal tubular elements 240 therein. In addition, this particular electrical switch face plate 232 could also be configured as a face plate for either a communication outlet or a cable outlet, as shown in FIGS. 13 and 14. Obviously, such a utility lock-out apparatus 230 could include a number of electrical switch holes 234 other than one. The electrical switch face plate 232, the longitudinal elements 236, and the longitudinal tubular elements 240 may be made from any desirable material, such as metal, plastic, wood, etc., and may be dimensioned according to the desires of the manufacturer.

Another utility lock-out apparatus 250 according to the invention for a communication outlet assembly is shown in FIG. 13. As shown, the utility lock-out apparatus 250 comprises a communication outlet face plate 252 which includes one rectangular hole 254 defined therein configured and positioned for receiving a communication outlet 255 therethrough. The rectangular hole 254 could alternatively be shaped in the form of a twelve sided polygon configured and positioned for receiving a communication plug therethrough. Such a communication outlet 255 is capable of receiving communication data from devices such as telephones, computers, facsimile machines, and the like. The communication outlet face plate 252 also includes two holes 260 defined therein, wherein each is configured for receiving a fastening element (not shown), such as a screw, therethrough to provide a means for fastening the communication outlet face plate 252 to a communication outlet housing.

Of critical importance to the communication outlet face plate 252 is the integration therein of two longitudinal elements 256 that extend from the surface of the communication outlet face plate 252 at upper and lower opposing sides of the communication outlet 255. In this case the upper longitudinal element 256 is positioned above the upper fastening hole 260, and the lower longitudinal element 258 is positioned below the lower fastening hole 256. Each longitudinal element 258 may be reinforced as desired by additional material at the surface of the communication outlet face plate 252 to inhibit breakage of the longitudinal elements 256 from the communication outlet face plate 252. Each longitudinal element 256 extends for a desired distance above the surface of the communication outlet face plate 252. Each longitudinal element 256 also includes a hole 258 defined therein having a size configured for enabling a lock bar means 804 of a conventional locking means 800, such as that shown in FIG. 32, to pass therethrough. Preferably, the hole 258 of each longitudinal element 256 is located at a distance above the surface of the communication outlet face plate 252 substantially close to the surface of the communication outlet 255 that would preclude one from contacting the communication outlet 255 with a communication plug (not shown) when a lock bar means 804 of a conventional locking means 800 passes therethrough and the communication plug comes into contact with the lock bar means 804.

This particular communication outlet face plate 232 provides the ability of a user to preclude the use of the communication outlet 255. Obviously, such a utility lock-out apparatus 250 could include a number of communication outlet holes other than one. The communication outlet face plate 252 and the longitudinal element 258 may be made from any desirable material, such as metal, plastic, wood, etc., and may be dimensioned according to the desires of the manufacturer.

Another utility lock-out apparatus 270 according to the invention for a cable outlet assembly is shown in FIG. 14. As shown, the utility lock-out apparatus 270 comprises a cable outlet face plate 272 which includes one circular hole 274 defined therein configured and positioned for receiving a cable outlet 275 therethrough. The cable outlet face plate 272 may also include two holes (not shown) defined therein, wherein each would be configured for receiving a fastening element (not shown), such as a screw, therethrough to provide a means for fastening the cable outlet face plate 272 to a cable outlet housing.

Of critical importance to the cable outlet face plate 272 is the integration therein of two longitudinal elements 276 that extend from the surface of the cable outlet face plate 272 at upper and lower opposing sides of the cable outlet hole 274. In this case the upper longitudinal element 276 is positioned above the upper fastening hole, and the lower longitudinal element 276 is positioned below the lower fastening hole. Each longitudinal element 276 may be reinforced as desired by additional material at the surface of the cable outlet face plate 272 to inhibit breakage of the longitudinal element 276 from the cable outlet face plate 272. Each longitudinal element 276 extends for a desired distance above the surface of the cable outlet face plate 272. Each longitudinal element 276 also includes a hole 278 defined therein having a size configured for enabling a lock bar means 804 of a conventional locking means 800, such as that shown in FIG. 32, to pass therethrough.

The cable outlet face plate 272 may also include two integrally incorporated longitudinal tubular elements 280 that extend from the surface of the cable outlet face plate 272 at each fastening hole for a distance that is slightly smaller than the longitudinal distance to the holes 278 on each of the longitudinal elements 276 described above. Preferably, the hole 278 of each longitudinal element 276 is located at a distance above the surface of the communication outlet face plate 272 substantially close to the surface of the cable outlet 275 that would preclude one from contacting the cable outlet 275 with a cable plug (not shown) when a lock bar means 804 of a conventional locking means 800 passes therethrough and the cable plug comes into contact with the lock bar means 804.

This particular cable outlet face plate 272 provides the ability of a user to preclude use of the cable outlet 275. This particular utility lock-out apparatus 270 also prohibits one from removing the cable outlet face plate 272 from the cable outlet housing by removing the fastening elements through the inclusion of the longitudinal tubular elements 280 therein. Obviously, such a utility lock-out apparatus 270 could include a number of cable outlet holes 274 other than one. The cable outlet face plate 272, the longitudinal elements 276, and the longitudinal tubular elements 280 may be made from any desirable material, such as metal, plastic, wood, etc., and may be dimensioned according to the desires of the manufacturer.

Figure 15:
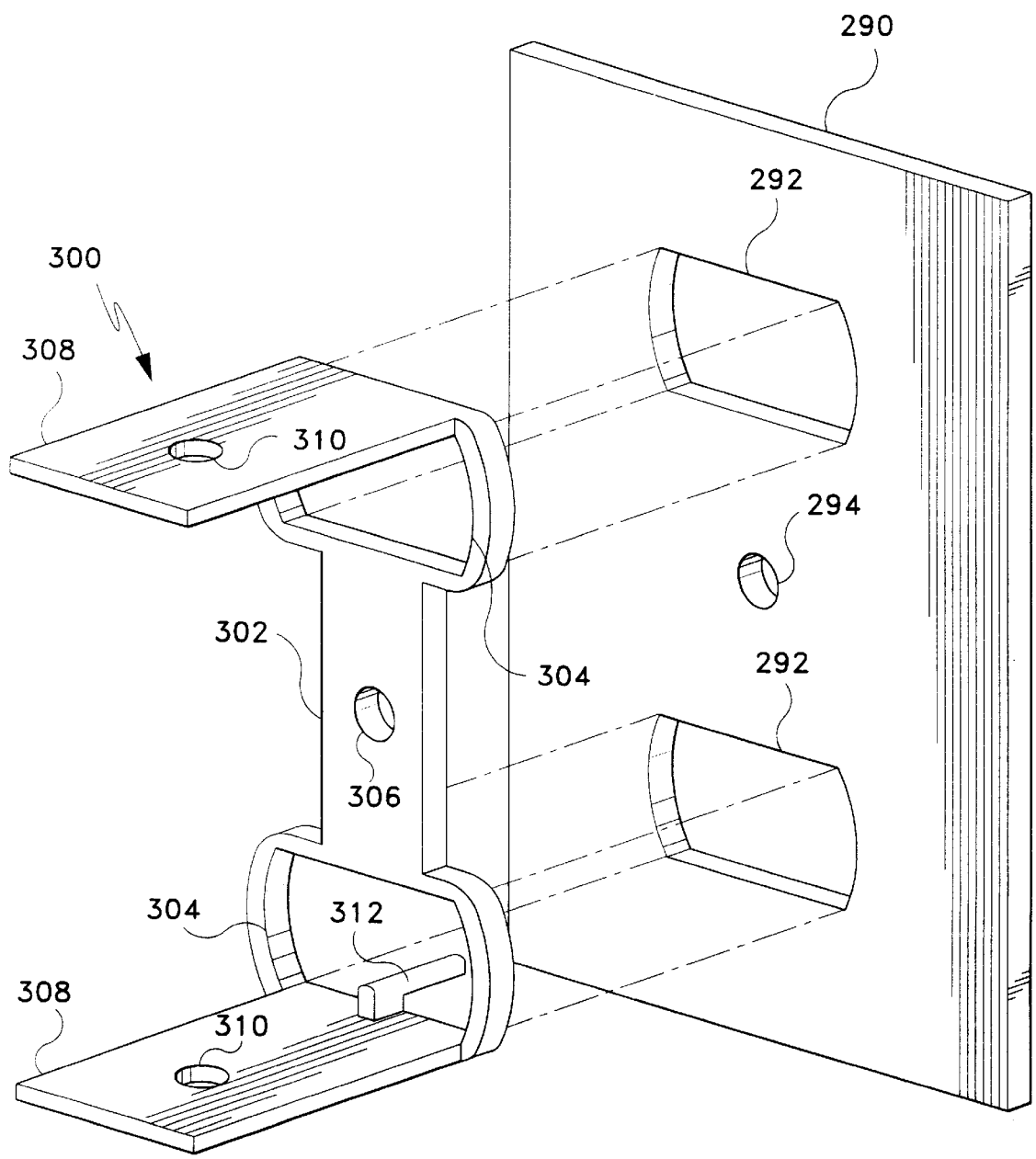
FIG. 15 is a front perspective view of a utility lock-out apparatus according to the present invention.

Another utility lock-out apparatus 300 according to the invention for a power outlet assembly is shown in FIG. 15. As shown, the utility lock-out apparatus 300 comprises a power outlet attachment 300 for attachment to a conventional power outlet face plate 290 which includes two holes 292 defined therein, wherein each is configured and positioned for receiving a power outlet (not shown) therethrough. The conventional power outlet face plate 290 also includes a centrally located hole 294 for receiving a fastening element (not shown), such as a screw, therethrough to provide a means for fastening the conventional power outlet face plate 290 to a power outlet housing.

The power outlet attachment 300 comprises a base element 302 which includes two holes 304 defined therein, wherein each is configured and positioned for receiving a power outlet (not shown) therethrough. The base element 302 also includes a centrally located hole 306 defined therein for receiving a fastening element (not shown), such as a screw, therethrough to provide a means for fastening the power outlet attachment 300 to the conventional power outlet face plate 290. The base element 302 additionally includes two integrally configured longitudinal elements 308 that extend from the surface of the base element 302 at opposing upper and lower sides of the upper and lower power outlet holes 304. In this instance, the longitudinal elements 308 extend from the surface of the power outlet attachment 302 at opposing upper and lower sides of the upper and lower power outlet hole 304. Each longitudinal element 308 extends for a desired distance above the surface of the base element 302.

The longitudinal element 308 on the lower side of the lower power outlet hole 304 may additionally include a rearwardly extending extension element 312. Such a rearwardly extending extension element 312 would be configured for being inserted into the ground plug hole of a conventional power outlet to preclude the ability of one from rotating the power outlet attachment 300 when the power outlet attachment 300 is attached to the conventional power outlet face plate 290. Each longitudinal element 308 also includes a hole 310 defined therein having a size configured for enabling a lock bar means 804 of a conventional locking means 800, such as that shown in FIG. 32, to pass therethrough. Preferably, the hole 310 of each longitudinal element 308 is located at a distance above the surface of the base element 302 that would preclude one from contacting a power outlet with the metal prongs of an electrical plug (not shown) when a lock bar means 804 of a conventional locking means 800 passes therethrough.

Obviously, the longitudinal elements 308 could alternatively be positioned on opposing right and left sides of either of the power outlet holes 304. In such a configuration, the hole 310 of each longitudinal element 308 would be preferably located at a relatively small distance above the surface of the outlet attachment 302 that would preclude one from contacting a power outlet with the metal prongs of an electrical plug (not shown) when a lock bar means 804 of a conventional locking means 800 passes therethrough and the metal prongs of the electrical plug straddle the lock bar means 804.

This particular utility lock-out apparatus 300 provides the ability of a user to conveniently lock-out access to both power outlets by attaching the power outlet attachment to the conventional power outlet face plate 290 and passing a lock bar means 804 of a conventional locking means 800 through the holes 310 present on each of the longitudinal elements 308. Obviously, such a utility lock-out apparatus 300 could include a number of power outlet holes 304 other than two, and could include longitudinal elements 308 providing the ability of a user to lock-out access to more than two power outlets, such as on a conventional power outlet strip. The power outlet attachment 300 may be made from any desirable material, such as metal, plastic, wood, etc., and may be dimensioned according to the desires of the manufacturer.

Figure 16:
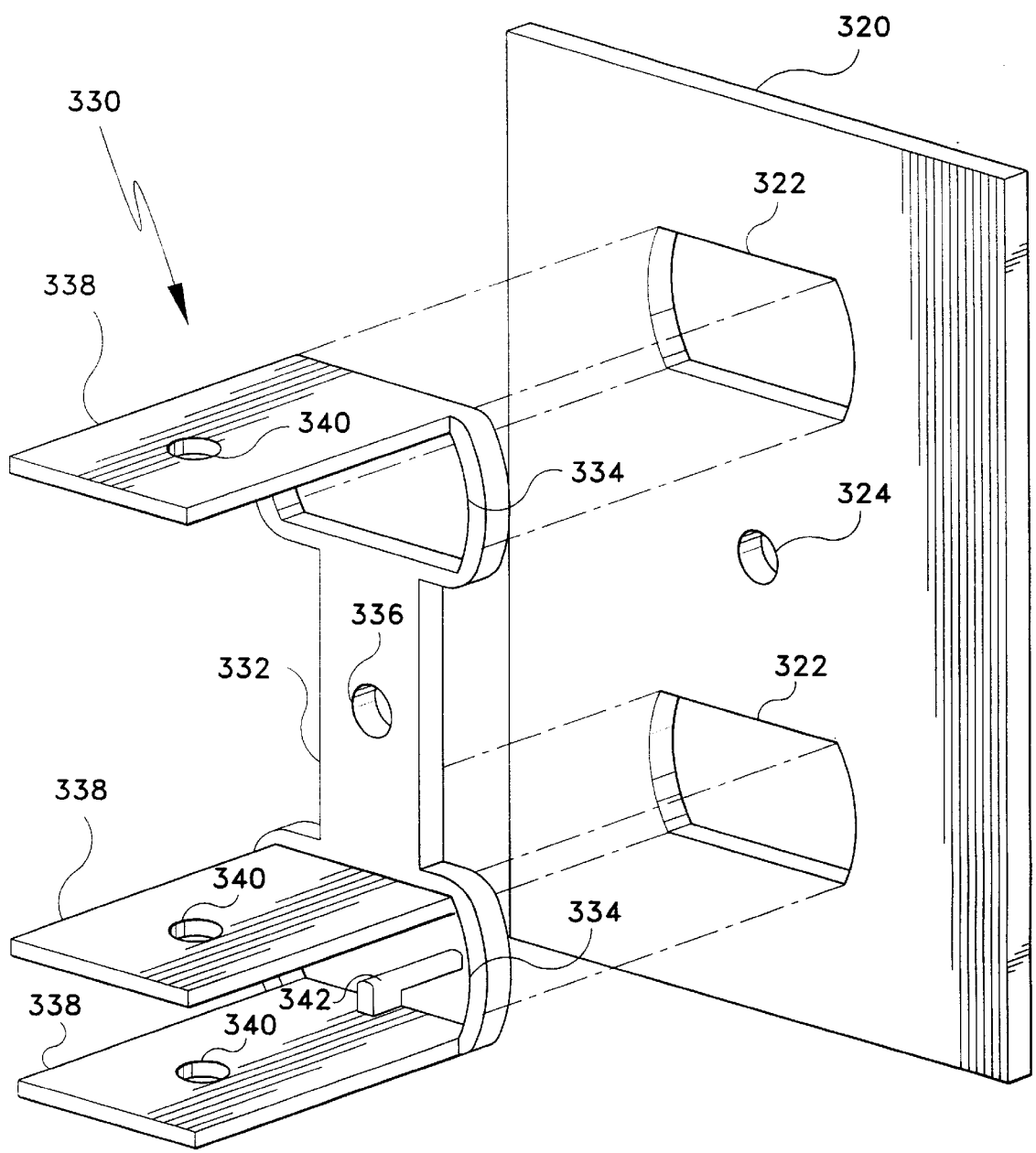
FIG. 16 is a front perspective view of a utility lock-out apparatus according to the present invention.

Another utility lock-out apparatus 330 according to the invention for a power outlet assembly is shown in FIG. 16. As shown, the utility lock-out apparatus 330 comprises a power outlet attachment 330 for attachment to a conventional power outlet face plate 320 which includes two power outlet holes 322 defined therein, wherein each is configured and positioned for receiving a power outlet (not shown) therethrough. The conventional power outlet face plate 320 also includes a centrally located fastening hole 324 defined therein for receiving a fastening element (not shown), such as a screw, therethrough to provide a means for fastening the conventional power outlet face plate 320 to a power outlet housing.

The power outlet attachment 330 comprises a base element 332 which includes two power outlet holes 334 defined therein, wherein each is configured and positioned for receiving a power outlet (not shown) therethrough. The base element 332 also includes a centrally located fastening hole 336 defined therein for receiving a fastening element (not shown), such as a screw, therethrough to provide a means for fastening the power outlet attachment 330 to the conventional power outlet face plate 320. The base element 332 additionally includes three integrally configured longitudinal elements 338 that extend from the surface of the base element 332, wherein one longitudinal element 338 extends from an upper side of the upper power outlet hole 334, and the remaining two extend from upper and lower sides of the lower power outlet hole 334. Each longitudinal element 338 extends for a desired distance above the surface of the base element 332.

The longitudinal element 338 on the lower side of the lower power outlet hole 334 may additionally include a rearwardly extending extension element 342. Such a rearwardly extending extension element 342 would be configured for being inserted into the ground plug hole of a conventional power outlet to preclude the ability of one from rotating the power outlet attachment 330 when the power outlet attachment 330 is attached to the conventional power outlet face plate 320. Each longitudinal element 338 also includes a hole 340 defined therein having a size configured for enabling a lock bar means 804 of a conventional locking means 800, such as that shown in FIG. 32, to pass therethrough. Preferably, the fastening hole 340 of each longitudinal element 338 is located at a distance above the surface of the base element 332 that would preclude one from contacting a power outlet with the metal prongs of an electrical plug (not shown) when a lock bar means 804 of a conventional locking means 800 passes therethrough and the metal prongs of the electrical plug straddle the lock bar means 804.

This particular utility lock-out apparatus 330 provides the ability of a user to conveniently lock-out access to one or both power outlets by attaching the power outlet attachment 330 to the conventional power outlet face plate 320 and passing a lock bar means 804 of a conventional locking means 800 through the holes 340 present on each of the longitudinal elements 338. Obviously, such a utility lock-out apparatus 330 could include a number of power outlet holes 334 other than two, and could include longitudinal elements 338 providing the ability of a user to lock-out access to more than two power outlets, such as on a conventional power outlet strip. The power outlet attachment 330 may be made from any desirable material, such as metal, plastic, wood, etc., and may be dimensioned according to the desires of the manufacturer.

Figure 33:
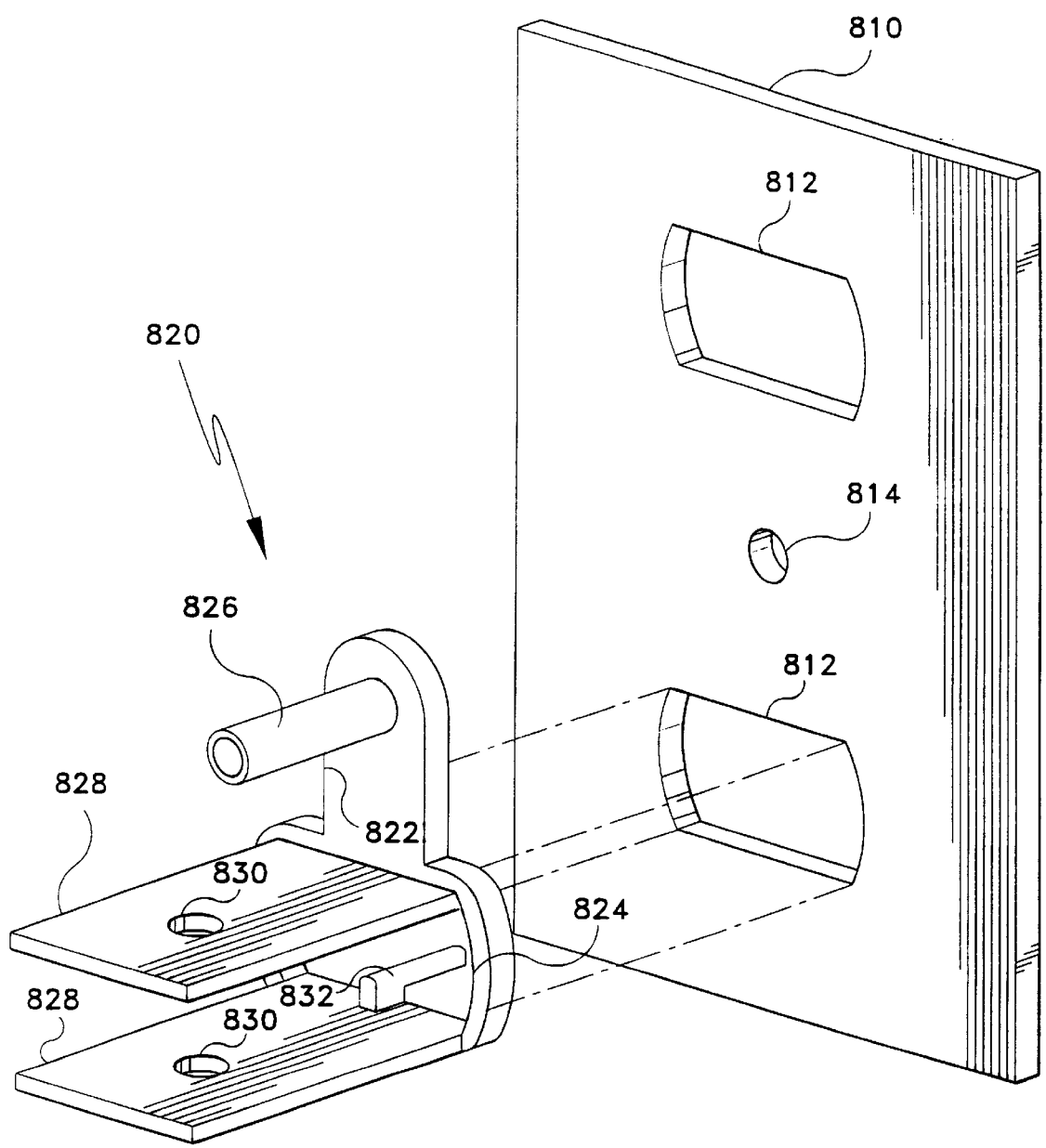
FIG. 33 is a front perspective view of a utility lock-out apparatus according to the present invention.

Another utility lock-out apparatus 820 according to the invention for a power outlet assembly is shown in FIG. 33. As shown, the utility lock-out apparatus 820 comprises a power outlet attachment 820 for attachment to a conventional power outlet face plate 810 which includes two power outlet holes 812 defined therein, wherein each is configured and positioned for receiving a power outlet (not shown) therethrough. The conventional power outlet face plate 810 also includes a centrally located fastening hole 814 defined therein for receiving a fastening element (not shown), such as a screw, therethrough to provide a means for fastening the conventional power outlet face plate 810 to a power outlet housing.

The power outlet attachment 820 comprises a base element 822 which includes one power outlet hole 824 defined therein that is configured and positioned for receiving a power outlet (not shown) therethrough. The base element 822 also includes a centrally located fastening hole (not shown) defined therein for receiving a fastening element (not shown), such as a screw, therethrough to provide a means for fastening the power outlet attachment 820 to the conventional power outlet face plate 810. The base element 822 additionally includes two integrally configured longitudinal elements 828 that extend from the surface of the base element 822, wherein one longitudinal element 828 extends from an upper side of the power outlet hole 824, and the other longitudinal element 828 extends from the lower side of the power outlet hole 824. Each longitudinal element 828 extends for a desired distance above the surface of the base element 822. Each longitudinal element 828 also includes a hole 830 defined therein having a size configured for enabling a lock bar means 804 of a conventional locking means 800, such as that shown in FIG. 32, to pass therethrough. Preferably, the fastening hole 830 of each longitudinal element 828 is located at a distance above the surface of the base element 822 that would preclude one from contacting a power outlet with the metal prongs of an electrical plug (not shown) when a lock bar means 804 of a conventional locking means 800 passes therethrough and the metal prongs of the electrical plug straddle the lock bar means 804.

Obviously, the longitudinal elements 828 could alternatively be positioned on opposing right and left sides of the power outlet holes 824. In such a configuration, the hole 830 of each longitudinal element 828 would be preferably located at a distance above the surface of the outlet attachment 820 that would preclude one from contacting a power outlet with the metal prongs of an electrical plug (not shown) when a lock bar means 804 of a conventional locking means 800 passes therethrough.

The base element 822 may also include integrated therein a tubular element 826 that extends from the fastening hole on the base element 822 for a distance that is less than the position of each of the holes 830 present on each of the longitudinal elements 828. Such a tubular element 826 would be configured for receiving a fastening element (not shown), such as a screw, therethrough to provide a means for fastening the power outlet attachment 820 to a power outlet face plate 810.

The longitudinal element 828 on the lower side of the power outlet hole 824 may additionally include a rearwardly extending extension element 832. Such a rearwardly extending extension element 832 would be configured for being inserted into the ground plug hole of a conventional power outlet to preclude the ability of one from rotating the power outlet attachment 820 when the power outlet attachment 820 is attached to the conventional power outlet face plate 810. The power outlet attachment 820 may obviously be configured for use with an upper power outlet hole of a conventional face plate 810. In such a case, the longitudinal element 828 that would be configured for including a rearwardly extending extension element 832 would be the longitudinal element 832 closest to the ground plug hole of a conventional power outlet to preclude the ability of one from rotating the power outlet attachment 820 when the power outlet attachment 820 is attached to the conventional power outlet face plate 810.

This particular utility lock-out apparatus 820 provides the ability of a user to conveniently lock-out access to at least one power outlet by attaching the power outlet attachment 820 to the conventional power outlet face plate 810 and passing a lock bar means 804 of a conventional locking means 800 through the holes 830 present on each of the longitudinal elements 828. The power outlet attachment 820 may be made from any desirable material, such as metal, plastic, wood, etc., and may be dimensioned according to the desires of the manufacturer.

Figure 17:
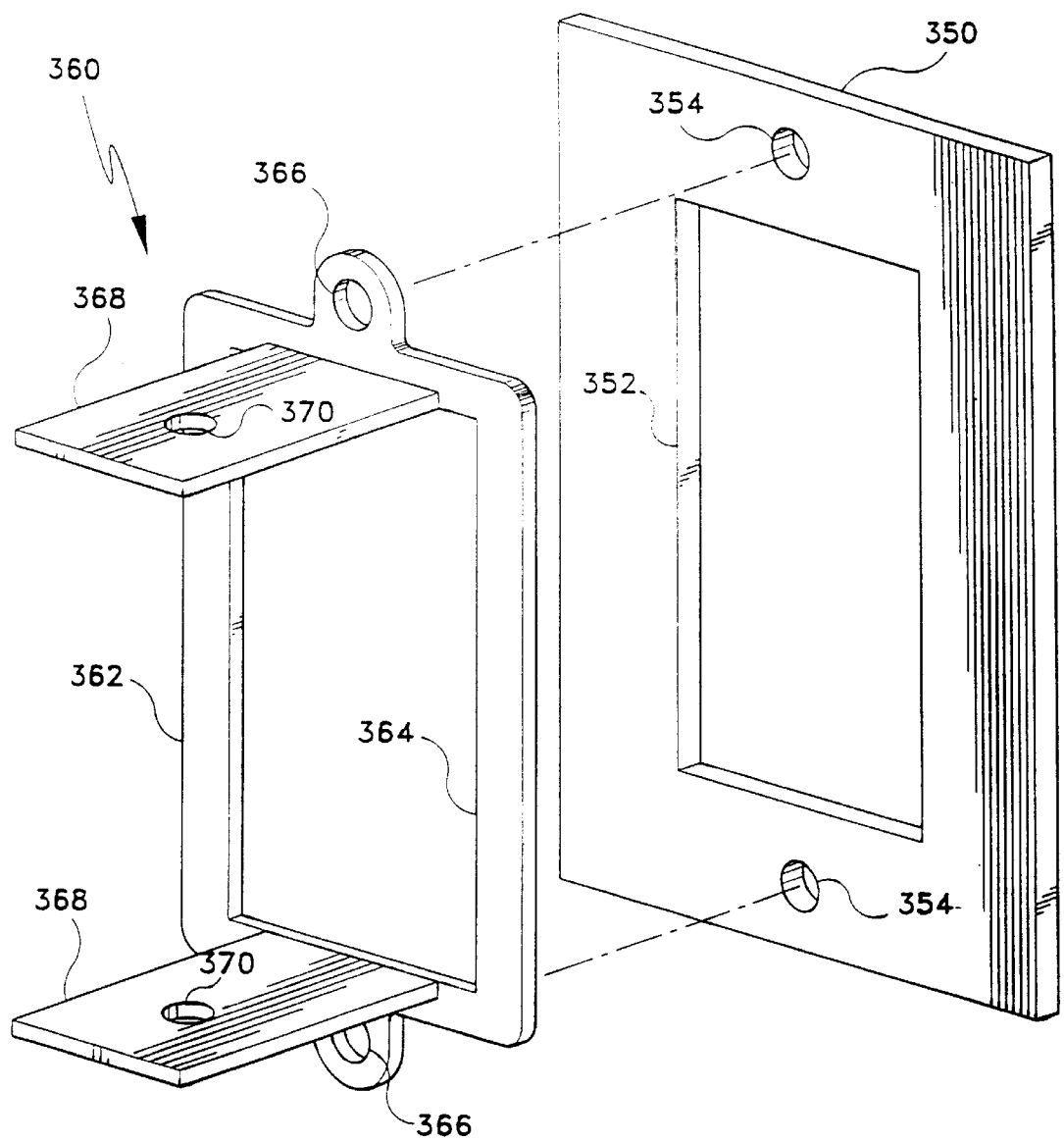
FIG. 17 is a front perspective view of a utility lock-out apparatus according to the present invention.

Another utility lock-out apparatus 360 according to the invention for a power outlet assembly is shown in FIG. 17. As shown, the utility lock-out apparatus 360 comprises a power outlet attachment 360 for attachment to a conventional power outlet face plate 350 which includes one elongated rectangular hole 352 defined therein configured and positioned for receiving plural power outlets (not shown) therethrough. Obviously, the hole 352 may be configured in the form of any particular shape, such as a circle, a square, etc., according to the desires of the manufacturer. The conventional power outlet face plate 350 also includes two fastening holes 354 defined therein, wherein each is configured and positioned for receiving a fastening element (not shown), such as a screw, therethrough to provide a means for fastening the conventional power outlet face plate 350 to a power outlet housing.

The power outlet attachment 360 comprises a base element 362 which includes one rectangular hole 364 defined therein configured and positioned for receiving plural power outlets (not shown) therethrough. Obviously, the hole 364 may be configured in the form of any particular shape, such as a circle, a square, etc., according to the desires of the manufacturer. Alternatively, the rectangular hole 364 does not need to be a complete hole but may only provide a singular connecting element on one side of the hole 364 shown. The base element 362 may also include two appropriately positioned and configured fastening holes 366 defined therein for receiving fastening elements (not shown), such as screws, therethrough to provide a means for fastening the power outlet attachment 360 to the conventional power outlet face plate 350.

The base element 362 additionally includes two integrally configured longitudinal elements 368 that extend from the surface of the base element 362 at opposing sides of the rectangular hole 364. In this instance, the longitudinal elements 368 extend from the surface of the power outlet attachment 360 at upper and lower opposing sides of the power outlet hole 364. Each longitudinal element 368 extends for a desired distance above the surface of the base element 362. Each longitudinal element 368 also includes a hole 370 having a size configured for enabling a lock bar means 804 of a conventional locking means 800, such as that shown in FIG. 32, to pass therethrough. Preferably, the fastening hole 370 of each longitudinal element 368 is located at a distance above the surface of the base element 362 that would preclude one from contacting a power outlet with the metal prongs of an electrical plug (not shown) when a lock bar means 804 of a conventional locking means 800 passes therethrough. The base element 362 may additionally include one longitudinal element (not shown) extending from central or appropriately positioned left and right sides portions of the power outlet hole 364 according to the desires of the manufacturer, such as shown in FIG. 7. Such a longitudinal element could include a notch dimensioned accordingly to permit passage of the surface of a power outlet housing (not shown) which may protrude beyond the surface of the power outlet attachment 360 and the surface of the power outlet face plate 350 when the two are attached.

Obviously, the longitudinal elements 368 could be positioned on opposing left and right sides of the hole 364, appropriately positioned anywhere along the length of the hole 364 to enable a user to preclude access to one power outlet. In such a configuration, the hole 370 of each longitudinal element 368 would be preferably located at a relatively small distance above the surface of the outlet attachment 360 that would preclude one from contacting a power outlet with the metal prongs of an electrical plug (not shown) when a lock bar means 804 of a conventional locking means 800 passes therethrough and the metal prongs of the electrical plug straddle the lock bar means 804. In addition, the power outlet attachment 360 could also be configured for this type of face plate in accordance with the configuration shown in FIG. 33, wherein the hole 364 would be smaller than the hole 352 on the power outlet face plate 350 and longitudinal elements 368 would extend from opposing sides of the hole 364.

This particular utility lock-out apparatus 360 provides the ability of a user to lock-out access to all power outlets for which the power outlet attachment 360 is configured. The power outlet attachment 360 may be made from any desirable material, such as metal, plastic, wood, etc., and may be dimensioned according to the desires of the manufacturer.

Figure 18:
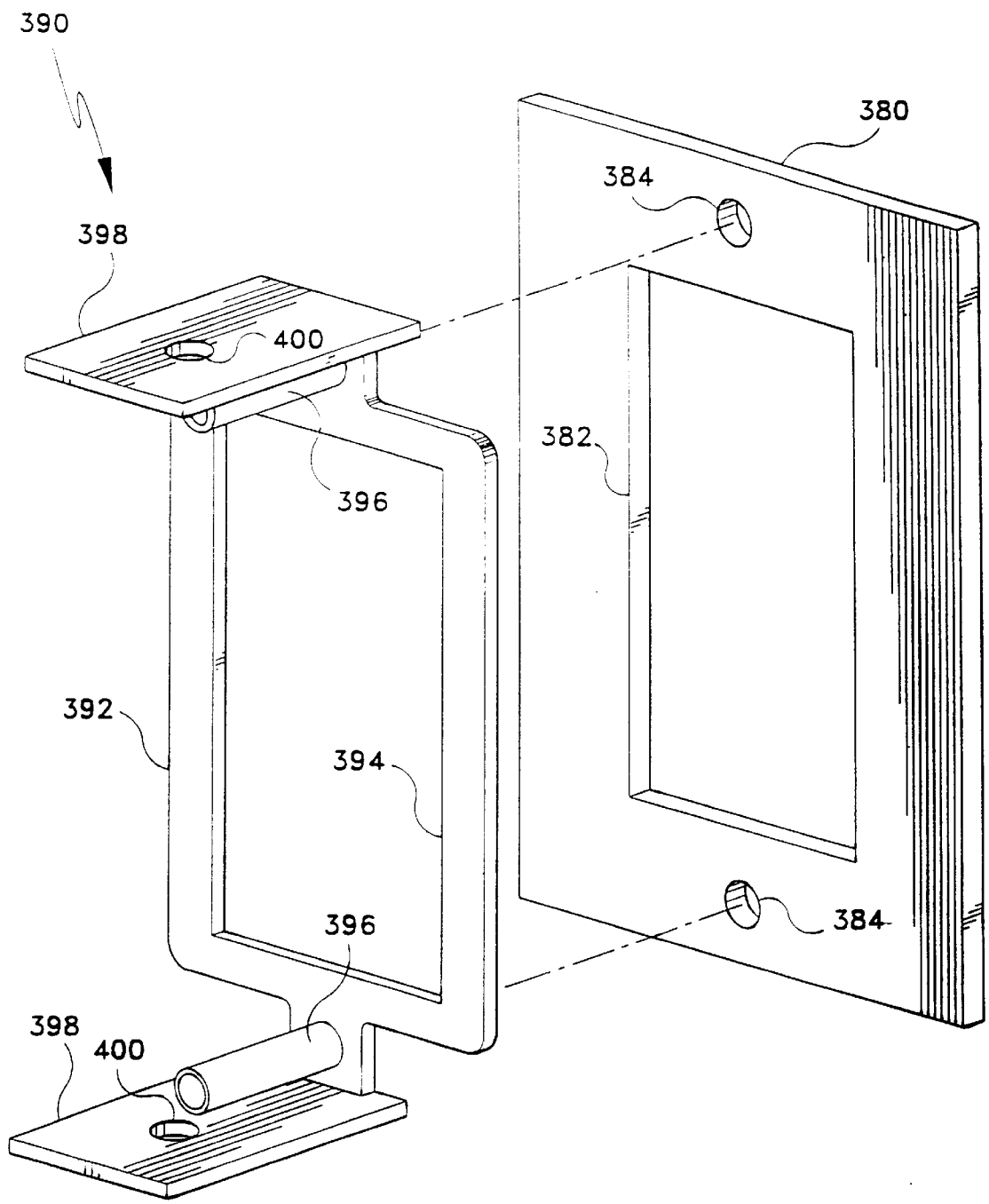
FIG. 18 is a front perspective view of a utility lock-out apparatus according to the present invention.

Another utility lock-out apparatus 390 according to the invention for a power outlet assembly is shown in FIG. 18. As shown, the utility lock-out apparatus 390 comprises a power outlet attachment 390 for attachment to a conventional power outlet face plate 380 which includes one elongated rectangular hole 382 defined therein configured and positioned for receiving plural power outlets (not shown) therethrough. Obviously, the hole 382 may be configured in the form of any particular shape, such as a circle, a square, etc., according to the desires of the manufacturer. The conventional power outlet face plate 380 also includes two fastening holes 384 defined therein, wherein each is configured and positioned for receiving a fastening element (not shown), such as a screw, therethrough to provide a means for fastening the conventional power outlet face plate 380 to a power outlet housing.

The power outlet attachment 390 comprises a base element 392 which includes one rectangular hole 394 defined therein configured and positioned for receiving plural power outlets (not shown) therethrough. Obviously, the hole 394, may be configured in the form of any particular shape, such as a circle, a square, etc., according to the desires of the manufacturer. Alternatively, the rectangular hole 394 does not need to be a complete hole but may only provide a singular connecting element on one side of the hole 394 shown. The base element 392 may also include two appropriately positioned and configured fastening holes (not shown) defined therein for receiving fastening elements (not shown), such as screws, therethrough to provide a means for fastening the power outlet attachment 390 to the conventional power outlet face plate 380.

The base element 392 additionally includes two integrally configured longitudinal elements 398 that extend from the surface of the base element 392 at opposing upper and lower sides of the rectangular hole 394. Each longitudinal element 398 extends for a desired distance above the surface of the base element 392. Each longitudinal element 398 also includes a hole 400 having a size configured for enabling a lock bar means 804 of a conventional locking means 800, such as that shown in FIG. 32, to pass therethrough. Preferably, the hole 400 of each longitudinal element 398 is located at a distance above the surface of the base element 392 that would preclude one from contacting a power outlet with the metal prongs of an electrical plug (not shown) when a lock bar means 804 of a conventional locking means 800 passes therethrough and the metal prongs of the electrical plug straddle the lock bar means 804.

Obviously, the longitudinal elements 398 could be positioned on opposing left and right sides of the hole 394, appropriately positioned anywhere along the length of the hole 394 to enable a user to preclude access to one power outlet. In such a configuration, the hole 340 of each longitudinal element 398 would be preferably located at a relatively small distance above the surface of the outlet attachment 390 that would preclude one from contacting a power outlet with the metal prongs of an electrical plug (not shown) when a lock bar means 804 of a conventional locking means 800 passes therethrough and the metal prongs of the electrical plug straddle the lock bar means 804. In addition, the power outlet attachment 390 could also be configured for this type of face plate in accordance with the configuration shown in FIG. 33, wherein the hole 394 would be smaller than the hole 382 on the power outlet face plate 380 and longitudinal elements 398 would extend from opposing sides of the hole 394.

The base element 392 may also include integrated therein two tubular elements 396 that each extend from the associated fastening hole on the base element 392 for a distance that is less than the position of each of the holes 400 present on each of the longitudinal elements 398. Each tubular element 396 is configured for receiving a fastening element (not shown), such as a screw, therethrough to provide a means for fastening the power outlet attachment 390 to a power outlet face plate 380. The base element 392 may additionally include one longitudinal element (not shown) extending from central or appropriately positioned left and right sides portions of the power outlet hole 394 according to the desires of the manufacturer, as shown in FIG. 7. Such a longitudinal element could include a notch dimensioned accordingly to permit passage of the surface of a power outlet housing (not shown) which may protrude beyond the surface of the power outlet attachment 390 and the surface of the power outlet face plate 380 when the two are attached. In addition, the power outlet attachment 360 could also be configured for this type of face plate in accordance with the configuration shown in FIG. 33, wherein the hole 364 would be smaller than the hole 352 on the power outlet face plate 380.

This particular utility lock-out apparatus 390 provides the ability of a user to lock-out access to all power outlets for which the power outlet attachment 390 is configured. The tubular elements 396 preclude the ability of someone from removing the power outlet attachment 390 merely by removing the fastening elements when a locking means is utilized. The power outlet attachment 390 may be made from any desirable material, such as metal, plastic, wood, etc., and may be dimensioned according to the desires of the manufacturer.

Figure 19:
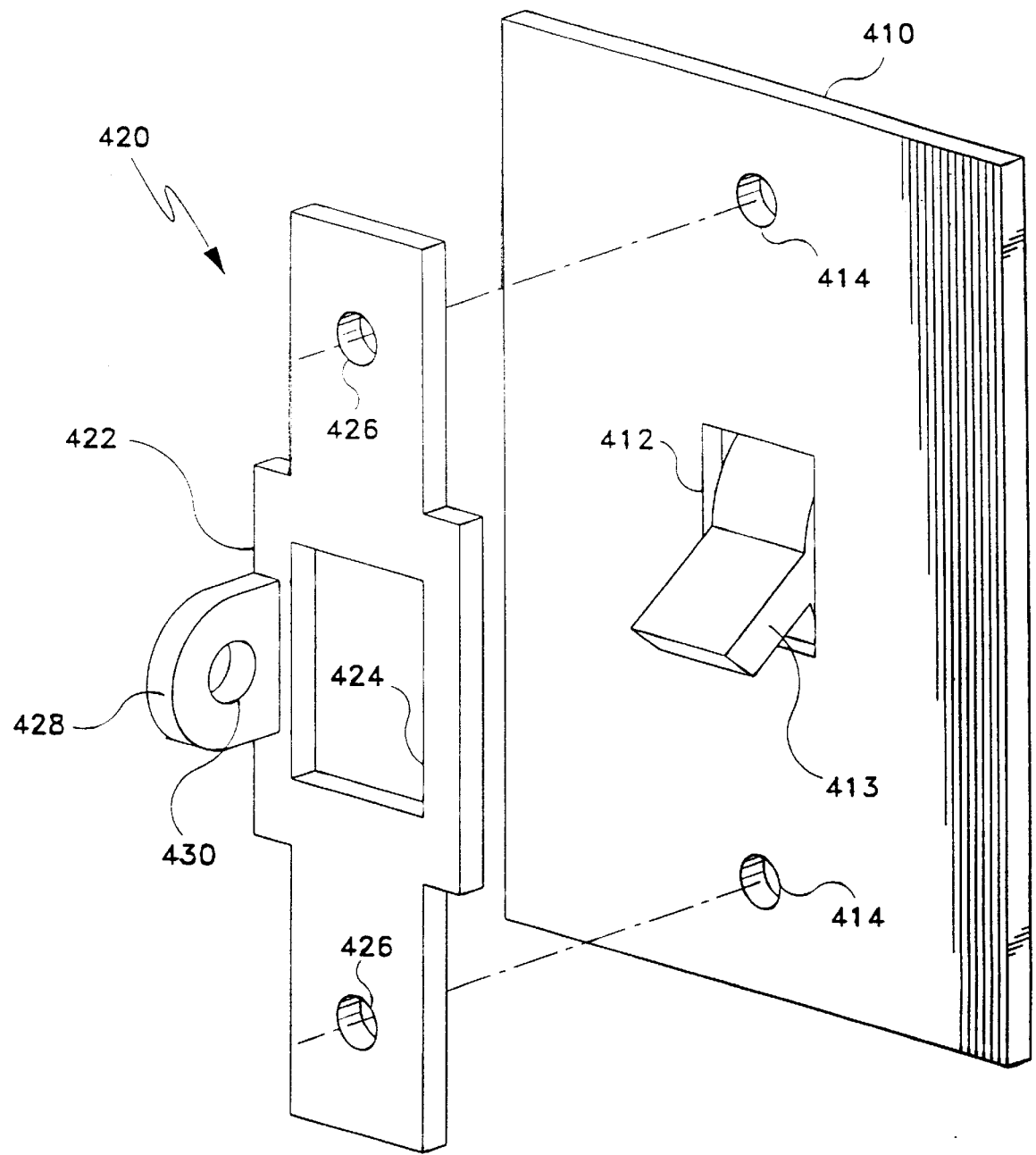
FIG. 19 is a front perspective view of a utility lock-out apparatus according to the present invention.

Another utility lock-out apparatus 420 according to the invention for an electrical switch assembly is shown in FIG. 19. As shown, the utility lock-out apparatus 420 comprises an electrical switch attachment 420 for attachment to a conventional electrical switch face plate 410 which includes one rectangular hole 412 defined therein configured and positioned for receiving an electrical switch 413 therethrough. The electrical switch face plate 410 also includes two fastening holes 414 defined therein, wherein each is configured for receiving a fastening element (not shown), such as a screw, therethrough to provide a means for fastening the electrical switch face plate 410 to an electrical switch housing.

The electrical switch attachment 420 includes a base element 422 which includes one rectangular hole 424 defined therein configured and positioned for receiving an electrical switch 413 therethrough. Alternatively, the rectangular hole 424 does not need to be a complete hole but may only provide a singular connecting element on one side of the hole 424 shown. The base element 422 also includes two appropriately positioned and configured holes 426 defined therein for receiving fastening elements (not shown), such as screws, therethrough to provide a means for fastening the electrical switch attachment 420 to the conventional electrical switch face plate 410. Of critical importance to the electrical switch attachment 420 is the integration therein of a longitudinal element 428 that extends from the surface of the base element 422 at one side of the electrical switch hole 424. In this case the longitudinal element 428 is positioned on the left of the electrical switch hole 424. Alternatively, the longitudinal element 428 may be positioned on the right of the electrical switch hole 424. Preferably, the longitudinal element 428 is positioned flush with the side of the hole 424 but may be positioned according to the desires of the manufacturer. The longitudinal element 428 may be reinforced as desired by additional material at the surface of the electrical switch face plate 422 to inhibit breakage of the longitudinal element 428 from the electrical switch attachment 420. The longitudinal element 428 extends for a desired distance above the surface of the base element 422. The longitudinal element 428 also includes a hole 430 having a size configured for enabling a lock bar means 804 of a conventional locking means 800, such as that shown in FIG. 32, to pass therethrough. Preferably, the hole 430 of the longitudinal element 430 is located at a distance above the surface of the base element 422 substantially close to the electrical switch hole 424 that enables passage of a lock bar means 804 of a conventional locking means 800 therethrough to secure the electrical switch 413 in either the ON position or the OFF position.

This particular electrical switch attachment 420 provides the ability of a user to lock an electrical switch 413 in either the ON position or the OFF position when the electrical switch attachment 420 is attached to an electrical switch face plate 410, and a lock bar means 804 of a conventional locking means 800 passes through the hole 430 of the longitudinal element 428. Obviously, such a utility lock-out apparatus 420 could include a number of electrical switch holes 424 and a corresponding number of longitudinal elements 428 other than one. However, this particular utility lock-out apparatus 420 also enables one to remove the electrical switch attachment 420 from the electrical switch face plate 410 merely by removing the fastening elements. Obviously, such an electrical switch attachment 420 could include a number of electrical switch holes 424 other than one. The electrical switch attachment 420 may be made from any desirable material, such as metal, plastic, wood, etc., and may be dimensioned according to the desires of the manufacturer.

Figure 20:
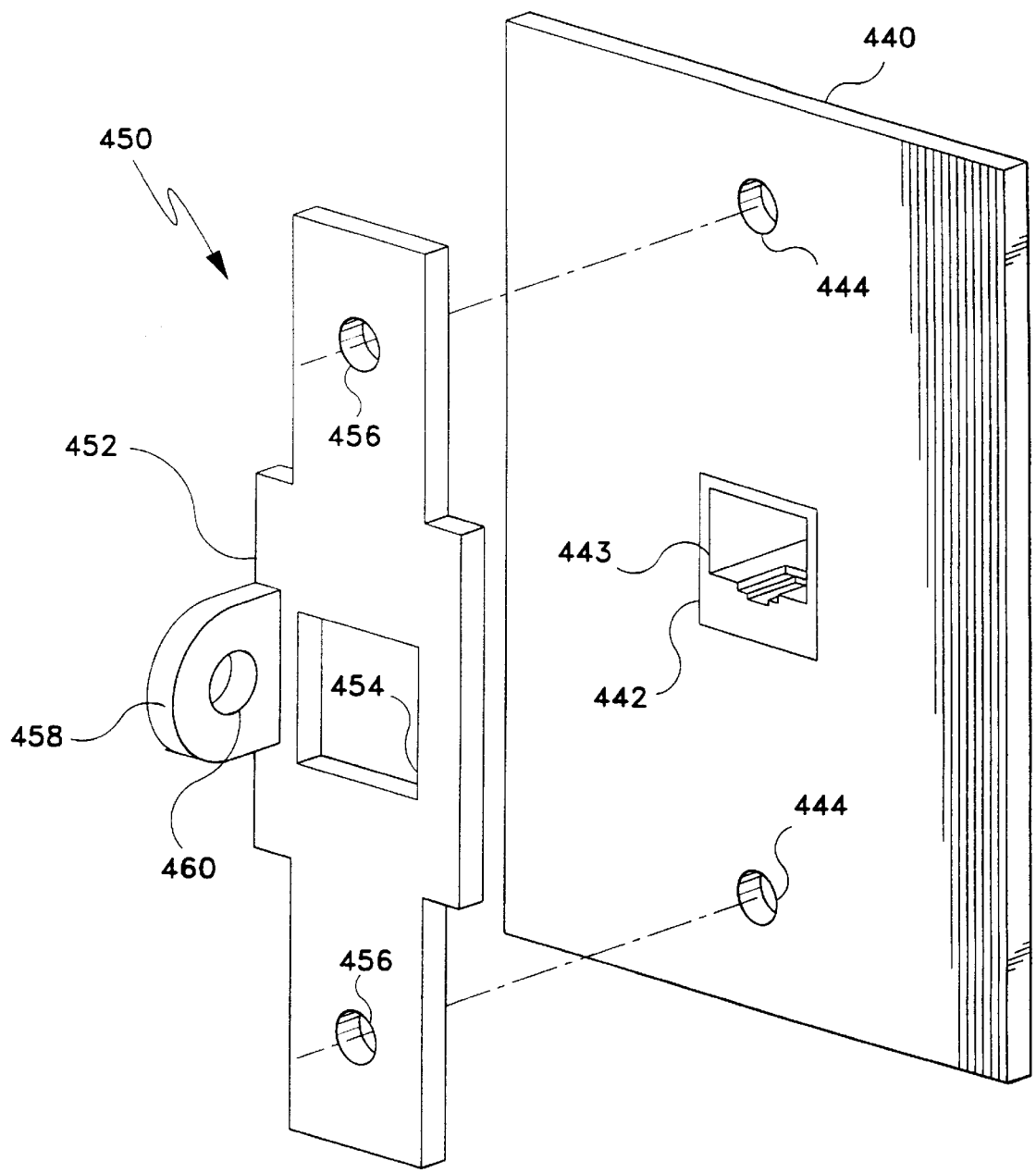
FIG. 20 is a front perspective view of a utility lock-out apparatus according to the present invention.

Another utility lock-out apparatus 450 according to the invention for a communication outlet assembly is shown in FIG. 20. As shown, the utility lock-out apparatus 450 comprises a communication outlet attachment 450 for attachment to a conventional communication outlet plate 440 which includes one rectangular hole 442 defined therein configured and positioned for receiving a communication outlet 443 therethrough. The rectangular hole 442 could alternatively be shaped in the form of a twelve sided polygon configured and positioned for receiving a communication plug therethrough. Such a communication outlet 443 is capable of receiving communication data from devices such as telephones, computers, facsimile machines, and the like. The communication outlet face plate 440 also includes two fastening holes 444 defined therein, wherein each is configured for receiving a fastening element (not shown), such as a screw, therethrough to provide a means for fastening the communication outlet face plate 440 to a communication outlet housing.

The communication outlet attachment 450 includes a base element 452 which includes one rectangular hole 454 configured and positioned for receiving a communication outlet therethrough. The rectangular hole 454 could alternatively be shaped in the form of a twelve sided polygon configured and positioned for receiving a communication plug therethrough. Alternatively, the rectangular hole 454 does not need to be a complete hole but may only provide a singular connecting element on one side of the hole 454 shown. The base element 452 also includes two appropriately positioned and configured holes 456 defined therein for receiving fastening elements (not shown), such as screws, therethrough to provide a means for fastening the communication outlet attachment 450 to the conventional communication outlet face plate 440. Of critical importance to the communication outlet attachment 450 is the integration therein of a longitudinal element 458 that extends from the surface of the base element 452 at one side of the communication outlet hole 454. In this case the longitudinal element 458 is positioned on the left of the communication outlet hole 454. Alternatively, the longitudinal element 458 may be positioned on the right side, upper side, or lower side of the communication outlet hole 454. Preferably, the longitudinal element 458 is positioned flush with the side of the hole 454 but may be positioned according to the desires of the manufacturer. The longitudinal element 458 may be reinforced as desired, by additional material at the surface of the communication outlet face plate 452 to inhibit breakage of the longitudinal element 458 from the communication outlet attachment 450. The longitudinal element 458 extends for a desired distance above the surface of the base element 452. The longitudinal element 458 also includes a hole 460 defined therein having a size configured for enabling a lock bar means 804 of a conventional locking means 800, such as that shown in FIG. 32, to pass therethrough. Preferably, the hole 460 of the longitudinal element 458 is located at a distance above the surface of the base element 452 substantially close to the communication outlet hole 454 that enables passage of a lock bar means 804 of a conventional locking means 800 therethrough to preclude use of the communication outlet 443.

This particular communication outlet attachment 450 provides the ability of a user to preclude use of the communication outlet 443 when the communication outlet attachment 450 is attached to a communication outlet face plate 440, and a lock bar means 804 of a conventional locking means 800 passes through the hole 460 of the longitudinal element 458. Obviously, such a utility lock-out apparatus 450 could include a number of communication outlet holes 454 and a corresponding number of longitudinal elements 458 other than one. However, this particular utility lock-out apparatus 450 also enables one to remove the communication outlet attachment 450 from the communication outlet face plate 450 merely by removing the fastening elements. Obviously, such a communication outlet attachment 450 could include a number of communication outlet holes 454 other than one. The communication outlet attachment 450 may be made from any desirable material, such as metal, plastic, wood, etc., and may be dimensioned according to the desires of the manufacturer.

Figure 21:
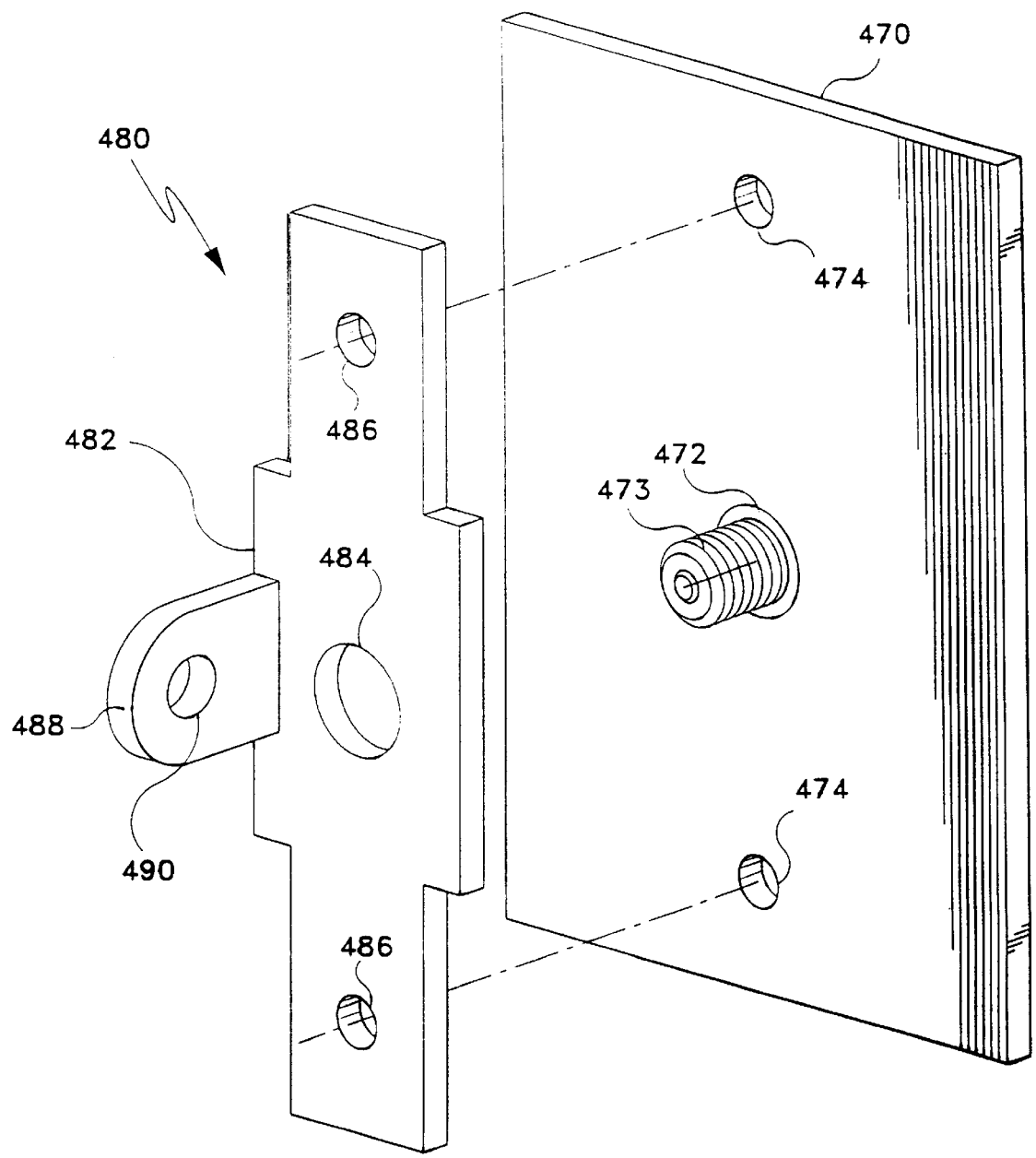
FIG. 21 is a front perspective view of a utility lock-out apparatus according to the present invention.

Another utility lock-out apparatus 480 according to the invention for a cable outlet assembly is shown in FIG. 21. As shown, the utility lock-out apparatus 480 comprises a cable outlet attachment 480 for attachment to a conventional cable outlet face plate 470 which includes one circular hole 472 defined therein configured and positioned for receiving a cable outlet 473 therethrough. Such a cable outlet 473 is typically configured in the form of a cable jack which is interconnected with underground cable wiring which carry audio/video signals from cable companies. The cable outlet face plate 470 also includes two fastening holes 474 defined therein, wherein each is configured for receiving a fastening element (not shown), such as a screw, therethrough to provide a means for fastening the cable outlet face plate 470 to a cable outlet housing.

The cable outlet attachment 480 includes a base element 482 which includes one circular hole 484 configured and positioned for receiving a cable outlet 473 therethrough. Alternatively, the circular hole 484 does not need to be a complete hole but may only provide a singular connecting element on one side of the hole 484 shown. The base element 482 also includes two appropriately positioned and configured fastening holes 486 defined therein for receiving fastening elements (not shown), such as screws, therethrough to provide a means for fastening the cable outlet attachment 480 to the conventional cable outlet face plate 470. Of critical importance to the cable outlet attachment 480 is the integration therein of a longitudinal element 488 that extends from the surface of the base element 482 at one side of the cable outlet hole 484. In this case the longitudinal element 488 is positioned on the left of the cable outlet hole 484. Alternatively, the longitudinal element 488 may be positioned at any position around the cable outlet hole 484. Preferably, the longitudinal element 458 is positioned flush with a side of the hole 484 but may be positioned according to the desires of the manufacturer. The longitudinal element 488 may be reinforced as desired by additional material at the surface of the base element 482 to inhibit breakage of the longitudinal element 488 from the cable outlet attachment 480. The longitudinal element 488 extends for a desired distance above the surface of the base element 482. The longitudinal element 488 also includes a hole 490 having a size configured for enabling a lock bar means 804 of a conventional locking means 800, such as that shown in FIG. 32, to pass therethrough. Preferably, the hole 490 of the longitudinal element 488 is located at a distance above the surface of the base element 482 substantially close to the cable outlet hole 484 that enables passage of a lock bar means 804 of a conventional locking means 800 therethrough to preclude use of the cable outlet 473.

This particular cable outlet attachment 480 provides the ability of a user to preclude use of the cable outlet 473 when the cable outlet attachment 480 is attached to a cable outlet face plate 470, and a lock bar means 804 of a conventional locking means 800 passes through the hole 490 of the longitudinal element 488. Obviously, such a utility lock-out apparatus 480 could include a number of cable outlet holes 484 and a corresponding number of longitudinal elements 488 other than one. However, this particular utility lock-out apparatus 480 also enables one to remove the cable outlet attachment 480 from the cable outlet face plate 480 merely by removing the fastening elements. Obviously, such a cable outlet attachment 480 could include a number of cable outlet holes 484 other than one. The cable outlet attachment 480 may be made from any desirable material, such as metal, plastic, wood, etc., and may be dimensioned according to the desires of the manufacturer.

Figure 22:
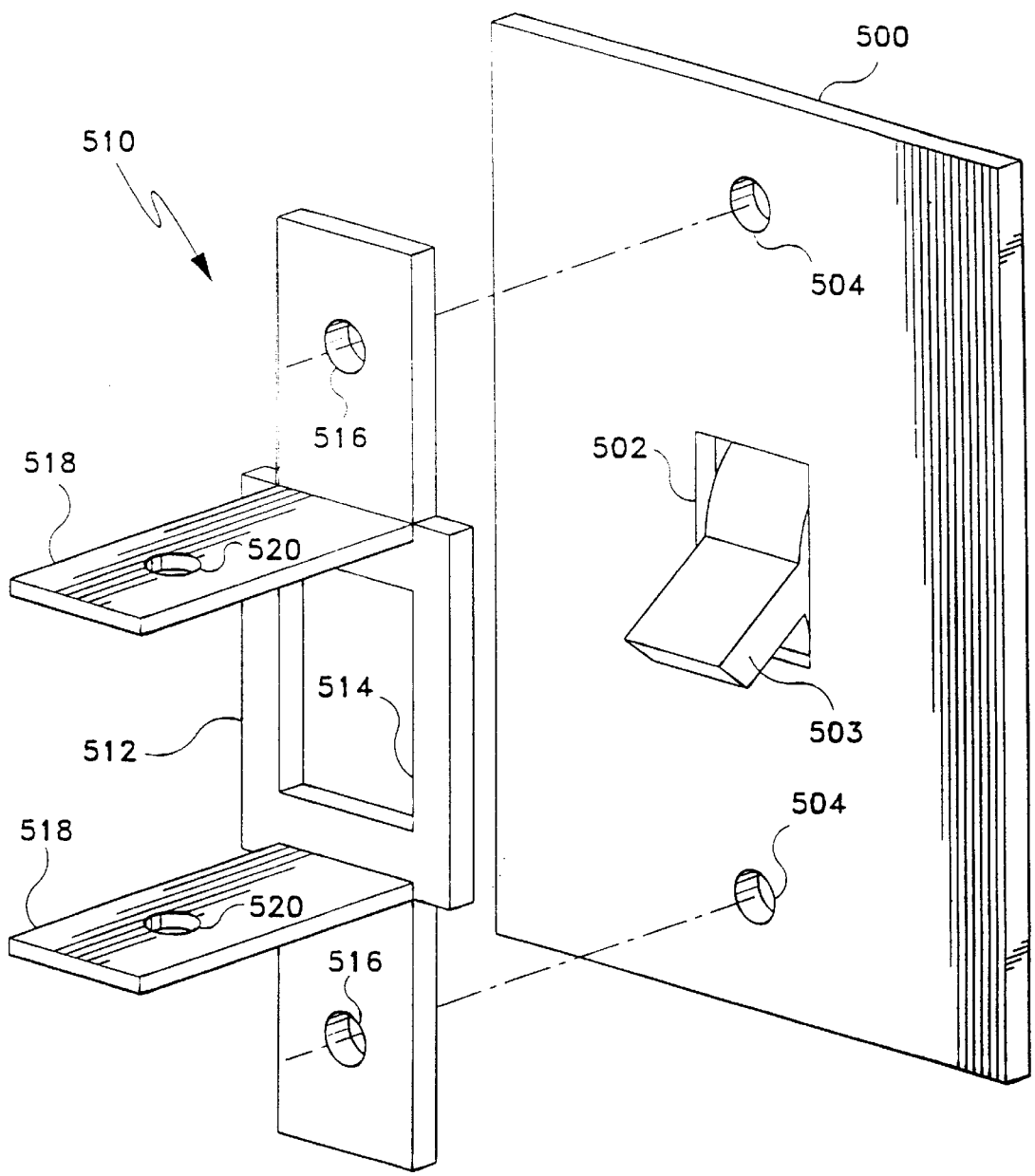
FIG. 22 is a front perspective view of a utility lock-out apparatus according to the present invention.

Another utility lock-out apparatus 510 according to the invention for an electrical switch assembly is shown in FIG. 22. As shown, the utility lock-out apparatus 510 comprises an electrical switch attachment 510 for attachment to a conventional electrical switch face plate 500 which includes one rectangular hole 502 defined therein configured and positioned for receiving an electrical switch 503 therethrough. The electrical switch face plate 500 also includes two holes 504 defined therein, wherein each is configured for receiving a fastening element (not shown), such as a screw, therethrough to provide a means for fastening the electrical switch face plate 500 to an electrical switch housing.

The electrical switch attachment 510 includes a base element 512 which includes one rectangular hole 514 defined therein configured and positioned for receiving an electrical switch 503 therethrough. Alternatively, the rectangular hole 514 does not need to be a complete hole but may only provide a singular connecting element on one side of the hole 514 shown. The base element 512 also includes two appropriately positioned and configured holes 516 defined therein for receiving fastening elements (not shown), such as screws, therethrough to provide a means for fastening the electrical switch attachment 510 to the conventional electrical switch face plate 500. The base element 512 additionally includes two integrally configured longitudinal elements 518 that extend from the surface of the base element 512 at opposing upper and lower sides of the rectangular hole 514. Each longitudinal element 518 extends for a desired distance above the surface of the base element 512. Each longitudinal element 518 also includes a hole 520 defined therein having a size configured for enabling a lock bar means 804 of a conventional locking means 800, such as that shown in FIG. 32, to pass therethrough.

This particular utility lock-out apparatus 510 provides the ability of a user to lock the electrical switch in either the ON position or the OFF position. However, this particular utility lock-out apparatus 510 also enables one to remove the electrical switch attachment 510 from the electrical switch face plate 500 merely by removing the fastening elements. Obviously, such an electrical switch attachment 510 could include a number of electrical switch holes 514 other than one. The electrical switch attachment 510 may be made from any desirable material, such as metal, plastic, wood, etc., and may be dimensioned according to the desires of the manufacturer.

Figure 23:
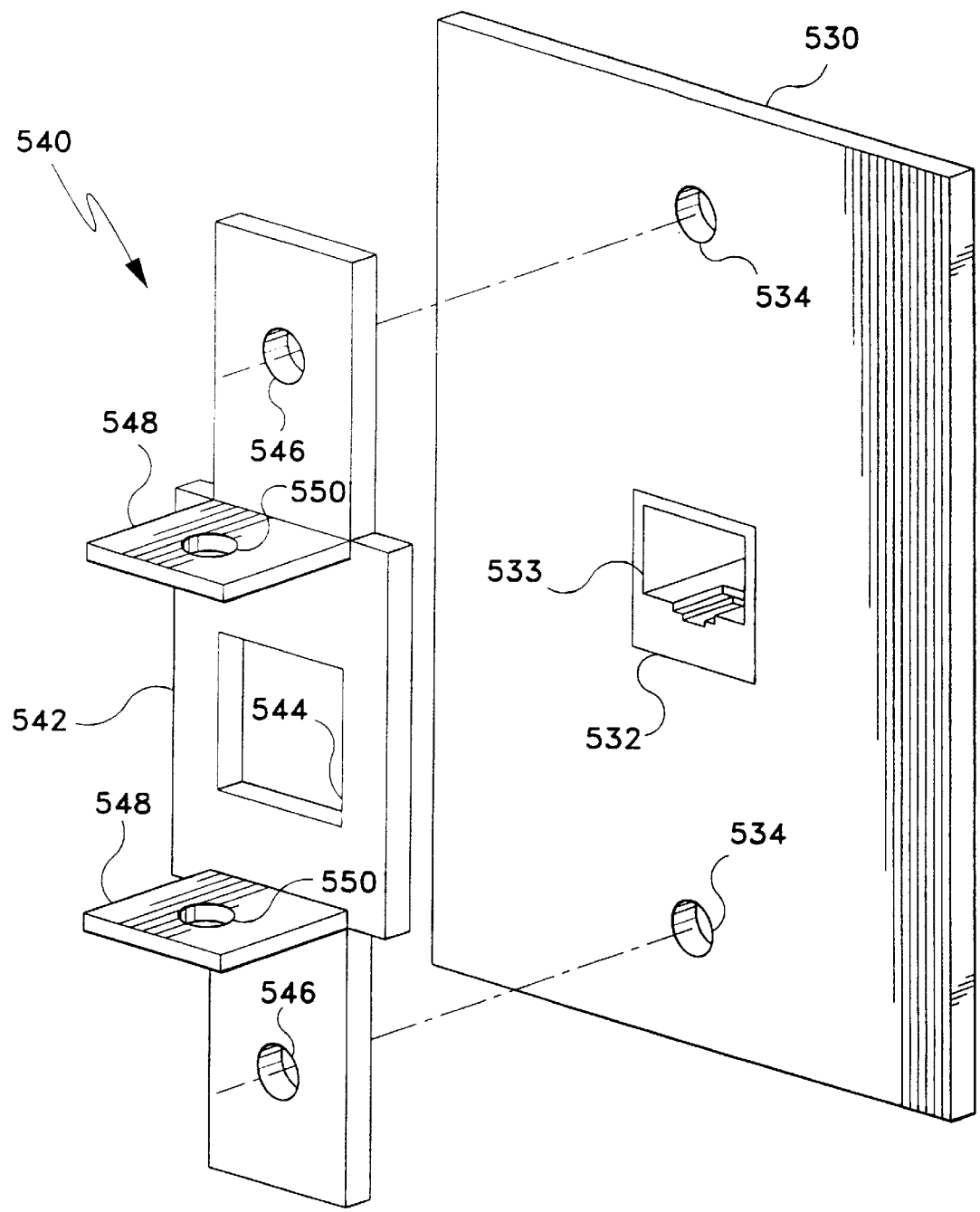
FIG. 23 is a front perspective view of a utility lock-out apparatus according to the present invention.

Another utility lock-out apparatus 540 according to the invention for a communication outlet assembly is shown in FIG. 23. As shown, the utility lock-out apparatus 540 comprises a communication outlet attachment 540 for attachment to a conventional communication outlet face plate 530 which includes one rectangular hole 532 configured and positioned for receiving a communication outlet 533 therethrough. The rectangular hole 532 could alternatively be shaped in the form of a twelve sided polygon configured and positioned for receiving a communication plug therethrough. Such a communication outlet 533 is capable of receiving communication data from devices such as telephones, computers, facsimile machines, and the like. The communication outlet face plate 530 also includes two holes 534 defined therein, wherein each is configured for receiving a fastening element (not shown), such as a screw, therethrough to provide a means for fastening the communication outlet face plate 530 to a communication outlet housing.

The communication outlet attachment 540 includes a base element 542 which includes one rectangular hole 544 defined therein configured and positioned for receiving a communication outlet 533 therethrough. The rectangular hole 544 could alternatively be shaped in the form of a twelve sided polygon configured and positioned for receiving a communication plug therethrough. In addition, the rectangular hole 544 does not need to be a complete hole but may only provide a singular connecting element on one side of the hole 544 shown. The base element 542 also includes two appropriately positioned and configured holes 546 defined therein for receiving fastening elements (not shown), such as screws, therethrough to provide a means for fastening the communication outlet attachment 540 to the conventional communication outlet face plate 530. The base element 542 additionally includes two integrally configured longitudinal elements 548 that extend from the surface of the base element 542 at opposing upper and lower sides of the rectangular hole 544. Each longitudinal element 548 extends for a desired distance above the surface of the base element 542. Each longitudinal element 548 also includes a hole 550 defined therein having a size configured for enabling a lock bar means 804 of a conventional locking means 800, such as that shown in FIG. 32, to pass therethrough. Preferably, the hole 550 of the longitudinal element 448 is located at a distance above the surface of the base element 542 substantially close to the communication outlet hole 544 that enables passage of a lock bar means 804 of a conventional locking means 800 therethrough to preclude use of the communication outlet 533.

This particular communication outlet attachment 540 provides the ability of a user to preclude use of the communication outlet 533 when the communication outlet attachment 540 is attached to a communication outlet face plate 530, and a lock bar means 804 of a conventional locking means 800 passes through the holes 550 of the longitudinal elements 548. This particular utility lock-out apparatus 540 provides the ability of a user to preclude use of a communication outlet 533. However, this particular utility lock-out apparatus 540 also enables one to remove the communication outlet attachment 540 from the communication outlet face plate 530 merely by removing the fastening elements. Obviously, such a communication outlet attachment 540 could include a number of communication outlet holes 544 other than one. The communication outlet attachment 540 may be made from any desirable material, such as metal, plastic, wood, etc., and may be dimensioned according to the desires of the manufacturer.

Figure 24:
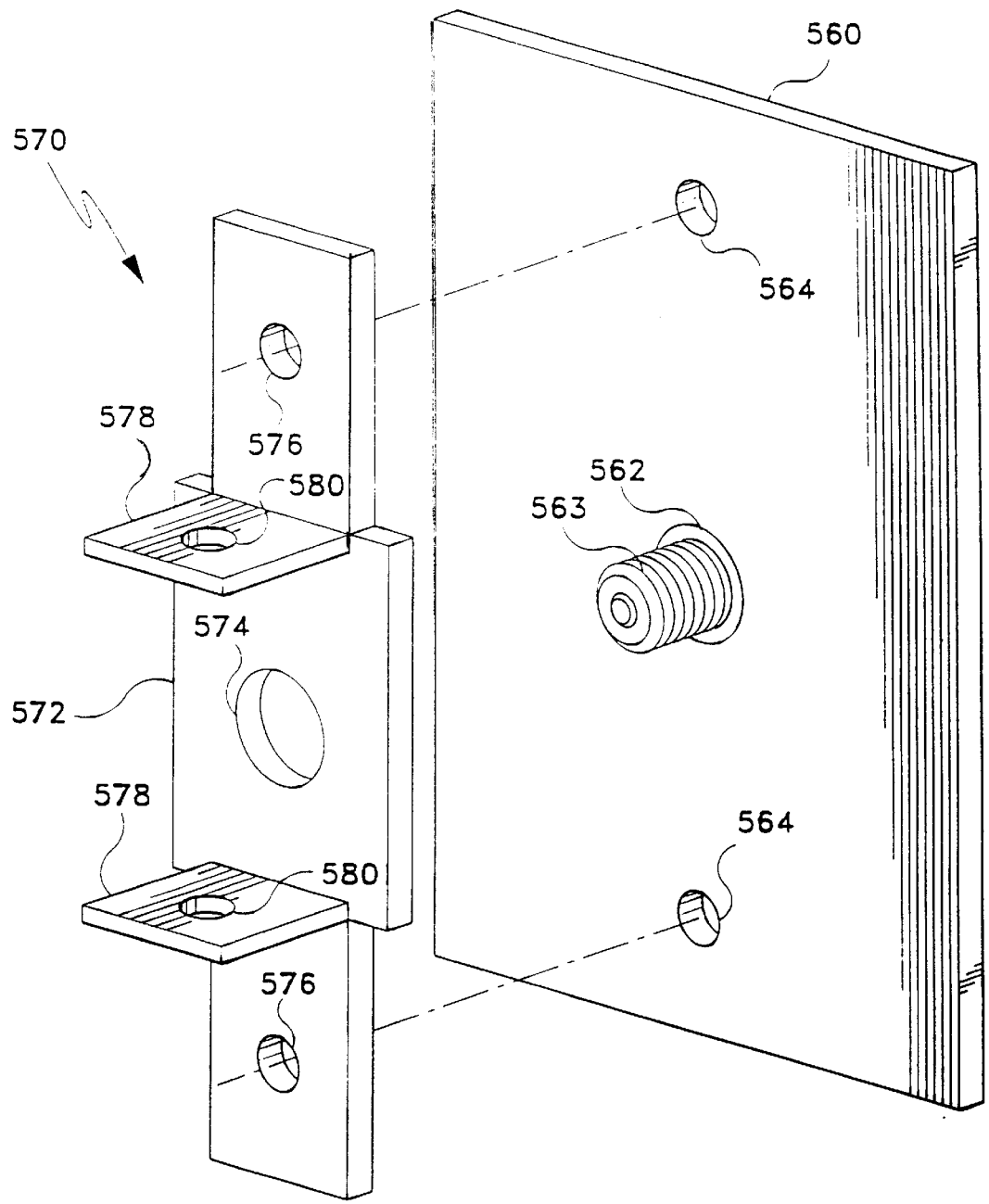
FIG. 24 is a front perspective view of a utility lock-out apparatus according to the present invention.

Another utility lock-out apparatus 570 according to the invention for a cable outlet assembly is shown in FIG. 24. As shown, the utility lock-out apparatus 570 comprises a cable outlet attachment 570 for attachment to a conventional cable outlet face plate 560 which includes one circular hole 562 defined therein configured and positioned for receiving a cable outlet 563 therethrough. Such a cable outlet 563 is typically configured in the form of a cable jack which is interconnected with underground cable wiring which carry audio/video signals from cable companies. The cable outlet face plate 560 also includes two holes 564 defined therein, wherein each is configured for receiving a fastening element (not shown), such as a screw, therethrough to provide a means for fastening the cable outlet face plate 560 to a cable outlet housing.

The cable outlet attachment 570 includes a base element 572 which includes a circular hole 574 defined therein configured and positioned for receiving a cable outlet 563 therethrough. However, the circular hole 574 does not need to be a complete hole but may only provide a singular connecting element on one side of the hole 574 shown. The base element 572 also includes two appropriately positioned and configured holes 576 defined therein for receiving fastening elements (not shown), such as screws, therethrough to provide a means for fastening the cable outlet attachment 570 to the conventional cable outlet face plate 560. The base element 572 additionally includes two integrally configured longitudinal elements 578 that extend from the surface of the base element 572 at opposing upper and lower sides of the circular hole 574. Each longitudinal element 578 extends for a desired distance above the surface of the base element 572. Each longitudinal element 578 also includes a hole 580 defined therein having a size configured for enabling a lock bar means 804 of a conventional locking means 800, such as that shown in FIG. 32, to pass therethrough. Preferably, the hole 580 of each longitudinal element 578 is located at a distance above the surface of the base element 572 substantially close to the cable outlet hole 574 that enables passage of a lock bar means 804 of a conventional locking means 800 therethrough to preclude use of the cable outlet 563.

This particular cable outlet attachment 570 provides the ability of a user to preclude use of a cable outlet 563 when the cable outlet attachment 570 is attached to a communication outlet face plate 560, and a lock bar means 804 of a conventional locking means 800 passes through the holes 580 of the longitudinal elements 578. This particular utility lock-out apparatus 570 provides the ability of a user to preclude use of a cable outlet 563. However, this particular utility lock-out apparatus 570 also enables one to remove the cable outlet attachment 570 from the cable outlet face plate 560 merely by removing the fastening elements. Obviously, such a cable outlet attachment 570 could include a number of cable outlet holes 574 other than one. The cable outlet attachment 570 may be made from any desirable material, such as metal, plastic, wood, etc., and may be dimensioned according to the desires of the manufacturer.

Figure 25:
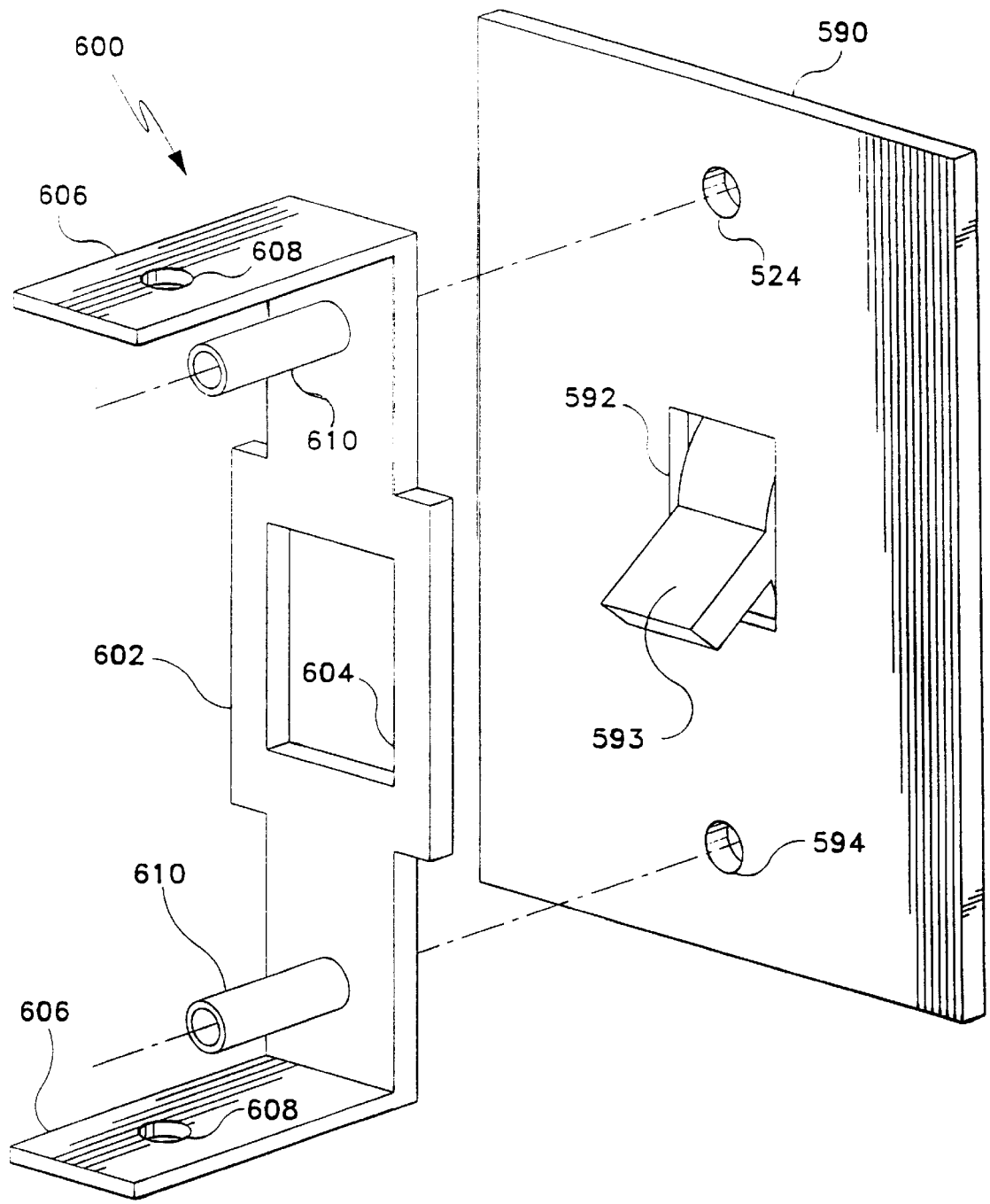
FIG. 25 is a front perspective view of a utility lock-out apparatus according to the present invention.

Another utility lock-out apparatus 600 according to the invention for an electrical switch assembly is shown in FIG. 25.

As shown, the utility lock-out apparatus 600 comprises an electrical switch attachment 600 for attachment to a conventional electrical switch face plate 590 which includes one rectangular hole 592 configured and positioned for receiving an electrical switch therethrough. The conventional electrical switch face plate 590 also includes two holes 524 each configured for receiving a fastening element, such as a screw, therethrough to provide a means for fastening the conventional electrical switch face plate 590 to an electrical switch housing.

The electrical switch attachment 600 includes a base element 602 which includes one rectangular hole 604 configured and positioned for receiving an electrical switch 593 therethrough. However, the rectangular hole 604 does not need to be a complete hole but may only provide a singular connecting element on one side of the hole 604 shown. The base element 602 may also include two appropriately positioned and configured holes (not shown) for receiving fastening elements (not shown), such as screws, therethrough to provide a means for fastening the electrical switch attachment 600 to the conventional electrical switch face plate 590. The base element 602 additionally includes two integrally configured longitudinal elements 606 that extend from the surface of the base element 602 at opposing upper and lower sides of the rectangular hole 604 for a predetermined distance. Each longitudinal element 606 extends for a desired distance above the surface of the base element 602. Each longitudinal element 606 also includes a hole 608 positioned a desired distance along the longitudinal element 606, wherein each hole 608 has a size configured for enabling a lock bar means 804 of a conventional locking means 800, such as that shown in FIG. 32, to pass therethrough.

The base element 602 may also include two integrally incorporated longitudinal tubular elements 610 that extend from the surface of the base element 602 at each fastening hole for a predetermined distance that is slightly smaller than the longitudinal distance to the holes 608 on each of the longitudinal elements 610 described above.

This particular utility lock-out apparatus 600 provides the ability of a user to lock an electrical switch 593 in either the ON position or the OFF position. This particular utility lock-out apparatus 600 may also prohibit one from removing the electrical switch attachment 600 from the electrical switch face plate 590 by removing the fastening elements through the inclusion of the longitudinal tube elements 610 therein. Obviously, such an electrical switch attachment 600 could include a number of electrical switch holes 604 other than one. The electrical switch attachment 600 may be made from any desirable material, such as metal, plastic, wood, etc., and may be dimensioned according to the desires of the manufacturer.

Figure 26:
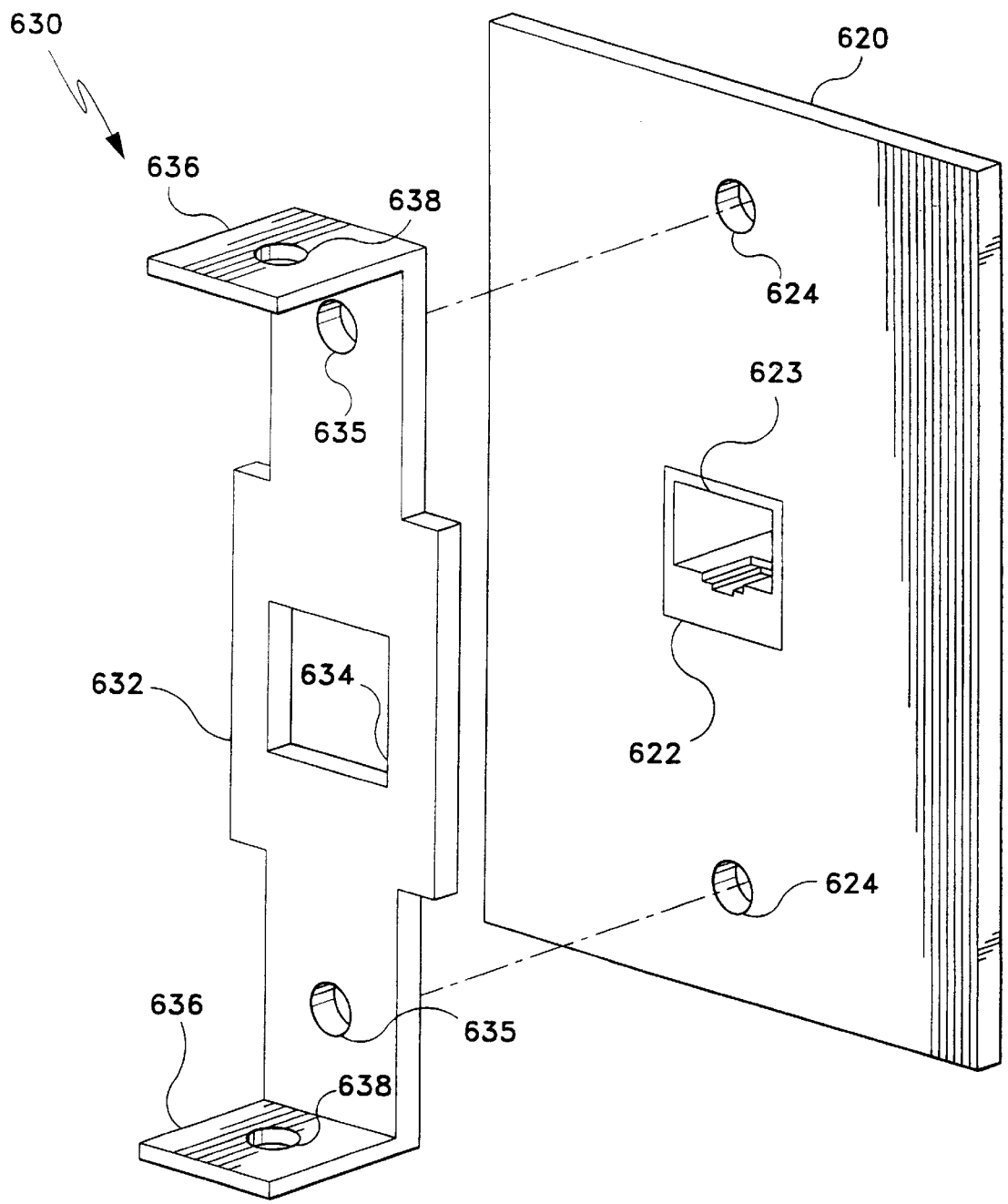
FIG. 26 is a front perspective view of a utility lock-out apparatus according to the present invention.

Another utility lock-out apparatus 630 according to the invention for a communication outlet assembly is shown in FIG. 26. As shown, the utility lock-out apparatus 630 comprises a communication outlet attachment 630 for attachment to a conventional communication outlet face plate 620 which includes one rectangular hole configured and positioned for receiving a communication outlet 623 therethrough. Such a communication outlet 623 is capable of receiving communication data from devices such as telephones, computers, facsimile machines, and the like. The communication outlet face plate 620 also includes two holes 624 each configured for receiving a fastening element (not shown), such as a screw, therethrough to provide a means for fastening the communication outlet face plate 630 to a communication outlet housing.

The communication outlet attachment 630 includes a base element 632 which includes one rectangular hole 634 configured and positioned for receiving a communication plug therethrough. The rectangular hole 634 could alternatively be shaped in the form of a twelve sided polygon configured and positioned for receiving a communication plug therethrough. In addition, the rectangular hole 604 does not need to be a complete hole but may only provide a singular connecting element on one side of the hole 604 shown. The base element 632 also includes two appropriately positioned and configured holes 635 for receiving fastening elements (not shown), such as screws, therethrough to provide a means for fastening the communication outlet attachment 630 to the conventional communication outlet face plate 620. The base element 632 additionally includes two integrally configured longitudinal elements 636 that extend from the surface of the base element 632 at opposing upper and lower sides of the rectangular hole 634. Each longitudinal element 636 extends for a desired distance above the surface of the base element 632. Each longitudinal element 636 also includes a hole 638 having a size configured for enabling a lock bar means 804 of a conventional locking means 800, such as that shown in FIG. 32, to pass therethrough. Preferably, the hole 638 of each longitudinal element 636 is located at a distance substantially close to the surface of the base element 632 to enable passage of a lock bar means 804 of a conventional locking means 800 therethrough to preclude use of a communication outlet 623.

This particular communication outlet attachment 630 provides the ability of a user to preclude use of a communication outlet 623 when the communication outlet attachment 630 is attached to a communication outlet face plate 620, and a lock bar means 804 of a conventional locking means 800 passes through the holes 638 of the longitudinal elements 636. This particular utility lock-out apparatus 630 provides the ability of a user to preclude use of a communication outlet 623. Additionally, this particular utility lock-out apparatus 623 precludes the ability of one to remove the communication outlet attachment 630 from the communication outlet face plate 620 merely by removing the fastening elements because a lock bar means passing through the holes 638 of each longitudinal element 636 would prevent such action. Obviously, such a communication outlet attachment 630 could include a number of communication outlet holes 634 other than one. The communication outlet attachment 630 may be made from any desirable material, such as metal, plastic, wood, etc., and may be dimensioned according to the desires of the manufacturer.

Figure 27:
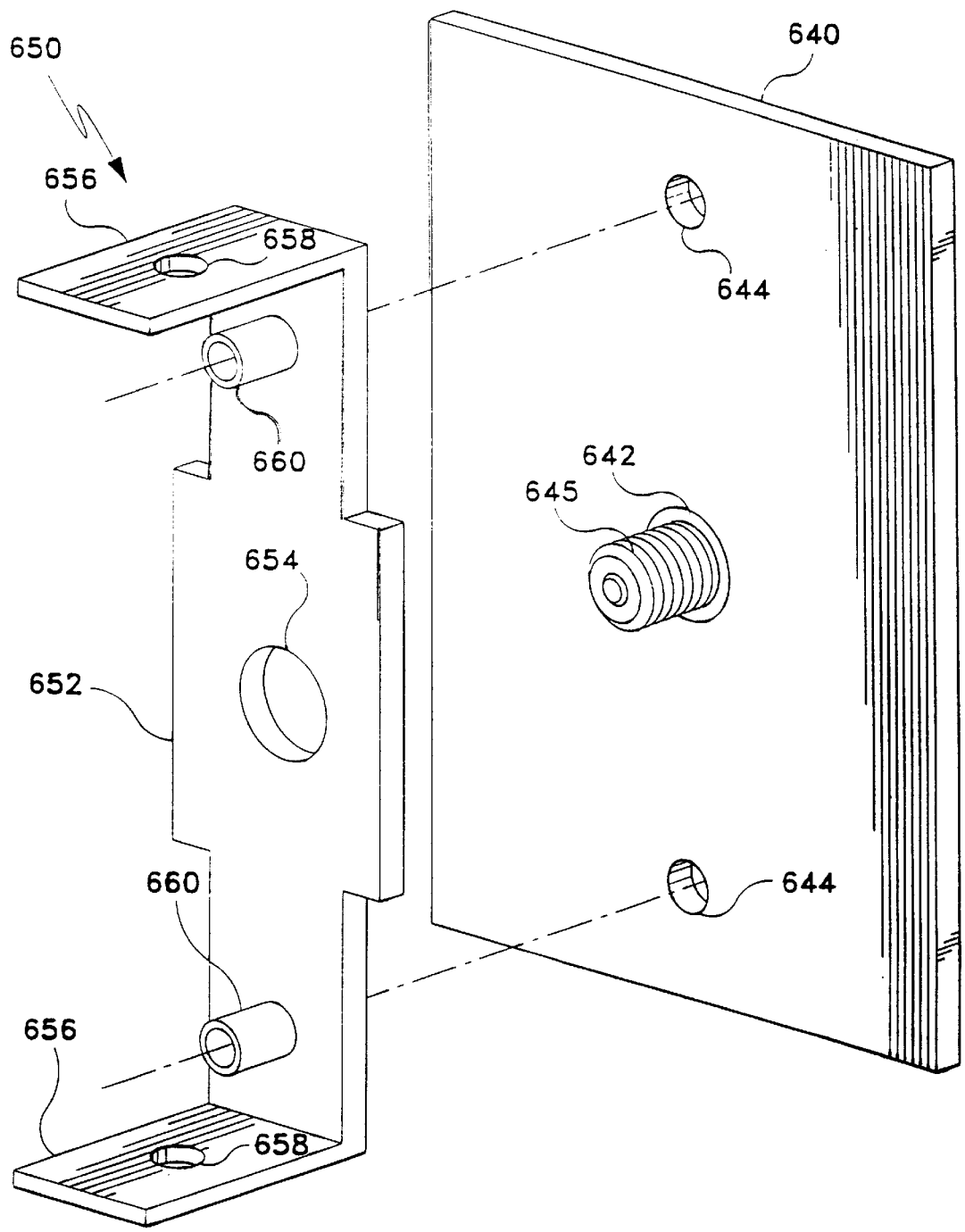
FIG. 27 is a front perspective view of a utility lock-out apparatus according to the present invention.

Another utility lock-out apparatus 650 according to the invention for a cable outlet assembly is shown in FIG. 27. As shown, the utility lock-out apparatus 650 comprises a cable outlet attachment 650 for attachment to a conventional cable outlet faces plate 640 which includes one circular hole 642 configured and positioned for receiving a cable outlet 645 therethrough. The conventional cable outlet face plate 640 also includes two holes 644 each configured for receiving a fastening element, such as a screw, therethrough to provide a means for fastening the conventional cable outlet face plate 640 to a cable outlet housing.

The cable outlet attachment 650 includes a base element 652 which includes one circular hole 654 configured and positioned for receiving a cable outlet 645 therethrough. In addition, the circular hole 654 does not need to be a complete hole but may only provide a singular connecting element on one side of the hole 654 shown. The base element 652 also includes two appropriately positioned and configured fastening holes (not shown) for receiving fastening elements (not shown), such as screws, therethrough to provide a means for fastening the cable outlet attachment 650 to the conventional cable outlet face plate 640. The base element 652 additionally includes two integrally configured longitudinal elements 656 that extend from the surface of the base element 652 at opposing upper and lower sides of the base element 652 above and below the fastening holes for a predetermined distance. Each longitudinal element 656 extends for a desired distance above the surface of the base element 652. Each longitudinal element 656 also includes a hole 658 positioned a desired distance along the longitudinal element 656, wherein each hole 658 has a size configured for enabling a lock bar means 804 of a conventional locking means 800, such as that shown in FIG. 32, to pass therethrough. The base element 652 may also include two integrally incorporated longitudinal tube elements 660 that extend from the surface of the base element 652 at each fastening hole for a predetermined distance that is slightly smaller than the longitudinal distance to the holes 658 on each of the longitudinal elements 656 described above.

This particular cable outlet attachment 650 provides the ability of a user to preclude use of a cable outlet 645 when the cable outlet attachment 650 is attached to a cable outlet face plate 640, and a lock bar means 804 of a conventional locking means 800 passes through the holes 658 of the longitudinal elements 656. This particular utility lock-out apparatus 650 provides the ability of a user to preclude use of a cable outlet 645. This particular utility lock-out apparatus 650 also prohibits one from removing the cable outlet attachment 650 from the cable outlet face plate 640 by removing the fastening elements through the inclusion of the longitudinal tube elements 660 therein. Obviously, such a cable outlet attachment 650 could include a number of cable outlet holes 654 other than one. The cable outlet attachment 650 may be made from any desirable material, such as metal, plastic, wood, etc., and may be dimensioned according to the desires of the manufacturer.

Figure 28:
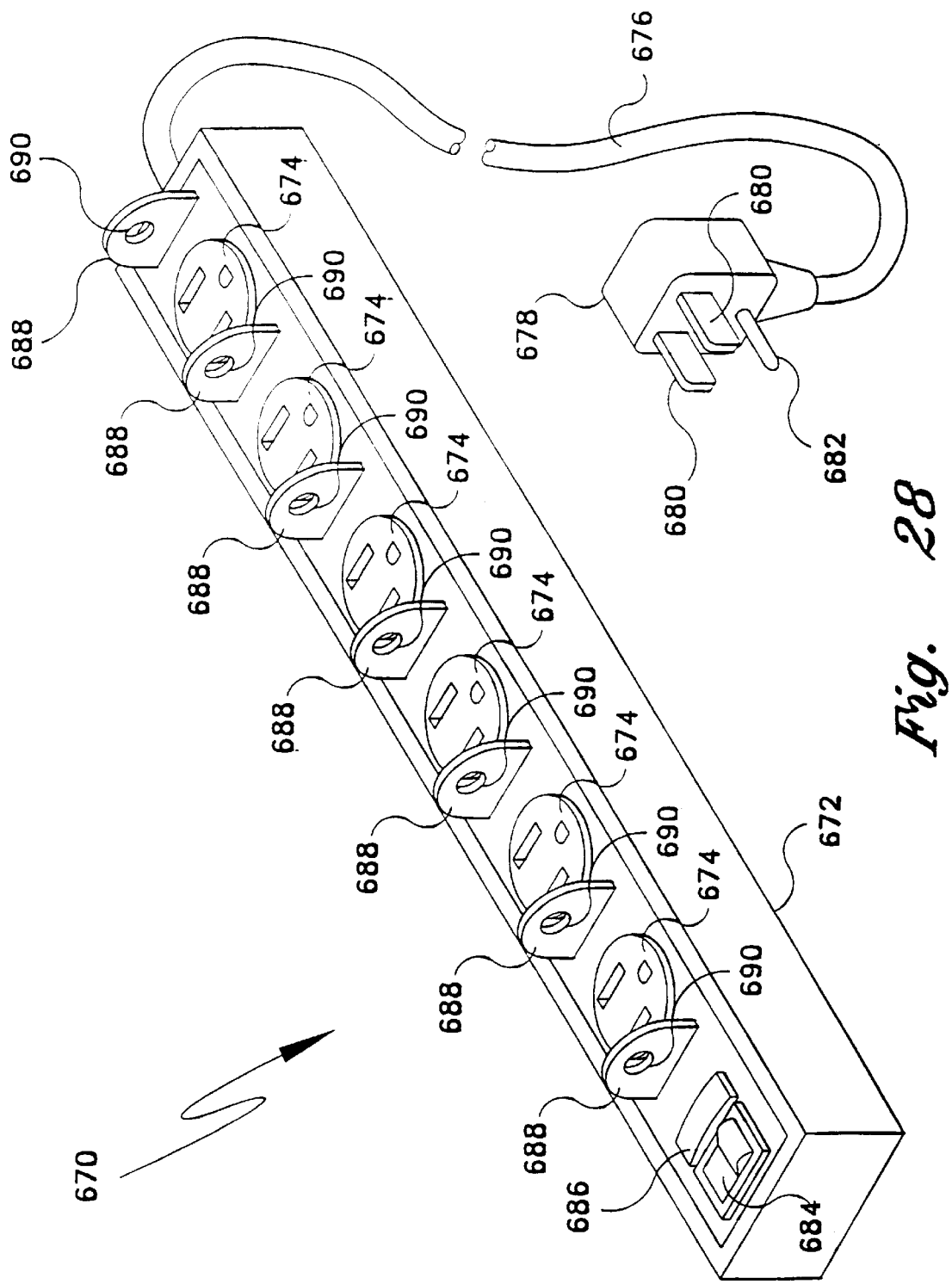
FIG. 28 is a front perspective view of a utility lock-out apparatus according to the present invention.

Another utility lock-out apparatus 670 according to the invention configured in the form of a power strip arrangement including voltage and surge suppression capabilities is shorn in FIG. 28. As shown, the utility lock-out apparatus 670 comprises a power outlet covering 672 which includes six power outlet holes each configured and positioned for receiving a power outlet 674 therethrough. The power outlet covering 672 may also include one or more fastening holes (not shown) for receiving fastening elements (not shown), such as screws, therethrough to provide a means for fastening the power outlet cover 672 to a power outlet housing (not shown). The utility lock-out apparatus 670 also includes a power cord 676 that extends for a predetermined distance to an electrical plug 678 which includes power contact prongs 680 and a ground prong 682. The electrical plug 678 is configured for insertion into a conventional wall mounted power outlet receptacle that is connected to an alternating current power source.

Of critical importance to the power outlet cover 672 is the integration therein of seven longitudinal elements 688 that extend from the surface of the power outlet covering 672 at opposing sides of each of the power outlets 674. Each longitudinal element 688 may be reinforced as desired by additional material at the surface of the power outlet covering 672 to inhibit breakage of the longitudinal elements 688 from the power outlet covering 672. Each longitudinal element 688 extends for a desired distance above the surface of the power outlet covering 672. Each longitudinal element 688 also includes a hole 690 having a size configured for enabling a lock bar means 804 of a conventional locking means 800, such as that shown in FIG. 32, to pass therethrough. Preferably, the hole 690 of each longitudinal element 688 is located at a relatively small distance above the surface of the power outlet covering 672 that would preclude one from contacting a power outlet with the metal prongs of an electrical plug (not shown) when a lock bar means 804 of a conventional locking means 800 passes therethrough.

This particular utility lock-out apparatus 670 provides the ability of a user to selectively lock-out access to one or more power outlets. Obviously, such a utility lock-out apparatus 670 could include a number of power outlets 674 other than six, and could include longitudinal elements at opposing sides of less than all power outlets 674. In addition, the power outlets 674 could be offset approximately ninety degrees such that the use of longitudinal elements would preferably extend for a distance above the surface of the power outlet covering 672 that would preclude one from contacting a power outlet with the metal prongs of an electrical plug (not shown) when a lock bar means 804 of a conventional locking means 800 passes therethrough and the metal prongs of the electrical plug straddle the lock bar means 804.

The utility lock-out apparatus 670 may also include tubular elements (not shown) configured therein to preclude the ability of someone from removing the power outlet covering 672 merely by removing the fastening elements when a locking means is utilized. The power outlet covering 672 and longitudinal elements 688 may be made from any desirable material, such as metal, plastic, wood, etc., and may be dimensioned according to the desires of the manufacturer.

Figure 29:
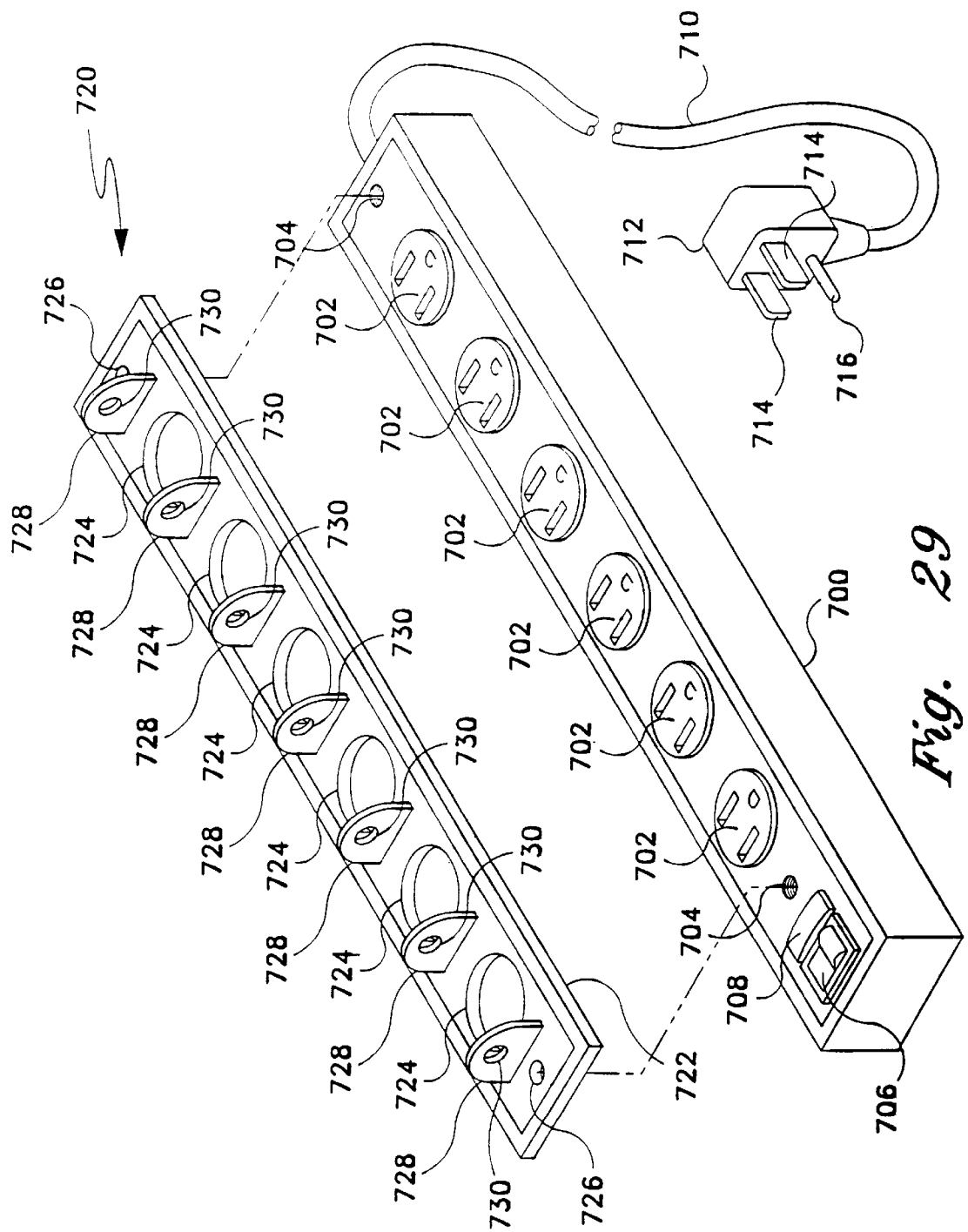
FIG. 29 is a front perspective view of a utility lock-out apparatus according to the present invention.

Another utility lock-out apparatus 720 according to the invention configured in the form of a power strip attachment 720 for a power strip arrangement 700 including voltage and surge suppression capabilities, as shown in FIG. 29. As shown, the utility lock-out apparatus 720 comprises a power outlet attachment 720 which includes six power outlet holes 724 each configured and positioned for receiving a power outlet 702 therethrough from the associated power strip arrangement 700 including voltage and surge suppression capabilities. The power strip arrangement 700 also includes one or more fastening holes 704 for receiving fastening elements (not shown), such as screws, therethrough to provide a means for fastening a power outlet face plate (not shown) to the power strip arrangement 700. The power strip arrangement 700 also includes a power cord 710 that extends for a predetermined distance to an electrical plug 712 which includes power contact prongs 714 and a ground prong 716. The electrical plug 712 is configured for insertion into a conventional wall mounted power outlet receptacle (not shown) that is connected to an alternating current power source.

The power outlet attachment 720 includes six power outlet holes 724 each configured and positioned for receiving a power outlet 702 therethrough. The power outlet attachment 720 also includes one or more fastening holes 726 for receiving fastening elements (not shown), such as screws, therethrough to provide a means for fastening the power outlet attachment 720 to the power strip arrangement 700. Of critical importance to the power outlet attachment 720 is the integration therein of seven longitudinal elements 728 that extend from the surface of the power outlet attachment 720 at opposing sides of each of the power outlet holes 724.

Each longitudinal element 728 may be reinforced as desired by additional material at the surface of the power outlet attachment 722 to inhibit breakage of the longitudinal elements 728 from the power outlet attachment 720. Each longitudinal element 728 extends for a desired distance above the surface of the power outlet attachment 720. Each longitudinal element 728 also includes a hole 730 having a size configured for enabling a lock bar means 804 of a conventional locking means 800, such as that shown in FIG. 32, to pass therethrough. Preferably, the hole 730 of each longitudinal element 730 is located at a relatively small distance above the surface of the power outlet attachment 722 that would preclude one from contacting a power outlet with the metal prongs of an electrical plug (not shown) when a lock bar means 804 of a conventional locking means 800 passes therethrough. In addition, the power outlets 702 could be offset approximately ninety degrees such that the use of longitudinal elements would preferably extend for a distance above the surface of the power outlet attachment 720 that would preclude one from contacting a power outlet with the metal prongs of an electrical plug (not shown) when a lock bar means 804 of a conventional locking means 800 passes therethrough and the metal prongs of the electrical plug straddle the lock bar means 804. In such a configuration, the longitudinal elements 726 would preferably extend for a distance above the surface of the power outlet attachment 720 that would preclude one from contacting a power outlet with the metal prongs of an electrical plug (not shown) when a lock bar means 804 of a conventional locking means 800 passes therethrough and the metal prongs of the electrical plug straddle the lock bar means 804.

This particular utility lock-out apparatus 720 provides the ability of a user to selectively lock-out access to one or more power outlets. Obviously, such a utility lock-out apparatus 720 could include a number of power outlet holes 724 other than six, and could include longitudinal elements at opposing sides of less than all power outlet holes 724. The utility lock-out apparatus 720 may also include tubular elements (not shown) configured therein to preclude the ability of someone from removing the power outlet attachment 720 merely by removing the fastening elements when a locking means is utilized. The power outlet attachment 720 and longitudinal elements 728 may be made from any desirable material, such as metal, plastic, wood, etc., and may be dimensioned according to the desires of the manufacturer.

Figure 30:
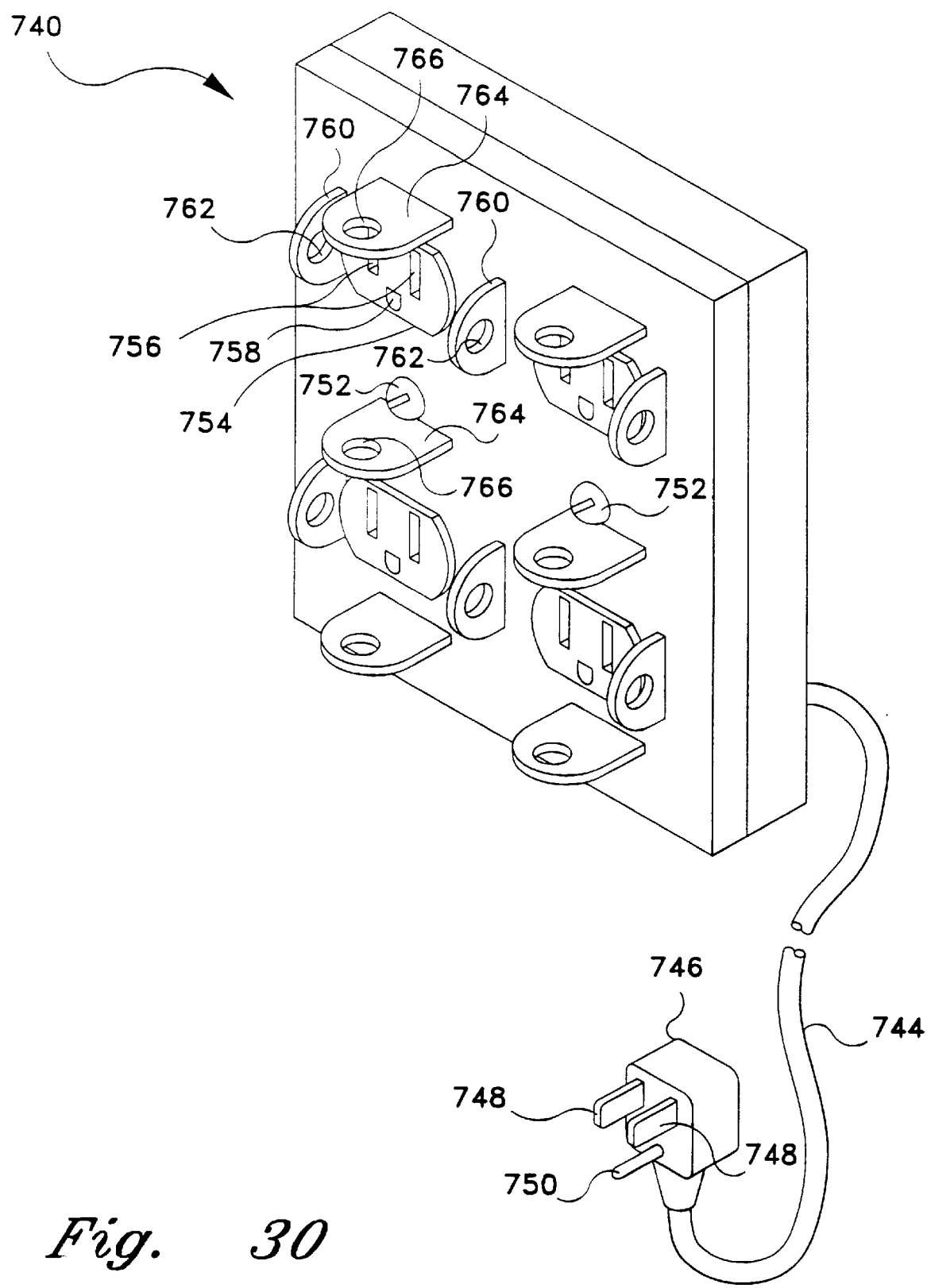
FIG. 30 is a front perspective view of a utility lock-out apparatus according to the present invention.

Another utility lock-out apparatus 740 according to the invention configured in the form of a portable power strip arrangement for use on construction sites or the like is shown in FIG. 30. As shown, the utility lock-out apparatus 740 comprises a power outlet covering which includes four power outlet holes each configured and positioned for receiving a power outlet 754 therethrough. The power outlet covering may also include one or more fastening holes (not shown) for receiving fastening elements 752, such as screws, therethrough to provide a means for fastening the power outlet cover to a power outlet housing. The utility lock-out apparatus 740 also includes a power cord 744 that extends for a predetermined distance to an electrical plug 746 which includes power contact prongs 748 and a ground prong 750. The electrical plug 746 is configured for insertion into a conventional wall mounted power outlet receptacle that is connected to an alternating current power source.

Of critical importance to the power outlet cover is the integration therein of twelve longitudinal elements 760,764 that extend from the surface of the power outlet covering 672 at opposing sides of each of the power outlets 754, wherein vertical longitudinal elements 760 are positioned on the sides of each power outlet 754 and horizontal longitudinal elements 764 are positioned above or below each power outlet 754. Each longitudinal element 760,764 may be reinforced as desired by additional material at the surface of the power outlet covering to inhibit breakage of the longitudinal elements 760,764 from the power outlet covering. Each longitudinal element 760,764 extends for a desired distance above the surface of the power outlet covering. Each longitudinal element 760,764 also includes a hole 762,766 having a size configured for enabling a lock bar 804 of a conventional locking means 800, such as that shown in FIG. 32, to pass therethrough. Preferably, the hole 760 of each vertical longitudinal element 762 is located at a relatively small distance above the surface of the power outlet covering that would preclude one from contacting a power outlet with the metal prongs of an electrical plug (not shown) when a lock bar means 804 of a conventional locking means 800 passes therethrough. Preferably, the hole 766 of each horizontal longitudinal element 764 is located at a distance above the surface of the outlet face covering that would preclude one from contacting a power outlet with the metal prongs of an electrical plug (not shown) when a lock bar means 804 of a conventional locking means 800 passes therethrough and the metal prongs of the electrical plug straddle the lock bar means 804.

This particular utility lock-out apparatus 740 provides the ability of a user to selectively lock-out access to one or more power outlets 754. Obviously, such a utility lock-out apparatus 740 could include a number of power outlets 754 other than six, and could include longitudinal elements at opposing sides of less than all power outlets 754. The utility lock-out apparatus 740 may also include tubular elements (not shown) configured therein to preclude the ability of someone from removing the power outlet covering merely by removing the fastening elements when a locking means is utilized. The power outlet covering and longitudinal elements 760,764 may be made from any desirable material, such as metal, plastic, wood, etc., and may be dimensioned according to the desires of the manufacturer.

Figure 31:
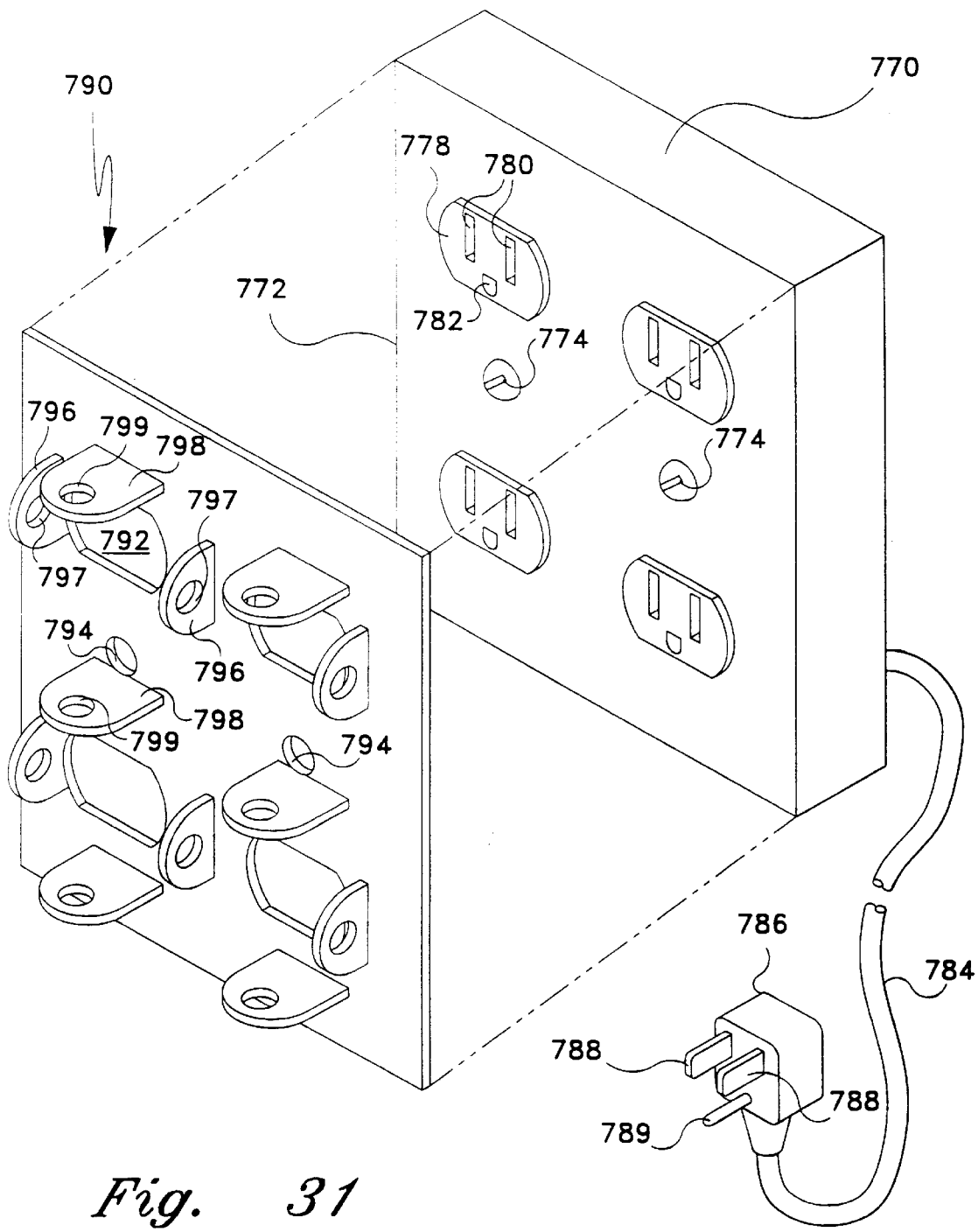
FIG. 31 is a front perspective view of a utility lock-out apparatus according to the present invention.

Another utility lock-out apparatus 790 according to the invention configured in the form of a power strip attachment 790 for a portable power strip arrangement 770 for use on construction sites or the like is shown in FIG. 31. As shown, the utility lock-out apparatus 790 comprises a power outlet attachment 790 which includes four power outlet holes 792 each configured and positioned for receiving a power outlet 778 therethrough. The power outlet attachment 790 also includes one or more fastening holes 794 for receiving fastening elements 774, such as screws, therethrough to provide a means for fastening the power outlet attachment 790 to the portable power strip arrangement 770. The power strip arrangement 770 also includes a power cord 784 that extends for a predetermined distance to an electrical plug 786 which includes power contact prongs 788 and a ground prong 789. The electrical plug 786 is configured for insertion into a conventional wall mounted power outlet receptacle (not shown) that is connected to an alternating current power source.

Of critical importance to the power outlet attachment 790 is the integration therein of twelve longitudinal elements 796,798 that extend from the surface of the power outlet attachment 790 at opposing sides of each of the power outlet holes 792, wherein vertical longitudinal elements 796 are positioned on the sides of each power outlet hole 792 and horizontal longitudinal elements 798 are positioned above or below each power outlet hole 792. Each longitudinal element 796,798 may be reinforced as desired by additional material at the surface of the power outlet covering to inhibit breakage of the longitudinal elements 796,798 from the power outlet covering.

Each longitudinal element 796,798 extends for a desired distance above the surface of the power outlet covering. Each longitudinal element 796,798 also includes a hole 797,799 having a size configured for enabling a lock bar 804 of a conventional locking means 800, such as that shown in FIG. 32, to pass therethrough. Preferably, the hole 797 of each vertical longitudinal element 796 is located at a relatively small distance above the surface of the power outlet attachment 790 that would preclude one from contacting a power outlet with the metal prongs of an electrical plug (not shown) when a lock bar means 804 of a conventional locking means 800 passes therethrough. Preferably, the hole 799 of each horizontal longitudinal element 798 is located at a distance above the surface of the outlet face covering that would preclude one from contacting a power outlet with the metal prongs of an electrical plug (not shown) when a lock bar means 804 of a conventional locking means 800 passes therethrough and the metal prongs of the electrical plug straddle the lock bar means 804.

This particular utility lock-out apparatus 790 provides the ability of a user to selectively lock-out access to one or more power outlets 778. Obviously, such a utility lock-out apparatus 790 could include a number of power outlet holes 792 other than four, and could include longitudinal elements at opposing sides of less than all power outlet holes 792. The utility lock-out attachment 790 may also include tubular elements (not shown) configured therein to preclude the ability of someone from removing the power outlet attachment 790 merely by removing the fastening elements when a locking means is utilized. The power outlet attachment 790 may be made from any desirable material, such as metal, plastic, wood, etc., and may be dimensioned according to the desires of the manufacturer.

Figure 32:
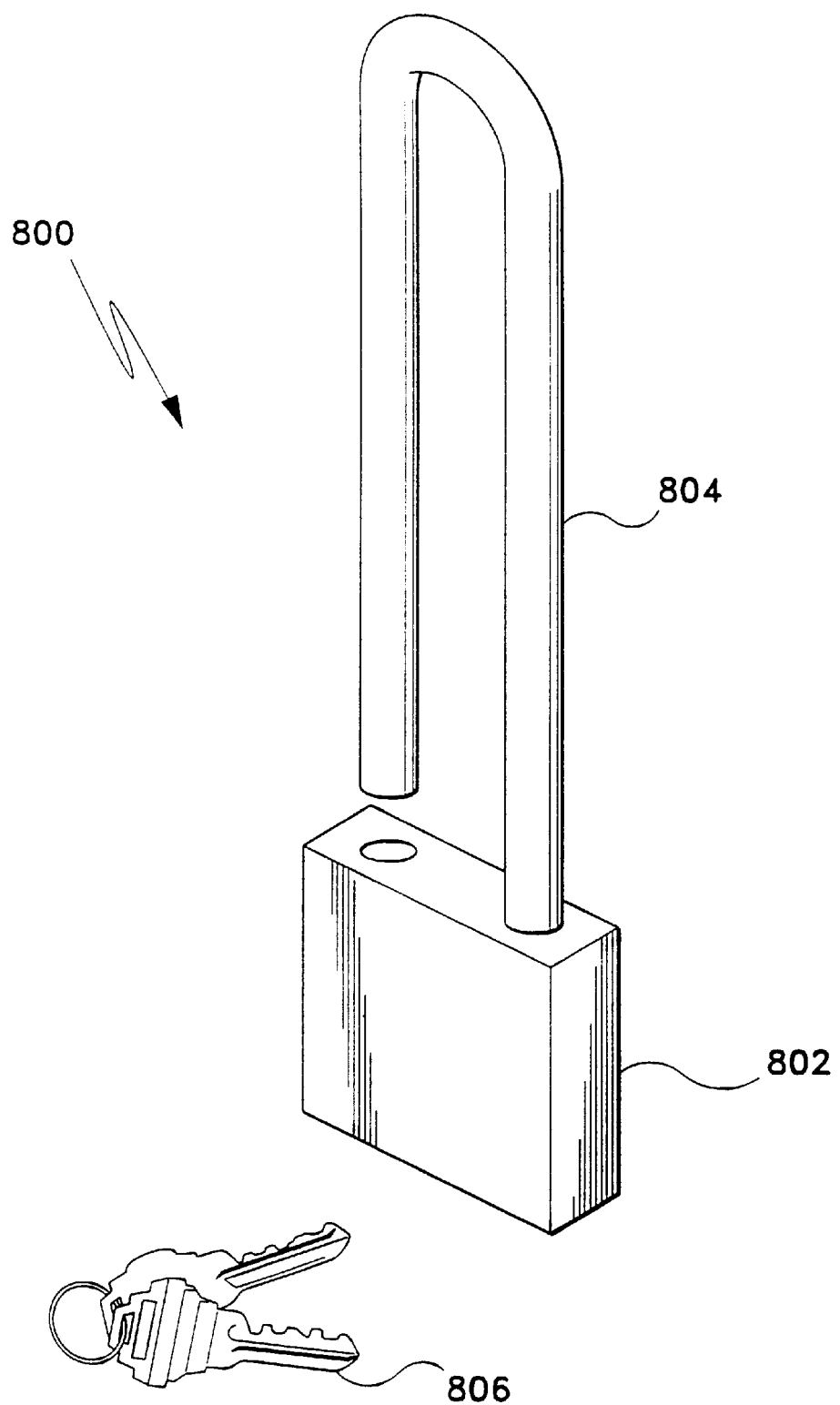
FIG. 32 is a front perspective view of a utility lock-out apparatus locking means according to the present invention.

FIG. 32 shows a conventional locking means 800 which may be utilized in utility lock-out apparatuses as described above. In this case the locking means 800 includes a key operated lock 802, lock bar means 804, and key means 806. Obviously, the length of the lock bar means 804 may be appropriately configured as desired to enable use with any particularly configured utility lock-out apparatus, and the lock 802 may be operated by means other than key means.

It is to be understood that the present invention is not limited to the embodiments described above, but encompasses any and all embodiments within the scope of the following claims.

I claim:

1. A utility lock-out apparatus comprising a covering with a forward surface and a rearward surface, said covering having defined therein at least one utility device hole through which a utility device may extend, said covering including at least one fastening means hole defined therein through which a fastening means may pass for securing said covering to a utility housing, said covering including at least one longitudinal element extending from the forward surface of said covering for a predetermined distance, said at least one longitudinal element having a hole defined therein with a size configured for enabling a lock bar means of a conventional locking means to pass therethrough.

2. A utility lock-out apparatus according to claim 1, wherein said at least one utility device hole comprises an upper utility device hole and a lower utility device hole each configured and positioned for receiving a power outlet therethrough.

3. A utility lock-out apparatus according to claim 2, wherein said at least one longitudinal element comprises two longitudinal elements extending at opposing sides of one of the utility device holes.

4. A utility lock-out apparatus according to claim 2, wherein said at least one longitudinal element comprises two longitudinal elements extending at opposing upper and lower sides of said upper and lower utility device holes.

5. A utility lock-out apparatus according to claim 4, further comprising at least one tubular element integrally incorporated into said covering that extends from the surface of said covering at a fastening means hole for a predetermined distance.

6. A utility lock-out apparatus according to claim 2, wherein said at least one longitudinal element comprises three longitudinal elements that extend from the surface of said covering, wherein one extends from one side of one utility device hole, and the remaining two extend from opposing sides of the other utility device hole.

7. A utility lock-out apparatus according to claim 6, further comprising at least one tubular element integrally incorporated into said covering that extends from the surface of said covering at a fastening means hole for a predetermined distance.

8. A utility lock-out apparatus according to claim 1, wherein said at least one fastening means hole comprises two fastening means holes.

9. A utility lock-out apparatus according to claim 8, wherein said at least one utility device hole comprises a utility device hole configured and positioned for receiving a power outlet therethrough.

10. A utility lock-out apparatus according to claim 9, wherein said at least one longitudinal element comprises two longitudinal elements extending at opposing sides of said utility device hole.

11. A utility lock-out apparatus according to claim 10, further comprising at least one tubular element integrally incorporated into said covering that extends from the surface of said covering at a fastening means hole for a predetermined distance.

12. A utility lock-out apparatus according to claim 9, wherein said at least one longitudinal element comprises a first longitudinal element extending from the forward surface of said covering at one side of said utility device hole and a second longitudinal element extending for a predetermined distance from the forward surface of said covering at opposing side portions of said utility device hole intermediate to positions of said first longitudinal element and an opposing side of said utility device hole.

13. A utility lock-out apparatus according to claim 12, wherein said covering is further integrated with a third longitudinal element that extends for a predetermined distance from the forward surface of said covering at the opposing side of said utility device hole from the first longitudinal element.

14. A utility lock-out apparatus according to claim 12, further comprising at least one tubular element integrally incorporated into said covering that extends from the surface of said covering at a fastening means hole for a predetermined distance.

15. A utility lock-out apparatus according to claim 8, wherein said at least one utility device hole comprises a utility device hole configured and positioned for receiving an electrical switch therethrough.

16. A utility lock-out apparatus according to claim 15, wherein said at least one longitudinal element consists of one longitudinal element.

17. A utility lock-out apparatus according to claim 15, wherein said at least one longitudinal element comprises two longitudinal elements.

18. A utility lock-out apparatus according to claim 15, further comprising at least one tubular element integrally incorporated into said covering that extends from the surface of said covering at a fastening means hole for a predetermined distance.

19. A utility lock-out apparatus according to claim 8, wherein said at least one utility device hole comprises a utility device hole configured and positioned for receiving a communication outlet therethrough.

20. A utility lock-out apparatus according to claim 19, wherein said at least one longitudinal element consists of one longitudinal element.

21. A utility lock-out apparatus according to claim 19, wherein said at least one longitudinal element comprises two longitudinal elements.

22. A utility lock-out apparatus according to claim 19, further comprising at least one tubular element integrally incorporated into said covering that extends from the surface of said covering at a fastening means hole for a predetermined distance.

23. A utility lock-out apparatus according to claim 8, wherein said at least one utility device hole comprises a utility device hole configured and positioned for receiving a cable outlet therethrough.

24. A utility lock-out apparatus according to claim 23, wherein said at least one longitudinal element consists of one longitudinal element.

25. A utility lock-out apparatus according to claim 23, wherein said at least one longitudinal element comprises two longitudinal elements.

26. A utility lock-out apparatus according to claim 23, further comprising at least one tubular element integrally incorporated into said covering that extends from the surface of said covering at a fastening means hole for a predetermined distance.

27. A utility lock-out apparatus comprising a utility lock-out attachment having a base element with a forward surface, a rearward surface, and at least one fastening means hole defined therein through which a fastening means may pass for securing said utility lock-out attachment to a standard utility face plate, said utility lock-out attachment including at least one utility device hole defined therein through which a utility device may extend; said utility lock-out attachment including at least one longitudinal element extending from the surface of said utility lock-out attachment for a predetermined distance, said at least one longitudinal element having a hole defined therein having a size configured for enabling a lock bar means of a conventional locking means to pass therethrough.

28. A utility lock-out apparatus according to claim 27, wherein said at least one utility device hole comprises an upper utility device hole and a lower utility device hole each configured and positioned for receiving a power outlet therethrough.

29. A utility lock-out apparatus according to claim 28, further comprising an extension element extending from the rearward surface of one of said utility device holes configured for being inserted into a ground plug hole of a conventional power outlet to preclude the ability of one from rotating the power outlet attachment when the power outlet attachment is attached to a conventional power outlet face plate.

30. A utility lock-out apparatus according to claim 28, wherein said at least one longitudinal element comprises two longitudinal elements extending at opposing sides of one of the utility device holes.

31. A utility lock-out apparatus according to claim 28, wherein said at least one longitudinal element comprises two longitudinal elements extending at opposing upper and lower sides of said upper and lower utility device holes.

32. A utility lock-out apparatus according to claim 31, further comprising at least one tubular element integrally incorporated into said utility lock-out attachment that extends from the surface of said utility lock-out attachment at a fastening means hole for a predetermined distance.

33. A utility lock-out apparatus according to claim 28, wherein said at least one longitudinal element comprises three longitudinal elements that extend from the surface of said utility lock-out attachment, wherein one extends from one side of one utility device hole, and the remaining two extend from opposing sides of the other utility device hole.

34. A utility lock-out apparatus according to claim 28, further comprising at least one tubular element integrally incorporated into said utility lock-out attachment that extends from the surface of said utility lock-out attachment at a fastening means hole for a predetermined distance.

35. A utility lock-out apparatus according to claim 27, wherein said at least one fastening means hole comprises two fastening means holes.

36. A utility lock-out apparatus according to claim 35, wherein said at least one utility device hole comprises a utility device hole configured and positioned for receiving a power outlet therethrough.

37. A utility lock-out apparatus according to claim 36, wherein said at least one longitudinal element comprises two longitudinal elements extending at opposing sides of said utility device hole.

38. A utility lock-out apparatus according to claim 37, further comprising at least one tubular element integrally incorporated into said covering that extends from the surface of said utility lock-out attachment at a fastening means hole for a predetermined distance.

39. A utility lock-out apparatus according to claim 36, wherein said at least one longitudinal element comprises a first longitudinal element extending from the forward surface of said utility lock-out attachment at one side of said utility device hole and a second longitudinal element extending for a predetermined distance from the forward surface of said utility lock-out attachment at opposing side portions of said utility device hole intermediate to positions of said first longitudinal element and an opposing side of said utility device hole.

40. A utility lock-out apparatus according to claim 39, wherein said utility lock-out attachment is further integrated with a third longitudinal element that extends for a predetermined distance from the forward surface of said utility lock-out attachment at the opposing side of said utility device hole from the first longitudinal element.

41. A utility lock-out apparatus according to claim 39, further comprising at least one tubular element integrally incorporated into said utility lock-out attachment that extends from the surface of said utility lock-out attachment at a fastening means hole for a predetermined distance.

42. A utility lock-out apparatus according to claim 27, wherein said at least one utility device hole comprises a utility device hole configured and positioned for receiving an electrical switch therethrough.

43. A utility lock-out apparatus according to claim 42, wherein said at least one longitudinal element consists of one longitudinal element.

44. A utility lock-out apparatus according to claim 42, wherein said at least one longitudinal element comprises two longitudinal elements.

45. A utility lock-out apparatus according to claim 44, further comprising at least one tubular element integrally incorporated into said utility lock-out attachment that extends from the surface of said utility lock-out attachment at a fastening means hole for a predetermined distance.

46. A utility lock-out apparatus according to claim 27, wherein said at least one utility device hole comprises a utility device hole configured and positioned for receiving a communication outlet therethrough.

47. A utility lock-out apparatus according to claim 46, wherein said at least one longitudinal element consists of one longitudinal element.

48. A utility lock-out apparatus according to claim 46, wherein said at least one longitudinal element comprises two longitudinal elements.

49. A utility lock-out apparatus according to claim 46, further comprising at least one tubular element integrally incorporated into said utility lock-out attachment that extends from the surface of said utility lock-out attachment at a fastening means hole for a predetermined distance.

50. A utility lock-out apparatus according to claim 27, wherein said at least one utility device hole comprises a utility device hole configured and positioned for receiving a cable outlet therethrough.

51. A utility lock-out apparatus according to claim 50, wherein said at least one longitudinal element consists of one longitudinal element.

52. A utility lock-out apparatus according to claim 50, wherein said at least one longitudinal element comprises two longitudinal elements.

53. A utility lock-out apparatus according to claim 50, further comprising at least one tubular element integrally incorporated into said utility lock-out attachment that extends from the surface of said utility lock-out attachment at a fastening means hole for a predetermined distance.

54. A utility lock-out apparatus according to claim 27, wherein said at least one utility device hole comprises a utility device hole configured and positioned for receiving a power outlet therethrough.

55. A utility lock-out apparatus according to claim 54, further comprising an extension element extending from the rearward surface of a utility device hole configured for being inserted into a ground plug hole of a conventional power outlet to preclude the ability of one from rotating the utility lock-out attachment when the lock-out attachment is attached to a utility face plate.

56. A utility lock-out apparatus according to claim 54, wherein said at least one longitudinal element comprises a first longitudinal element extending from the forward surface of said utility lock-out attachment at one side of said utility device hole and a second longitudinal element extending for a predetermined distance from the forward surface of said utility lock-out attachment at opposing side portions of said utility device hole intermediate to positions of said first longitudinal element and an opposing side of said utility device hole.

57. A utility lock-out apparatus according to claim 56, wherein said utility lock-out attachment is further integrated with a third longitudinal element that extends for a predetermined distance from the forward surface of said utility lock-out attachment at the opposing side of said utility device hole from the first longitudinal element.

58. A utility lock-out apparatus according to claim 56, further comprising at least one tubular element integrally incorporated into said utility lock-out attachment that extends from the surface of said utility lock-out attachment at a fastening means hole for a predetermined distance.

59. A utility lock-out apparatus according to claim 54, wherein said at least one longitudinal element comprises two longitudinal elements extending at opposing sides of said utility device hole.

60. A utility lock-out apparatus according to claim 59, further comprising at least one tubular element integrally incorporated into said utility lock-out attachment that extends from the surface of said utility lock-out attachment at a fastening means hole for a predetermined distance.

* * * * *